(12) United States Patent
Yamashita et al.

(10) Patent No.: US 8,488,029 B2
(45) Date of Patent: Jul. 16, 2013

(54) IMAGING APPARATUS, IMAGING METHOD, INTEGRATED CIRCUIT, AND STORAGE MEDIUM

(75) Inventors: Haruo Yamashita, Osaka (JP); Takeshi Ito, Osaka (JP); Daisuke Sato, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/222,313

(22) Filed: Aug. 31, 2011

(65) Prior Publication Data

US 2011/0310271 A1    Dec. 22, 2011

Related U.S. Application Data

(62) Division of application No. 12/104,115, filed on Apr. 16, 2008, now Pat. No. 8,144,214.

(30) Foreign Application Priority Data

Apr. 18, 2007 (JP) .................................. 2007-109890
Apr. 18, 2007 (JP) .................................. 2007-109891
Feb. 13, 2008 (JP) .................................. 2008-032218

(51) Int. Cl.
*H04N 5/202* (2006.01)

(52) U.S. Cl.
USPC ........................................ 348/254; 382/274

(58) Field of Classification Search
None
See application file for complete search history.

(56) References Cited

U.S. PATENT DOCUMENTS

| | | | |
|---|---|---|---|
| 5,264,940 A | 11/1993 | Komiya et al. | |
| 5,335,075 A | 8/1994 | Komiya et al. | |
| 5,809,161 A | 9/1998 | Auty et al. | |
| 6,198,844 B1 | 3/2001 | Nomura | |
| 2002/0044205 A1 | 4/2002 | Nagaoka et al. | |
| 2004/0239779 A1 | 12/2004 | Washisu | |
| 2005/0190272 A1 | 9/2005 | Takahashi et al. | |
| 2005/0231606 A1 | 10/2005 | Suzuki | |
| 2006/0017597 A1 | 1/2006 | Jaspers | |
| 2006/0238621 A1 | 10/2006 | Okubo et al. | |

(Continued)

FOREIGN PATENT DOCUMENTS

| | | |
|---|---|---|
| JP | 59-210775 | 11/1984 |
| JP | 5-115045 | 5/1993 |

(Continued)

OTHER PUBLICATIONS

Office Action dated Jul. 17, 2012 in U.S. Appl. No. 13/222,274.

*Primary Examiner* — Nelson D. Hernández Hernández
*Assistant Examiner* — Dennis Hogue
(74) *Attorney, Agent, or Firm* — Wenderoth, Lind & Ponack, L.L.P.

(57) ABSTRACT

An imaging apparatus captures a large dynamic range image of a scene including a backlit person with a blue sky background in a manner that the person's face has an appropriate luminance level without saturating the background sky. An imaging unit obtains analogue image signals through exposure control that prevents a highlight from being saturated, an A/D converter converts the analogue image signals to digital image signals, and a signal processing unit linearly increases the dynamic range of the digital image signals. The image signals with the increased dynamic range are nonlinearly compressed to have a dynamic range of 100% or less through nonlinear dynamic range compression that intensively compresses a highlight portion. The imaging apparatus with this structure first increases the dynamic range of an image and efficiently compresses the increased large dynamic range of the image.

11 Claims, 47 Drawing Sheets

U.S. PATENT DOCUMENTS

| | | |
|---|---|---|
| 2007/0002463 A1 | 1/2007 | Shintani et al. |
| 2007/0040914 A1 | 2/2007 | Katagiri et al. |
| 2007/0071318 A1 | 3/2007 | Yamashita et al. |
| 2007/0166020 A1 | 7/2007 | Quan et al. |
| 2007/0188623 A1* | 8/2007 | Yamashita et al. ......... 348/222.1 |
| 2008/0107360 A1 | 5/2008 | Yamashita et al. |
| 2008/0225147 A1 | 9/2008 | Dakemoto et al. |
| 2009/0161953 A1* | 6/2009 | Ciurea et al. .................. 382/172 |
| 2010/0238320 A1 | 9/2010 | Washisu |

FOREIGN PATENT DOCUMENTS

| | | |
|---|---|---|
| JP | 2002-135651 | 5/2002 |
| JP | 2005-72965 | 3/2005 |
| JP | 2007-020071 | 1/2007 |
| WO | 99/60524 | 11/1999 |
| WO | WO 9960524 A1 * | 11/1999 |
| WO | 2005/027041 | 3/2005 |
| WO | 2005/027043 | 3/2005 |
| WO | WO 2005027043 A1 * | 3/2005 |

* cited by examiner

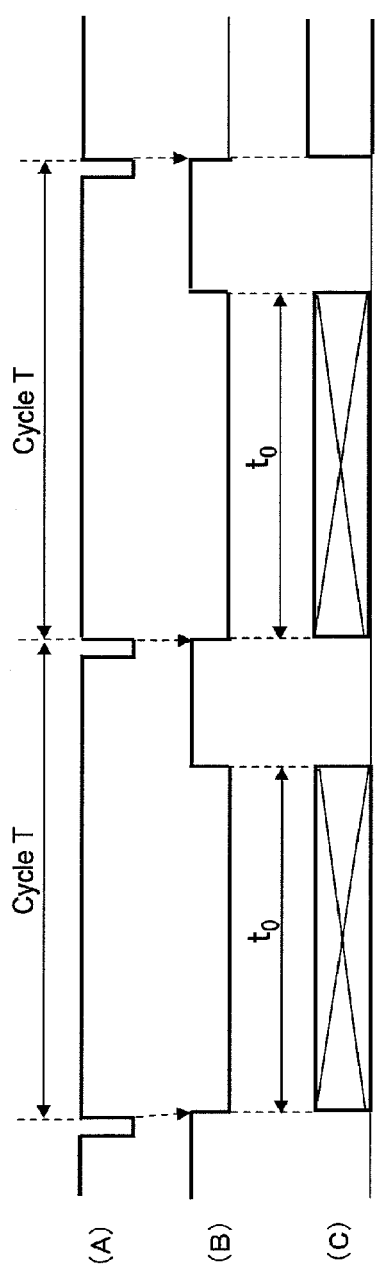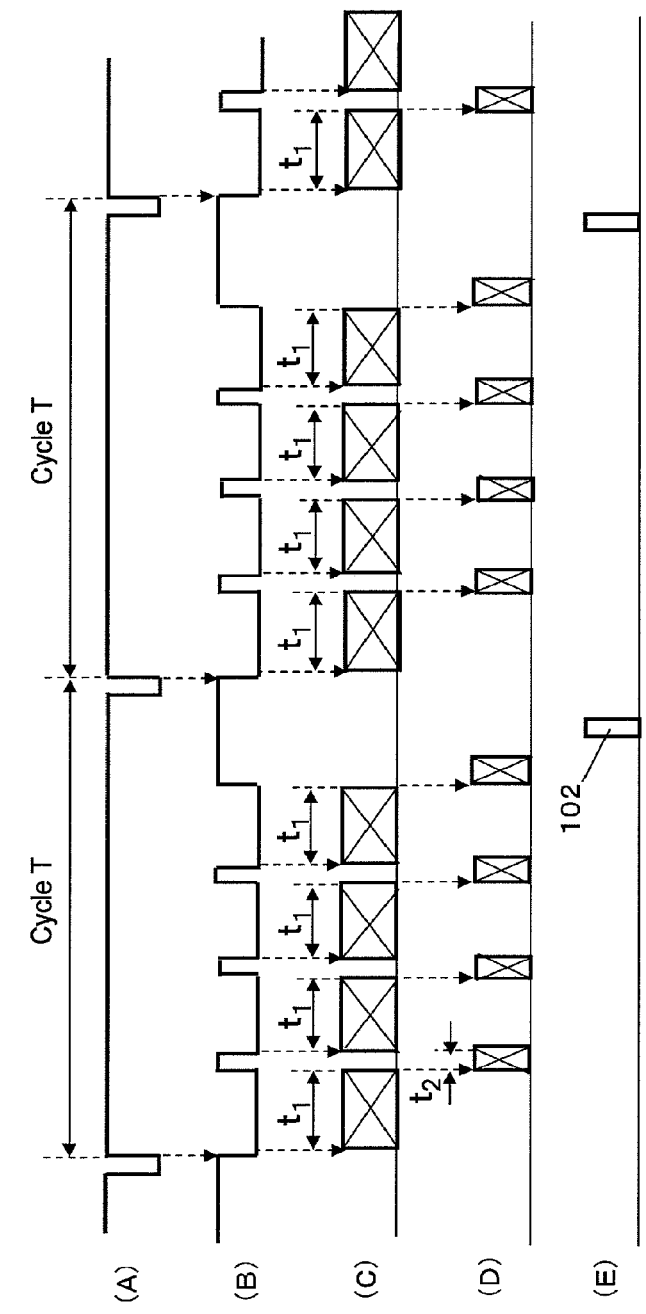
Fig. 32A
Fig. 32B

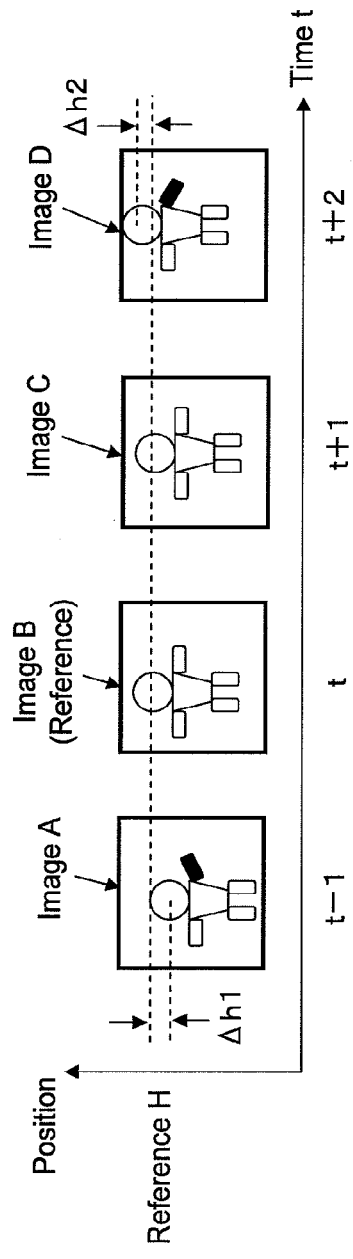
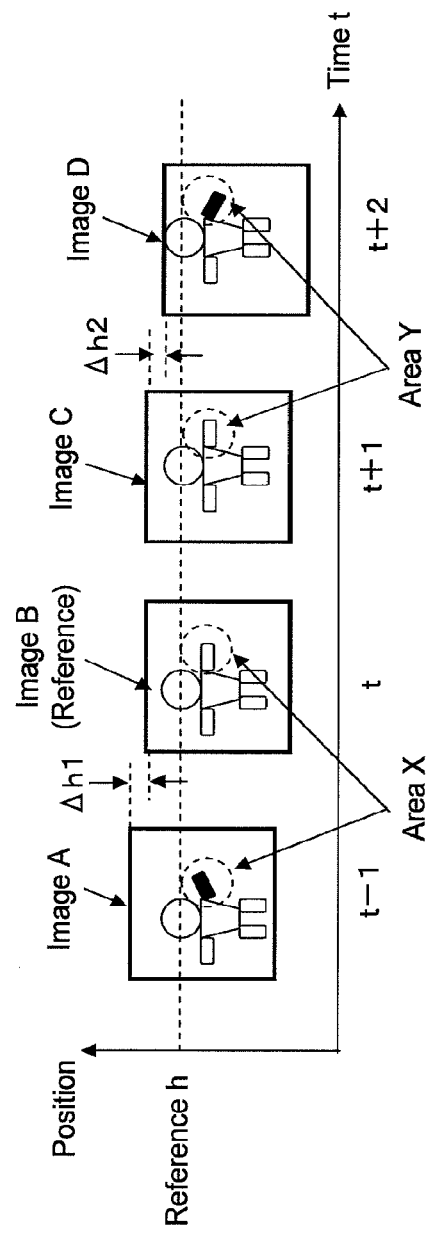
Fig. 45A
Fig. 45B

IMAGING APPARATUS, IMAGING METHOD, INTEGRATED CIRCUIT, AND STORAGE MEDIUM

This application is a divisional of U.S. application Ser. No. 12/104,115, filed Apr. 16, 2008 now U.S. Pat. No. 8,144,214.

BACKGROUND OF THE INVENTION

1. Field of the Invention

The present invention relates to an imaging apparatus and an integrated circuit that functions as an imaging apparatus, and more particularly, to an imaging apparatus that appropriately captures an image of a scene (subject) having a large dynamic range, an integrated circuit that functions as such an imaging apparatus, and a computer-readable storage medium that stores a program used in such an imaging apparatus.

2. Description of the Related Art

Imaging apparatuses, such as a digital still camera for capturing still images and a digital video camera for capturing moving images, capture images in the following manner. In an imaging apparatus, an optical system focuses light and forms an image through exposure control, and a solid-state image sensor, such as a CCD (charge-coupled device) image sensor or a CMOS (complementary metal oxide semiconductor) image sensor, converts the image to electric signals, which are analogue image signals, by photoelectric conversion. In the conventional imaging apparatus, a circuit that performs signal processing, such as analogue front end processing, then processes the analogue image signals, and an A/D (analogue-to-digital) converter converts the analogue image signals to digital image data. The digital image data is subsequently subjected to image processing, such as video gamma correction (gamma correction with a gamma of 0.45), knee adjustment, luminance conversion, and color difference conversion. The processed digital image data is converted to data in a standardized format. More specifically, when the digital image data is still image data, the data is converted to, for example, JPEG (Joint Photographic Experts Group) data. When the digital image data is moving image (video) data, the data is converted to, for example, MPEG (Moving Picture Experts Group) data or DV (Digital Video) data. The digital image data in the standardized format is recorded onto a recording medium, such as a memory card, a hard disk, an optical disc, or a magnetic tape.

The whitest point of the data defined by the standardized format described above (image or video format), which specifically corresponds to the highest luminance level of the data reproduced on a display, is assumed to have a luminance level of 100%. In this case, the conventional imaging apparatus is normally designed to form an image having a dynamic range of luminance levels of 100 to 200%. The dynamic range of 100% means that signal values (for example, luminance levels) of the image correspond to luminance levels of 0 to 100%. In other words, the minimum signal value corresponds to a luminance level of 0%, and the maximum signal value corresponds to a luminance level of 100%.

A first conventional imaging apparatus compresses the dynamic range of a captured image to eliminate its luminance area exceeding a luminance level of 100% through processing called knee adjustment, and obtains an image having a dynamic range of 100% or less.

The dynamic range of an image that is captured by the conventional imaging apparatus is normally determined by the exposure light amount of the optical system (exposure light amount determined by the aperture or shutter speed) and the electric amplification amount of electric signals, which have been generated by photoelectric conversion.

The conventional imaging apparatus appropriately captures an image (video) of a bright scene (subject) that has a large amount of light either by setting a small aperture or by setting a fast shutter speed. This imaging apparatus appropriately captures such an image because the imaging apparatus is provided with a sufficiently large amount of light. Typically, users of imaging apparatuses may intentionally produce "desirable blur" in a captured image (video), or more specifically intentionally defocus and blur the background of the image (video) by setting a faster shutter speed and a larger aperture and decreasing the depth of field. Even when the depth of field is decreased in that manner, the imaging apparatus appropriately captures an image (video) in environments that have large amounts of light.

Also, users may often set a slower shutter speed and a smaller aperture and increase the depth of field.

In either of the two cases in which the depth of field is increased and decreased, the imaging apparatus is provided with a sufficiently large amount of light when capturing an image of a bright scene (a subject in a bright environment), and thus is not required to perform electric amplification of signals. When capturing an image of a bright scene (subject in a bright environment), the conventional imaging apparatus does not electrically amplify electric signals, which have been generated by photoelectric conversion.

When capturing an image of a dark scene, however, the imaging apparatus is required to maximize the aperture and slow the shutter speed to obtain a sufficiently large amount of light. When the imaging apparatus performs such a long exposure, the imaging apparatus and the subject may move during the exposure. Such movement of the imaging apparatus or the subject may blur images. To prevent blurry images caused by apparatus or subject movement, the conventional imaging apparatus limits the slowest shutter speed setting to the speed at which such apparatus movement does not occur. To compensate for an insufficient amount of exposure light, the conventional imaging apparatus electrically amplifies electric signals, which have been generated by photoelectric conversion. Such signal amplification processing is referred to as "high-sensitivity mode processing" or "push processing". To prevent the S/N (signal-to-noise) ratio from deteriorating and to ensure the quantization resolution of A/D conversion, the electric push processing is typically performed by amplifying an output of the image sensor of the imaging apparatus using an analogue circuit. Japanese Unexamined Patent Publication No. 2002-135651 describes one technique of push processing, which is performed by switching the gain of an analogue amplifier circuit according to the ISO speed.

When the imaging apparatus obtains image signals using a solid-state image sensor, such as a CCD image sensor or a CMOS image sensor, the image signals have a small dynamic range. In this case, when capturing an image of a scene (subject) that has a large dynamic scene (for example, when capturing an image of a backlit person outdoors or when capturing an image of an outdoor landscape from indoors through a window), the imaging apparatus may fail to appropriately reproduce both of the dark portion and the bright portion of the subject as clear images because the luminance levels of the dark portion and the bright portion of the image greatly differ from each other.

To overcome this drawback, a second conventional imaging apparatus uses a solid-state image sensor that can control the charge storage time. The second conventional imaging apparatus superimposes a subject image formed through a long exposure and a subject image formed through a short exposure, and consequently obtains a subject image that has a large dynamic range (see, for example, Japanese Unexamined Patent Publication No. 2005-72965).

A third conventional imaging apparatus uses a solid-state image sensor that includes high-sensitivity pixels constituting a half of all the pixels of the image sensor and low-sensitivity pixels constituting the remaining half of the pixels. The third conventional imaging apparatus superimposes an image signal corresponding to a high-sensitivity pixel and an image signal corresponding to a low-sensitivity pixel, which have been generated through exposures performed for the same exposure time, and consequently obtains a subject image that has a large dynamic range (see, for example, Japanese Unexamined Patent Publication No. S59-210775).

However, the conventional imaging apparatus (first conventional imaging apparatus) is only designed to capture an image with a dynamic range of up to 200%, and compresses the dynamic range of the captured image to 100% through knee adjustment. When, for example, the conventional imaging apparatus is used to capture an image of a face of a backlit person with a blue sky background, the exposure light amount of the conventional imaging apparatus is set in a manner that the person's face will have an appropriate luminance level of 70%. In this case, the luminance level of highlights that the conventional imaging apparatus can handle without saturation (maximum luminance level) would be as low as about three times the luminance level of the person's face.

However, the dynamic range of a scene (subject) including a clear sky can be easily as high as several hundred percent or more. When the conventional imaging apparatus is used to capture an image of such a scene (subject), the light amount of the image sensor of the imaging apparatus may be saturated. In this case, the imaging apparatus fails to appropriately reproduce a high-luminance portion of the image, such as a clear sky portion.

The second conventional imaging apparatus obtains a subject image that has an increased dynamic range by using a subject image formed through a short exposure. However, the short exposure means a small exposure light amount. With the small exposure light amount, the amount of a signal generated by the solid-state image sensor is small. In this case, the S/N ratio of the image would be low. The third conventional imaging apparatus obtains a subject image with an increased dynamic range by using a signal corresponding to a low-sensitivity pixel. However, the amount of a signal corresponding to a low-sensitivity pixel is small. In this case, the S/N ratio of the image would be low in the same manner.

To solve the above problems, it is an object of the present invention to provide an imaging apparatus, an imaging method, an integrated circuit that functions as an imaging apparatus, and a computer-readable storage medium that stores a program used in an imaging apparatus for capturing an image of a scene (subject) having a large dynamic range (for example, a face of a backlit person with a blue sky background) without saturating a high-luminance portion (for example, a background sky portion) of the captured image.

SUMMARY OF THE INVENTION

A first embodiment of the present invention provides an imaging apparatus including an optical system, an A/D converter, a dynamic-range increasing unit, and a control unit.

The optical system adjusts an exposure light amount. The A/D converter converts an analogue signal that is obtained by the optical system to a digital signal. The dynamic-range increasing unit increases an output value of the digital signal with a dynamic range increase ratio. The control unit generates a signal for decreasing the exposure light amount and a signal for increasing the dynamic range increase ratio.

In this imaging apparatus, the dynamic-range increasing unit increases the output value of the image signal (digital image signal), which results from A/D conversion performed by the A/D converter, with the dynamic range increase ratio. Also, the control unit generates the signal for decreasing the exposure light amount and the signal for increasing the dynamic range increase ratio, which are used to control the exposure light amount and the dynamic range increase ratio. The imaging apparatus decreases the exposure light amount and increases the dynamic range increase ratio to prevent the signal value of the image signal (digital image signal), which results from A/D conversion, from being saturated and to enable the dynamic range increase to be performed effectively.

Thus, the imaging apparatus appropriately captures an image of even a scene (subject) with a large dynamic range (for example, a face of a backlit person with a blue sky background) without saturating a high-luminance portion (for example, a background sky portion) of the captured image.

A second embodiment of the present invention provides the imaging apparatus of the first of the present invention further including a dynamic-range compression unit. The dynamic-range compression unit compresses the increased value of the digital signal to a value that is within a predetermined range.

This imaging apparatus compresses the digital signal to a signal within a predetermined range.

A third embodiment of the present invention provides the imaging apparatus of the second of the present invention further including a peak detection unit. The peak detection unit detects a maximum value (or peak value) of image data corresponding to one image that is formed using the digital signal. The dynamic-range compression unit compresses the increased value of the digital signal in a manner that the maximum value will be a maximum value of the predetermined range.

This imaging apparatus effectively performs the dynamic range compression.

The "one image" refers to an image corresponding to one screen that is displayed on a display based on digital signals. For example, the "one image" may be an image corresponding to one frame or an image corresponding to one field.

A fourth embodiment of the present invention provides the imaging apparatus of one of the first to third embodiments of the present invention in which the control unit generates a signal for adjusting the exposure light amount according to a maximum value of image data.

This imaging apparatus efficiently adjusts the exposure light amount. A fifth embodiment of the present invention provides the imaging apparatus of one of the first to fourth embodiments of the present invention further including a representative value detection unit. The representative value detection unit detects a representative value of a predetermined portion of image data corresponding to one image that is formed using the digital signal. The control unit generates a signal for adjusting the exposure light amount according to the representative value.

Although it is preferable that the imaging apparatus detects the representative value of the predetermined portion of the "image data corresponding to one image", the present invention should not be limited to such a structure. For example, the imaging apparatus may detect a representative value of a predetermined portion of a "part of image data corresponding to one image" (for example, an image portion into which image data corresponding to one image is divided).

A sixth embodiment of the present invention provides the imaging apparatus of one of the first to fourth embodiments of the present invention further including a representative value detection unit. The representative value detection unit detects a representative value of a predetermined portion of image data corresponding to one image that is formed using the digital signal. The control unit generates a signal for adjusting the dynamic range increase ratio according to the representative value.

A seventh embodiment of the present invention provides the imaging apparatus of one of the first to fourth embodiments of the present invention further including a face detection processing unit. The face detection processing unit extracts a representative value of a digital signal corresponding to a face portion of image data that is formed using the digital signal. The dynamic-range increasing unit adjusts the dynamic range increase ratio according to the representative value. The "face portion" refers to an image portion in which a "face" is displayed in an image formed using digital signals.

An eighth embodiment of the present invention provides the imaging apparatus of one of the second to seventh embodiments of the present invention in which the dynamic-range compression unit includes a vicinity luminance detection unit and a dynamic tone correction unit. The vicinity luminance detection unit extracts a vicinity luminance value of a digital signal corresponding to a predetermined position. The dynamic tone correction unit converts an input value that is a value of the digital signal corresponding to the predetermined position using a conversion characteristic with which the input value is converted to an output value that changes according to the vicinity luminance value of the digital signal corresponding to the predetermined position, and outputs the output value resulting from the conversion.

The "digital signal corresponding to the predetermined position" refers to a signal corresponding to a portion (a pixel or a pixel block) of one image formed using the digital signal corresponding to a predetermined position. The "vicinity luminance value of the digital signal corresponding to the predetermined position" refers to a value indicating a luminance level of a plurality of pixels (or a pixel block) that are in the vicinity of the coordinates P (x, y), which correspond to the predetermined position on the image that is formed using the digital signal. The "vicinity luminance value" may be, for example, an average value or a weighted average value of values indicating luminance levels of a plurality of pixels (or a pixel block) that are in the vicinity of the coordinates P (x, y).

A ninth embodiment of the present invention provides the imaging apparatus of the eighth of the present invention in which in a range where the input value of the digital signal corresponding to the predetermined position is substantially equal to the vicinity luminance value, an amount of change by which the output value that depends on the conversion characteristic changes with respect to the input value of the digital signal is greater than or equal to an amount of change indicated by a gradient of a straight line that is drawn on a point of an input and output characteristic graph of the conversion characteristic representing the value of the digital signal corresponding to the predetermined position and a point of origin of the input and output characteristic graph of the conversion characteristic.

With this conversion characteristic, the imaging apparatus increases the contrast of a local area (local contrast) on the image that is formed using the digital signal. The imaging apparatus compresses the dynamic range of a digital signal but obtains the digital signal that effectively prevents the contrast from being lowered.

A tenth embodiment of the present invention provides the imaging apparatus of the eighth of the present invention in which when m=x, where x is the value of the digital signal corresponding to the predetermined position and m is the vicinity luminance value, the conversion characteristic expressed using a quadratic function f (x, m) satisfies $\partial f(x, m)/\partial x \geq (f(x, m)/x)$.

With this conversion characteristic, the imaging apparatus increases the contrast of a local area (local contrast) on the image that is formed using the digital signal. The imaging apparatus compresses the dynamic range of a digital signal but obtains the digital signal that effectively prevents the contrast from being lowered.

An eleventh embodiment of the present invention provides the imaging apparatus of the eighth to tenth embodiments of the present invention in which the dynamic tone correction unit is a two-dimensional lookup table storing, as data, an output value that is determined by the value of the digital signal and the vicinity luminance value.

A twelfth embodiment of the present invention provides the imaging apparatus of the eleventh of the present invention in which the control unit generates a signal for decreasing the exposure light amount and a signal for increasing the dynamic range increase ratio, and stores conversion characteristic data that is determined by the dynamic range increase ratio into the lookup table.

A thirteenth embodiment of the present invention provides the imaging apparatus of one of the eighth to eleventh embodiments of the present invention further including a range adjustment unit. The range adjustment unit receives the digital signal whose dynamic range has been increased by the dynamic-range increasing unit, and converts the value of the received digital signal to a value that is within an input range of the dynamic range compression unit when the value of the received digital signal is greater than a predetermined value.

A fourteenth embodiment of the present invention provides the imaging apparatus of one of the eighth to eleventh embodiments of the present invention further including a peak adjustment unit. The peak adjustment unit adjusts the value of the digital signal in a manner that a maximum value of image data that is formed using the digital signal whose dynamic range has been increased by the dynamic-range increasing unit is adjusted to a maximum value of an input range of the dynamic-range compression unit.

A fifteenth embodiment of the present invention provides an imaging apparatus including an optical system, a light amount adjustment unit, an imaging unit, an A/D converter, a drive unit, and a dynamic-range increasing unit. The optical system focuses light from a subject. The light amount adjustment unit adjusts an amount of light that is incident on the optical system. The imaging unit reads an optical image of the subject that is formed with the light focused by the optical system, and outputs the read optical image as an image signal that is used to form an image including pixels. The A/D converter converts an analogue image that is output from the imaging unit to a digital image. The drive unit drives the imaging unit in a manner that the imaging unit obtains a plurality of analogue images through a plurality of sequential divisional exposures each of which is performed for an identical exposure time. A total exposure time of the divisional exposures is equal to a predetermined exposure time. The dynamic-range increasing unit increases a dynamic range of corresponding pixels of a plurality of digital images resulting from conversion of the plurality of analogue images performed by the A/D converter and adds up the corresponding pixels of the digital images to form an image with an increased dynamic range, and outputs the image with the increased dynamic range.

This imaging apparatus divides the predetermined exposure time and sequentially performs the plurality of divisional exposures. This shortens the exposure time of each exposure and reduces the exposure light amount, and reduces an output of the imaging unit. In this case, analogue images obtained by the imaging unit are dark. Thus, outputs resulting from A/D conversion corresponding to even a bright portion of the subject are less likely to be saturated. Also, this imaging apparatus increases the dynamic range of each pixel of the digital images, which have been obtained through the plurality of divisional exposures, and adds up the same pixels of the different digital images to form an image with an increased dynamic range (dynamic-range-increased image), and outputs the dynamic-range-increased image. In this manner, the imaging apparatus obtains the output image without saturating the output image. The imaging apparatus increases the luminance level of the dark images to the luminance level of the output image, which is as bright as an image that would be obtained through the exposure performed for the predetermined exposure time. As a result, the imaging apparatus appropriately captures a large dynamic range image while preventing the S/N ratio of the image from deteriorating.

As a result, the imaging apparatus appropriately captures an image of a scene including a backlit person outdoors without saturating a bright portion of the image, such as a cloud or sky portion, even when a dark portion of the image, such as a person's face portion, is corrected to have an appropriate luminance level.

A sixteenth embodiment of the present invention provides the imaging apparatus of the fifteenth of the present invention further including a dynamic-range compression unit that performs dynamic range compression of nonlinearly compressing the increased dynamic range of the image output from the dynamic-range increasing unit to a predetermined dynamic range.

This imaging apparatus can have an output that complies with a video signal format (for example, JPEG or MPEG), and can have an output whose whitest point of the display has a luminance level of 100%, which is a reference luminance level defined by the video signal format.

A seventeenth embodiment of the present invention provides the imaging apparatus of one of the fifteenth and sixteenth embodiments of the present invention in which the dynamic-range increasing unit has an output dynamic range that is at least greater than an input dynamic range.

This imaging apparatus obtains an output with an increased dynamic range without saturating the output.

An eighteenth embodiment of the present invention provides the imaging apparatus of the sixteenth of the present invention in which the dynamic-range compression unit compresses the increased dynamic range of the image using a conversion characteristic that changes according to a vicinity luminance value of the image signal.

This imaging apparatus uses the conversion characteristic that enables an appropriate output to be obtained for a dark portion and for a bright portion of the subject. Even when the dynamic range of an image is increased to 1000% or more, the increased dynamic range of the image can be compressed to 100% or less without visually degrading the increased large dynamic range of the image.

A nineteenth embodiment of the present invention provides the imaging apparatus of one of the fifteenth to eighteenth embodiments of the present invention in which, before the imaging unit is subjected to the plurality of divisional exposures, the light amount adjustment unit adjusts the amount of light that is incident on the optical system in a manner that a main portion of the subject will have a predetermined luminance level through an exposure performed for the predetermined exposure time.

This imaging apparatus performs the plurality of divisional exposures after adjusting the light amount in a manner that a main portion of the subject will have an optimal luminance level. Thus, the imaging apparatus performs the dynamic range increase in a manner that, for example, a person's face portion of the image will have an optimal luminance level without saturating a bright portion of the image, such as a sky or cloud portion.

A twentieth embodiment of the present invention provides the imaging apparatus of one of the fifteenth to nineteenth embodiments of the present invention further including an apparatus-movement detection unit. The apparatus-movement detection unit detects a degree and a direction of an image shift caused by movement of the imaging apparatus between two different digital images among the plurality of digital images. The dynamic-range increasing unit shifts the digital images in a direction to eliminate the image shift according to the degree and the direction of the image shift detected by the apparatus-movement detection unit, and adds up the corresponding pixels of the digital images.

This imaging apparatus further reduces image shifts between a plurality of digital images, which have been obtained through the divisional exposures. As a result, the imaging apparatus effectively uses images that are less likely to be affected by apparatus movement (images obtained through short exposures), and obtains a dynamic-range-increased image with reduced image shifts caused by apparatus movement.

A twenty first embodiment of the present invention provides the imaging apparatus of the twentieth of the present invention further including a subject-movement detection unit. The subject-movement detection unit detects movement of the subject in a local area on the digital images by comparing corresponding pixels of the two different digital images in which the image shift caused by the movement of the imaging apparatus has been eliminated. When the movement of the subject is detected by the subject-movement detection unit, the dynamic-range increasing unit excludes the corresponding pixels of the different digital images having the movement of the subject from the pixels of the digital images that are added up.

This imaging apparatus further excludes pixels included in a local area in which movement of the subject has occurred, and obtains an image with reduced image shifts caused by subject movement. When the dynamic-range increasing unit excludes some of the pixels, the dynamic-range increasing unit may adjust the light amount of an image that is formed by adding up the pixels of the images. When, for example, the dynamic-range increasing unit excludes one of the four pixels (in other words, the dynamic-range increasing unit adds up only three pixels), the dynamic-range increasing unit may multiply the addition result of the three pixels by $4/3$ to adjust the luminance level (adjust the pixel values) of the image.

A twenty-second embodiment of the present invention provides the imaging apparatus of one of the fifteenth to nineteenth embodiments of the present invention further including a subject-movement detection unit. The subject-movement detection unit detects movement of the subject in a local area on two different digital images among the plurality of digital images by comparing corresponding pixels of the two different digital images. When the movement of the subject is detected by the subject-movement detection unit, the dynamic-range increasing unit excludes the corresponding pixels of the different digital images having the movement of the subject from the pixels of the digital images that are added up.

This imaging apparatus further excludes pixels included in a local area in which subject movement has occurred, and obtains an image with reduced image shifts caused by subject movement.

A twenty-third embodiment of the present invention provides the imaging apparatus of one of the fifteenth to nineteenth embodiments of the present invention further including a subject-movement detection unit. The subject-movement detection unit obtains a plurality of digital images in which movement of the imaging apparatus has been corrected, and detects movement of the subject in a local area on the digital images by comparing corresponding pixels of the two different digital images in which the image shift caused by the movement of the imaging apparatus has been eliminated. When the movement of the subject is detected by the subject-movement detection unit, the dynamic-range increasing unit excludes the corresponding pixels of the different digital images having the movement of the subject from the pixels of the digital images that are added up.

This imaging apparatus effectively uses a plurality of digital images in which apparatus movement has been corrected, and compares digital images whose image shifts caused by apparatus movement have been eliminated.

A twenty-fourth embodiment of the present invention provides the imaging apparatus of the twenty third of the present invention in which the subject-movement detection unit detects the movement of the subject using the plurality of digital images in which movement of the imaging apparatus has been corrected by means of optical correction.

This imaging apparatus further effectively uses a plurality of digital images in which image shifts caused by apparatus movement are corrected by means of optical correction. The optical correction of apparatus movement eliminates the need to set areas for apparatus movement detection within the imaging area of the imaging unit (image sensor), and enables the imaging area of the imaging unit (image sensor) to be used effectively.

A twenty-fifth embodiment of the present invention provides the imaging apparatus of the twentieth of the present invention further including a subject-movement detection unit and a coordinate conversion unit. The subject-movement detection unit detects movement of the subject in a local area on the digital images by comparing corresponding pixels of two different digital images among the plurality of digital images whose image shift caused by the apparatus movement has been eliminated. The coordinate conversion unit converts coordinates of corresponding pixels of different digital images having the movement of the subject detected by the subject-movement detection unit to eliminate the movement of the subject. The dynamic-range increasing unit uses, as the pixels of the digital images that are added up, pixels that are at coordinates obtained by the coordinate conversion unit through conversion of the coordinates of the pixels.

This imaging apparatus further corrects pixels included in a local area in which subject movement has been detected, and obtains an image with reduced image shifts caused by subject movement.

A twenty-sixth embodiment of the present invention provides the imaging apparatus of the twenty fifth of the present invention further including a subject-movement determination unit. The subject-movement determination unit determines whether the movement of the subject will be eliminated by converting the coordinates of the pixels. When the subject-movement determination unit determines that the movement of the subject will not be eliminated by converting the coordinates of the pixels, the dynamic-range increasing unit excludes the pixels having the movement of the subject from the pixels of the digital images that are added up.

This imaging apparatus also excludes an image portion in which a part of the subject cannot be detected. When, for example, a hand of the subject is hidden behind the subject, the imaging apparatus excludes pixels included in an image portion corresponding to the hand from the pixels that are added up.

A twenty-seventh embodiment of the present invention provides an imaging apparatus including an optical system, a light amount adjustment unit, an imaging unit, an A/D converter, a drive unit, and a dynamic-range increasing unit. The optical system focuses light from a subject. The light amount adjustment unit adjusts an amount of light that is incident on the optical system. The imaging unit reads an optical image of the subject that is formed with the light focused by the optical system, and outputs the read optical image as an image signal that is used to form an image including pixels. The A/D converter converts an analogue image that is output from the imaging unit to a digital image. The drive unit drives the imaging unit in a manner that the imaging unit obtains a plurality of analogue images through a plurality of sequential divisional exposures that are performed to prevent an output of the A/D converter from being saturated. The dynamic-range increasing unit increases a dynamic range of corresponding pixels of a plurality of digital images resulting from conversion of the plurality of analogue images performed by the A/D converter and adds up the corresponding pixels of the digital images to form an image with an increased dynamic range, and outputs the image with the increased dynamic range.

This imaging apparatus sequentially performs the plurality of divisional exposures. In this case, analogue images obtained through the divisional exposures are dark. Thus, outputs resulting from A/D conversion corresponding to even a bright portion of the subject are less likely to be saturated. Also, the imaging apparatus increases the dynamic range of each pixel of the digital images, which have been obtained through the plurality of exposures, and adds up the same pixels of the different digital images to form an image with an increased dynamic range (increased-dynamic range image), and outputs the increased-dynamic-range image. In this manner, the imaging apparatus obtains the output image with the increased dynamic range without saturating the output image. The imaging apparatus increases the luminance level of the dark images to the luminance level of the output increased-dynamic-range image, which is as bright as an image that would be obtained through the exposure performed for the predetermined exposure time. As a result, the imaging apparatus appropriately captures a large dynamic range image while preventing the S/N ratio of the image from deteriorating. The imaging apparatus appropriately captures an image of a scene including a backlit person outdoors without saturating a bright portion of the image, such as a cloud or sky portion, even when a dark portion of the image, such as a person's face portion, is corrected to have an appropriate luminance level.

A twenty-eighth embodiment of the present invention provides an imaging method used in an imaging apparatus that includes an optical system, a light amount adjustment unit, an imaging unit, an A/D converter, and a digital signal processing unit. The optical system focuses light from a subject. The light amount adjustment unit adjusts an amount of light that is incident on the optical system. The imaging unit reads an optical image of the subject that is formed with the light focused by the optical system and outputs the read optical image as an image signal that is used to form an image including pixels. The A/D converter converts an output of the imaging unit through analogue-to-digital conversion. The digital signal processing unit adjusts an output value of the A/D converter. The imaging method includes a light amount decreasing process and a dynamic range increasing process.

In the light amount decreasing process, the amount of light is decreased using the light amount adjustment unit. In the dynamic range increasing process, a dynamic range of an output of the A/D converter is increased linearly with an increase that is set according to the decreased amount of light using the digital signal processing unit.

A twenty-ninth embodiment of the present invention provides an imaging method used in an imaging apparatus including an optical system that focuses light from a subject, a light amount adjustment unit that adjusts an amount of light that is incident on the optical system, an imaging unit that reads an optical image of the subject that is formed with the light focused by the optical system and outputs the read optical image as an image signal that is used to form an image including pixels, and an A/D converter that converts an analogue image that is output from the imaging unit to a digital image. The method includes a drive process and a dynamic range increasing process. In the drive process, the imaging unit is driven in a manner that the imaging unit obtains a plurality of analogue images through a plurality of sequential divisional exposures each of which is performed for an identical exposure time. A total exposure time of the divisional exposures is equal to a predetermined exposure time. In the dynamic range increasing process, a dynamic range of corresponding pixels of a plurality of digital images resulting from conversion of the plurality of analogue images performed by the A/D converter is increased and the corresponding pixels of the digital images are added up to form an image with an increased dynamic range, and the image with the increased dynamic range is output.

A thirtieth embodiment of the present invention provides an imaging method used in an imaging apparatus including an optical system that focuses light from a subject, a light amount adjustment unit that adjusts an amount of light that is incident on the optical system, an imaging unit that reads an optical image of the subject that is formed with the light focused by the optical system and outputs the read optical image as an image signal that is used to form an image including pixels, and an A/D converter that converts an analogue image that is output from the imaging unit to a digital image. The method includes a drive process and a dynamic-range increasing process. In the drive process, the imaging unit is driven in a manner that the imaging unit obtains a plurality of analogue images through a plurality of sequential divisional exposures that are performed to prevent an output of the A/D converter from being saturated. In the dynamic-range increasing process, a dynamic range of corresponding pixels of a plurality of digital images resulting from conversion of the plurality of analogue images performed by the A/D converter is increased and the corresponding pixels of the digital images are added up to form an image with an increased dynamic range, and the image with the increased dynamic range is output.

A thirty-first embodiment of the present invention provides a computer-readable storage medium that stores a program executed by a control unit of an imaging apparatus that includes an optical system, a light amount adjustment unit, an imaging unit, an A/D converter, a digital signal processing unit, and the control unit. The optical system focuses light from a subject. The light amount adjustment unit adjusts an amount of light that is incident on the optical system. The imaging unit reads an optical image of the subject that is formed with the light focused by the optical system and outputs the read optical image as an image signal that is used to form an image including pixels. The A/D converter converts an output of the imaging unit through analogue-to-digital conversion. The digital signal processing unit adjusts an output value of the A/D converter. The control unit controls the light amount adjustment unit and the digital signal processing unit. The program enables the control unit to generate a signal for decreasing the light amount using the light amount adjustment unit, and to linearly increase a dynamic range of an output of the A/D converter with an increase that is set according to the decreased amount of light using the digital signal processing unit.

A thirty-second embodiment of the present invention provides a computer-readable storage medium that stores a program executed by a control unit of an imaging apparatus that includes an optical system, a light amount adjustment unit, an imaging unit, an A/D converter, a digital signal processing unit, and the control unit. The optical system focuses light from a subject. The light amount adjustment unit adjusts an amount of light that is incident on the optical system. The imaging unit reads an optical image of the subject that is formed with the light focused by the optical system and outputs the read optical image as an image signal that is used to form an image including pixels. The A/D converter converts an analogue image output from the imaging unit to a digital image. The digital signal processing unit adjusts an output value of the A/D converter. The control unit controls the light amount adjustment unit, the imaging unit, and the digital signal processing unit. The program enables the control unit to drive the imaging unit in a manner that the imaging unit obtains a plurality of analogue images through a plurality of sequential divisional exposures each of which is performed for an identical exposure time, a total exposure time of the divisional exposures being equal to a predetermined exposure time, and increase a dynamic range of corresponding pixels of a plurality of digital images resulting from conversion of the plurality of analogue images performed by the A/D converter and add up the corresponding pixels of the digital images to form an image with an increased dynamic range, and output the image with the increased dynamic range.

A thirty-third embodiment of the present invention provides an integrated circuit used in an imaging apparatus that includes an optical system, a light amount adjustment unit, an imaging unit, and an A/D converter. The optical system focuses light from a subject. The light amount adjustment unit adjusts an amount of light that is incident on the optical system. The imaging unit reads an optical image of the subject that is formed with the light focused by the optical system and outputs the read optical image as an image signal that is used to form an image including pixels. The A/D converter converts an output of the imaging unit through analogue-to-digital conversion. The integrated circuit includes a dynamic-range increasing unit that linearly increases an output of the A/D converter, and a control unit that adjusts an amount of light of the light amount adjustment unit by an amount contrary to an amount by which the output of the A/D converter is increased.

A thirty-fourth embodiment of the present invention provides an integrated circuit used in an imaging apparatus that includes an optical system, a light amount adjustment unit, an imaging unit, an A/D converter, and a drive unit. The optical system focuses light from a subject. The light amount adjustment unit adjusts an amount of light that is incident on the optical system. The imaging unit reads an optical image of the subject that is formed with the light focused by the optical system and outputs the read optical image as an image signal that is used to form an image including pixels. The A/D converter converts an analogue image output from the imaging unit to a digital image. The drive unit drives the imaging unit in a manner that the imaging unit obtains a plurality of analogue images through a plurality of sequential divisional exposures each of which is performed for an identical exposure time. A total exposure time of the divisional exposures is equal to a predetermined exposure time. The integrated circuit includes a dynamic-range increasing unit that increases a dynamic range of corresponding pixels of a plurality of digital images resulting from conversion of the plurality of analogue images performed by the A/D converter and adds up the corresponding pixels of the digital images to form an image with an increased dynamic range and outputs the image with the increased dynamic range.

A thirty-fifth embodiment of the present invention provides an integrated circuit used together with an optical system that focuses light from a subject. The integrated circuit includes a light amount adjustment unit, an imaging unit, an A/D converter, a drive unit, and a dynamic-range increasing unit.

The light amount adjustment unit adjusts an amount of light that is incident on the optical system. The imaging unit reads an optical image of the subject that is formed with the light focused by the optical system and outputs the read optical image as an image signal that is used to form an image including pixels. The A/D converter converts an analogue image output from the imaging unit to a digital image. The drive unit drives the imaging unit in a manner that the imaging unit obtains a plurality of analogue images through a plurality of sequential divisional exposures each of which is performed for an identical exposure time. A total exposure time of the divisional exposures is equal to a predetermined exposure time. The dynamic-range increasing unit increases a dynamic range of corresponding pixels of a plurality of digital images resulting from conversion of the plurality of analogue images performed by the A/D converter and adds up the corresponding pixels of the digital images to form an image with an increased dynamic range, and outputs the image with the increased dynamic range.

A thirty-sixth embodiment of the present invention provides an image processor used in an imaging apparatus. The image processor follows an instruction of a program stored in a storage unit to increase a dynamic range of an output value of a signal resulting from analogue-to-digital conversion with a dynamic range increase ratio, adjust the output value according to a maximum value of image data that is formed using the signal whose dynamic range has been increased, and obtain an output value using a conversion characteristic stored in a two-dimensional lookup table according to the adjusted image signal and a vicinity luminance value of the image signal.

The present invention provides an imaging apparatus, an imaging method, a computer-readable storage medium that stores a program, and an integrated circuit for appropriately capturing an image of even a scene (subject) with a large dynamic range (for example, a face of a backlit person with a blue sky background) without saturating a high luminance portion (for example, a background sky portion) of the captured image.

BRIEF DESCRIPTION OF THE DRAWINGS

FIGS. 32A and 32B are timing charts chronologically describing the operation of the imaging apparatus;

FIGS. 45A and 45B are diagrams describing apparatus movement correction and subject movement correction;

DETAILED DESCRIPTION OF THE INVENTION

An imaging apparatus according to embodiments of the present invention will now be described with reference to the drawings.

First Embodiment 1.1 Structure of the Imaging Apparatus

Figure 1:
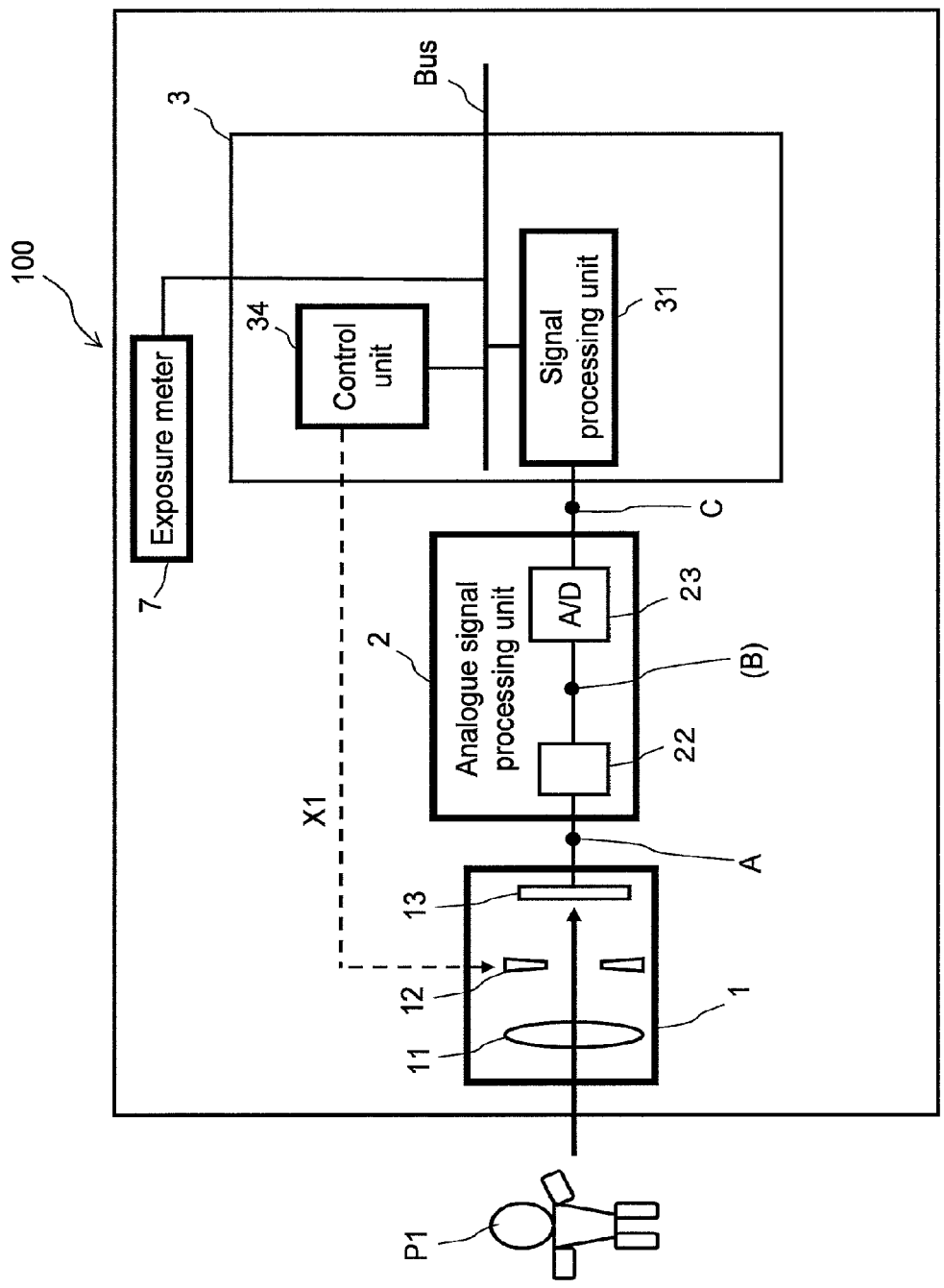
FIG. 1 shows main components of an imaging apparatus according to a first embodiment of the present invention.

FIG. 1 shows the structure of an imaging apparatus 100.

The imaging apparatus 100 includes an optical system 1, an analogue signal processing unit 2, a digital signal processing unit 3, and an exposure meter 7.

The optical system 1 includes an imaging lens 11, an aperture 12, and an imaging unit 13. The imaging lens 11 focuses light from a subject P1. The aperture 12 adjusts the amount of reflection light from the subject P1, which has been focused through the imaging lens 11. The imaging unit 13 outputs an image signal A according to the adjusted light amount (light amount adjusted by the aperture 12) and the light accumulation time.

The analogue signal processing unit 2 includes a correlated double sampling (CDS) circuit 21 and an analogue-to-digital (A/D) converter 23.

The A/D converter 23 converts analogue image (video) signals to 12-bit digital image (video) signals (signals C) corresponding to pixels having levels of tone ranging from 0 to 4095, and outputs the digital image (video) signals. For ease of explanation, the imaging apparatus 100 includes a gain control amplifier (GCA) 22 as shown in FIG. 1. However, the GCA 22 is not an essential component of the imaging apparatus 100. The GCA 22 may include the CDS circuit.

The digital signal processing unit 3 includes a signal processing unit 31. The processing units of the digital signal processing unit 3 include a flash illumination control unit, a codec (coder/decoder), a card I/F and a display control unit, and a control unit 34. The control unit 34 controls the operations of all or some of the other processing units of the digital signal processing unit 3.

The functional blocks of the imaging apparatus 100 may be connected to one another by a bus as shown in FIG. 1.

1.1.1 Structure of the Signal Processing Unit 31

Figure 2:
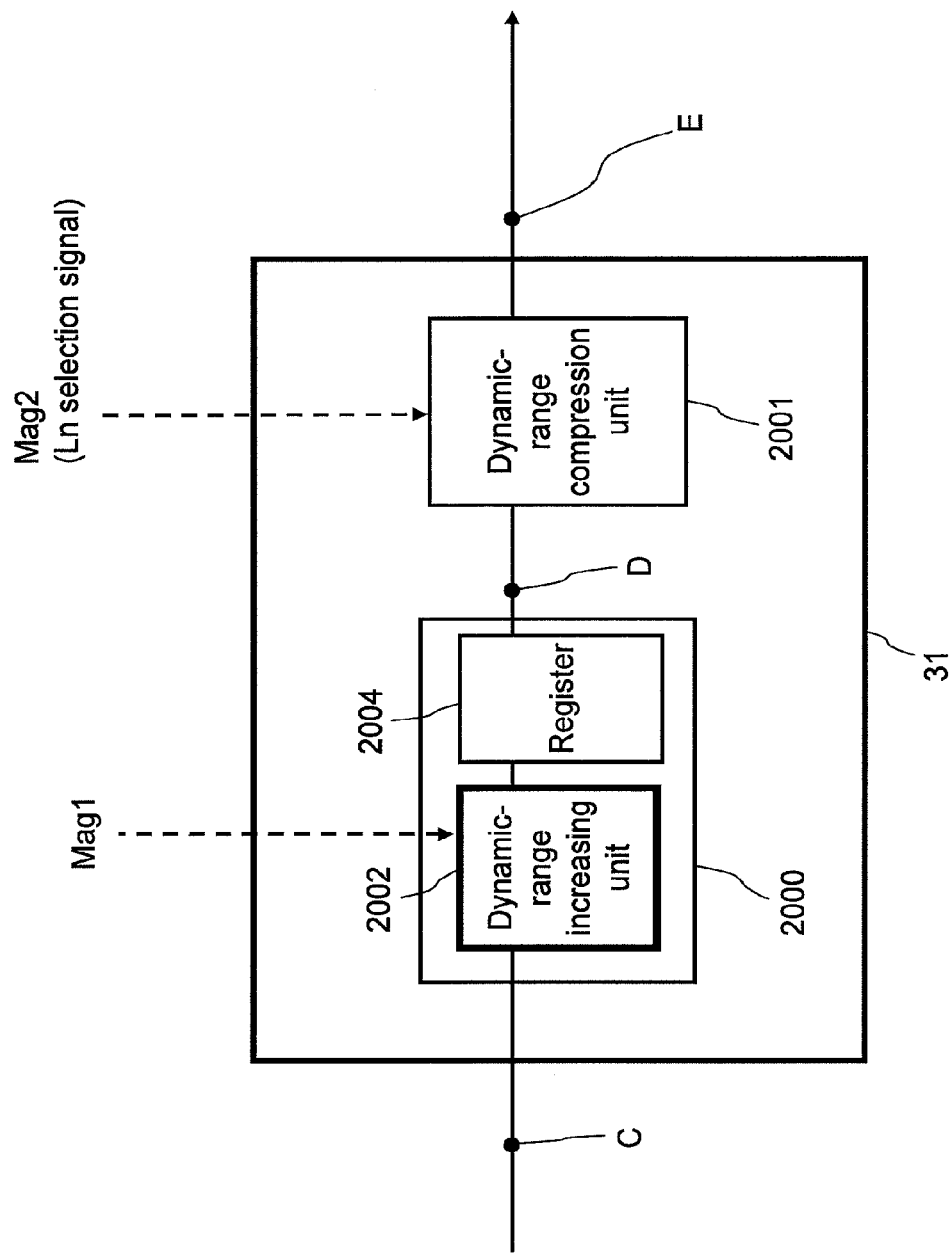
FIG. 2 shows main components of a signal processing unit 31.

FIG. 2 shows the structure of the signal processing unit 31. The signal processing unit 31 includes a dynamic-range increasing processing unit 2000 and a dynamic-range compression unit 2001. The dynamic-range increasing processing unit 2000 includes a dynamic-range increasing unit 2002 and a register 2004.

The dynamic-range increasing unit 2002 is specifically formed by a digital multiplier. The dynamic-range increasing unit 2002 multiplies output signals (signals C) of the analogue signal processing unit 2 with a predetermined dynamic range increase ratio (for example, 2 or 4), and stores the multiplication result into the register 2004. The dynamic range increase ratio is set at a smaller value based on a signal Mag1 as the value of the aperture of the optical system is set smaller (or as the received light amount, which is measured with the exposure meter, is set smaller by controlling the shutter speed etc.). When, for example, the value of the aperture 12 is set at ½, the dynamic range increase ratio is set at 2. When, for example, the value of the aperture 12 is set at ¼, the dynamic range increase ratio is set at 4.

The register 2004 is a storage unit for storing the multiplication result of the output resolution (12 bits) of the A/D converter 23 and the maximum value (for example, 8) of the dynamic range increase ratio while maintaining the resolution of the multiplication result. The output (signal C) of the A/D converter 23 is assumed to have 12 bits representing a dynamic range of 150%. In this case, when the maximum value of the dynamic range increase ratio is 8, the signals, whose dynamic range has been increased, have 15 bits representing a dynamic range of 1200%. In this case, the register 2004 may be formed by a 15-bit register that can store the theoretical maximum value of the multiplication. Alternatively, the register 2004 may be formed by a memory that can store a plurality of signals (for example, signals corresponding to one image (one frame)) while assuming the resolution of the 15-bit register as one unit.

The dynamic-range compression unit 2001 converts the multiplication result (signals D) stored in the register 2004 using a predetermined conversion characteristic to signals E, and outputs the signals E. The conversion characteristic is determined based on a signal Mag2, which corresponds to the set aperture value of the optical system.

Examples of the compression characteristic used in dynamic-range compression, which are selectively used by the dynamic-range compression unit 2001, will now be described with reference to FIG. 3.

Figure 3:
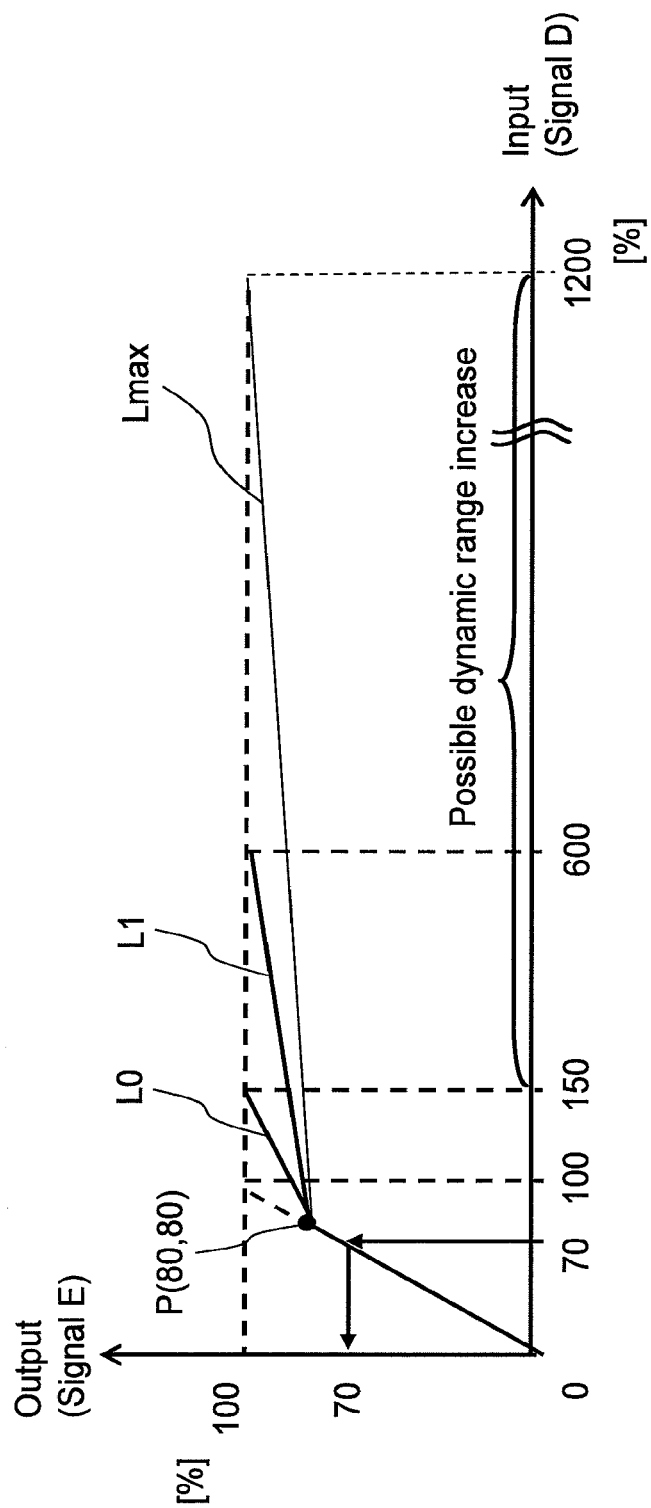
FIG. 3 shows examples of compression characteristics used in dynamic range compression, which are selected by a dynamic-range compression unit 2001.

The horizontal axis in FIG. 3 indicates an input dynamic range (%), which is the dynamic range of input signals D. The maximum dynamic range of an input signal that can be stored in the register 2004 is 1200%. The vertical axis in FIG. 3 indicates an output dynamic range (%), which is the dynamic range of output signals E.

According to conversion characteristics L0 to Lmax, the input and the output are the same when the input value is smaller than or equal to a value corresponding to point P (80%). According to these conversion characteristics, the value of each output signal E changes according to the value of its input signal when the input value is greater than 80%.

The dynamic-range compression unit 2001 selects the conversion characteristic L0 based on a selection signal Mag2 when the value of the aperture 12 is set at 1 as described above. The dynamic-range compression unit 2001 selects the conversion characteristic L1, with which the dynamic range of up to four times can be output, when the value of the aperture 12 is set at ¼. The dynamic-range compression unit 2001 selects the conversion characteristic Lmax, with which the dynamic range of up to eight times can be output, when the value of the aperture 12 is set at ⅛. In the first embodiment, as shown in FIG. 3, the dynamic range of a signal may be increased within a range from the input maximum dynamic range (150%) corresponding to the conversion characteristic L0 to the input maximum dynamic range (1200%) corresponding to the conversion characteristic Lmax.

1.2 Operation of the Imaging Apparatus

The operation of the imaging apparatus 100 will now be described.

In the imaging apparatus 100, the control unit 34 sets the value of the aperture 12 at a predetermined value (for example, ⅛). The aperture value is preset based on an output value of the exposure meter 7 or by the user setting.

The control unit 34 sets the dynamic range increase ratio of the dynamic-range increasing unit 2002 at 8 (the inverse of the aperture value ⅛) based on a control signal Mag1. Based on a control signal Mag2, the control unit 34 selects the conversion characteristic Lmax, which is used by the dynamic-range compression unit 2001.

When the imaging apparatus 100 starts operating, the imaging unit 13 obtains signals A, whose value depends on the value (aperture value) of the aperture 12. The analogue signal processing unit 2 then converts the signals A through A/D conversion to signals C, and outputs the signals C. The signals C are input into the signal processing unit 31 shown in FIG. 2, and are multiplied by a predetermined dynamic range increase ratio of, for example, 8. As a result, signals D are generated and output. The output signals D have a value less than or equal to a value corresponding to the maximum dynamic range of 1200%. The output signals D can be stored in the register 2004 without overflow.

With the conversion characteristic Lmax, the signals D are eventually converted to output signals E. The output signals E, whose value depends on the value of the output signals D, are then output.

The imaging apparatus 100 and the signal processing unit 31 in the first embodiment perform the processing described above.

1.3 Advantageous Effects of the Imaging Apparatus

The advantageous effects of the imaging apparatus 100 will now be described in comparison with a conventional imaging apparatus.

Conventional Imaging Apparatus

Figures 4A, 4B:
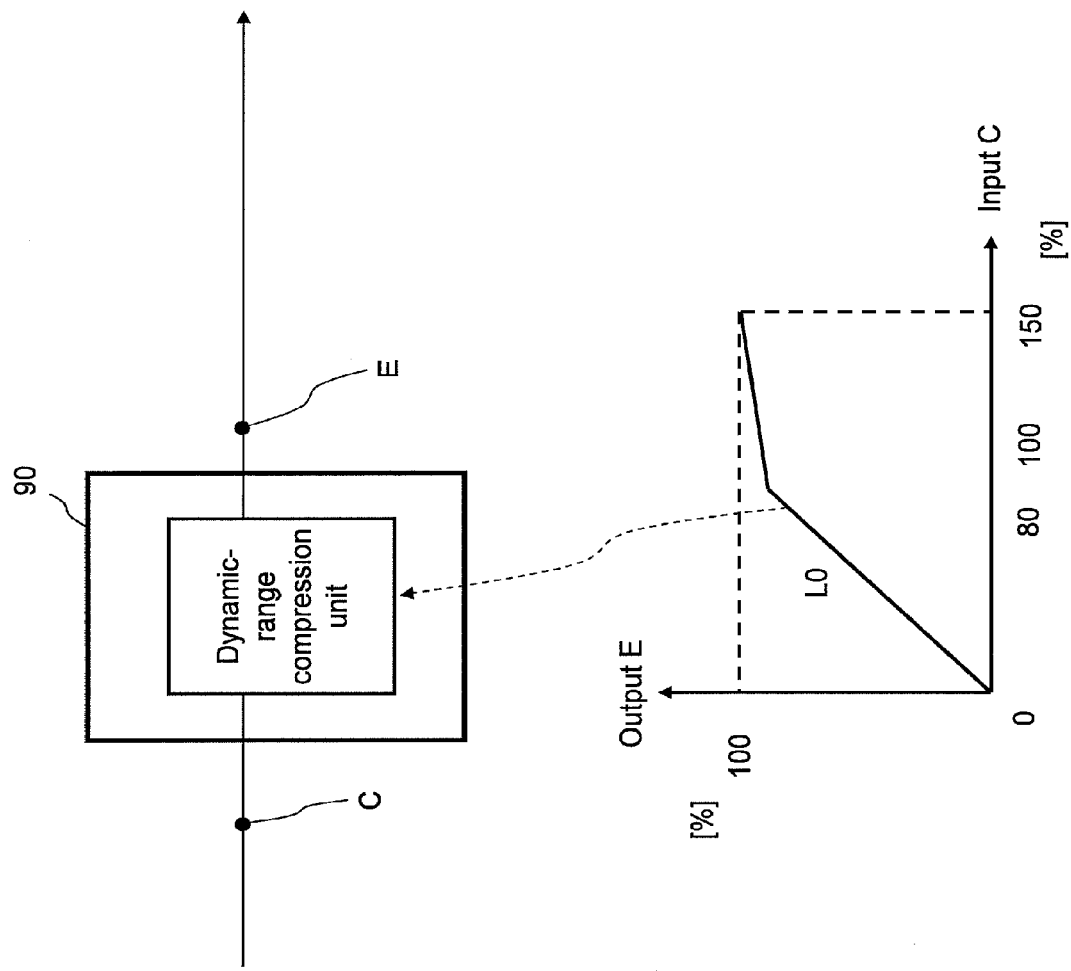
FIG. 4A shows a signal processing unit 90 included in a conventional imaging apparatus.
FIG. 4B shows a conversion characteristic used in dynamic range compression.

FIG. 4A shows a signal processing unit 90 included in the conventional imaging apparatus. FIG. 4B shows a conversion characteristic used in dynamic-range compression performed by the conventional imaging apparatus. The conventional signal processing unit 90 shown in FIGS. 4A and 4B differs from the signal processing unit 31 included in the imaging apparatus 100 in the following points. The signal processing unit 90 does not include the dynamic-range increasing unit 2002 and the register 2004. The signal processing unit 90 has only the single conversion characteristic. The signal processing unit 90 has an input value range of as small as 150%.

First Conventional Technique

Figure 5:
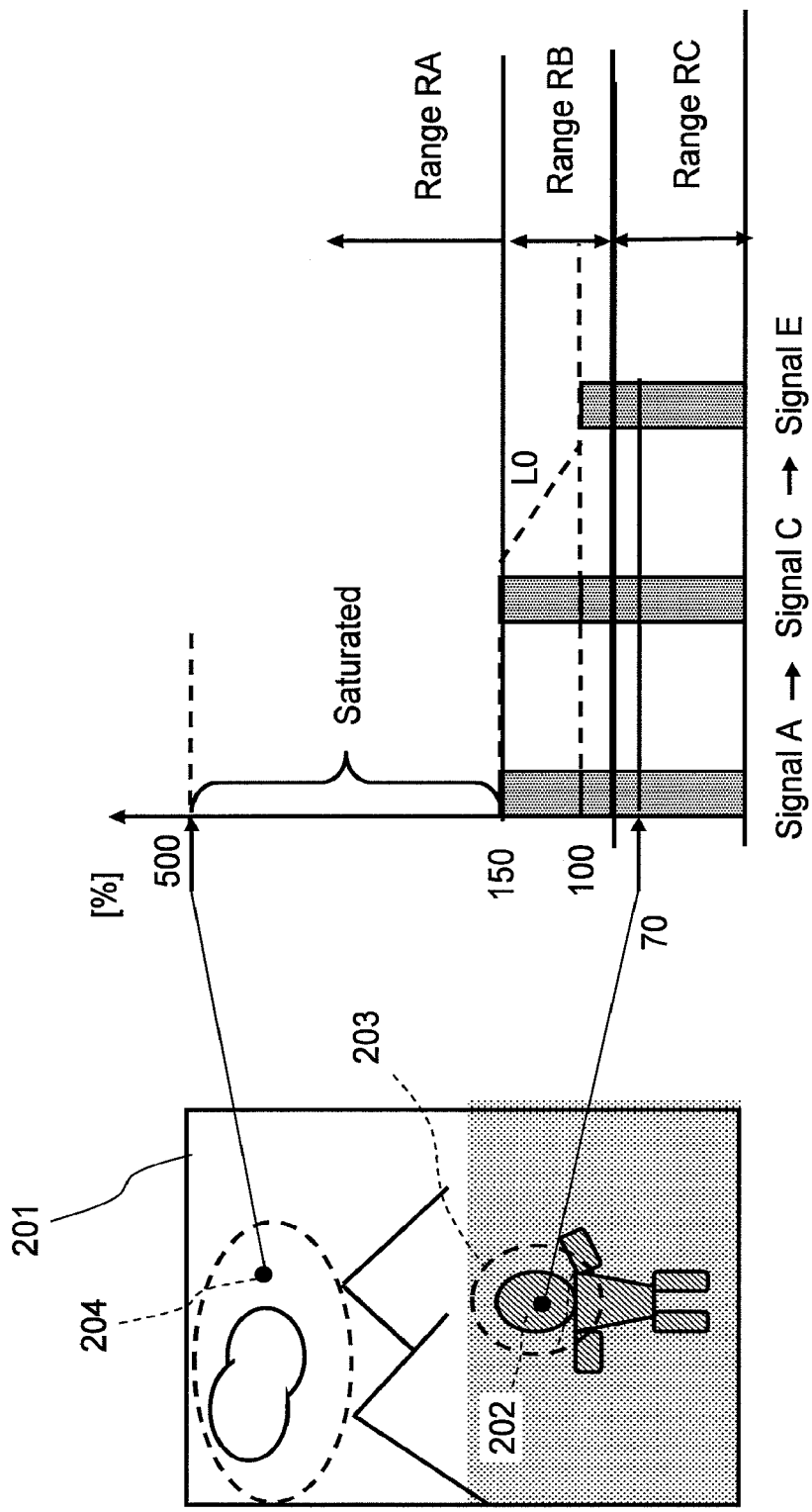
FIG. 5 is a diagram describing a predetermined image scene 201 and the dynamic range of signals corresponding to different portions of the scene.

FIG. 5 shows signal values that change when the conventional imaging apparatus shown in FIG. 4B compresses the dynamic range of signals corresponding to a predetermined scene using the dynamic-range compression characteristic of the conventional imaging apparatus.

The left part of FIG. 5 shows the structure of the predetermined scene 201.

A point 204 is included in a cloud and sky portion of the scene 201. A point 202 is a predetermined point included in a face portion of the scene 201. A portion 203 is a main subject portion of the scene 201. Hereafter, the point 204 included in the cloud and sky portion is assumed to have a value of a brightest portion of the scene 201.

The exposure condition of the imaging apparatus is set in a manner that output signals corresponding to the main subject portion 203 will have a luminance level of 70% with respect to a possible dynamic range (150%) of an output signal. This exposure condition is referred to as the "exposure condition 1".

Under the exposure condition 1, signals A (signals at point A in FIG. 1) (the same applies hereafter) corresponding to the point 204, which actually have a luminance level of 500%, are saturated. With any signal processing, signals C corresponding to the sky 204 (the point 204) of an image resulting from digital conversion of the signals A will be saturated. This is because signal values within a range RA shown in the right part of FIG. 5 would never be recovered in subsequent processing. Among signals A, signals with a dynamic range of 150% and less (within ranges RB and RC) are converted through A/D conversion to signals C while maintaining their luminance level and without being saturated. The signals C are then subjected to dynamic range compression using the conversion characteristic shown in FIG. 4B. The signals C that are within the range RC are output as signals E with an appropriate luminance level of 70%.

However, the conventional technique fails to achieve an appropriate luminance level of the face portion 202 (for example, a luminance level of 70%) (object 1) and at the same time fails to prevent values of the point 204 included in the sky and cloud portion and its vicinity portion from being saturated (object 2).

Second Conventional Technique

The second conventional technique limits the exposure light amount to prevent signals A within the range RA (range of light amounts of 150% or more) in FIG. 3 from being saturated. For example, the conventional imaging apparatus may use the exposure condition 1 and additionally set the exposure light amount of the optical system to ¼. This exposure condition is referred to as the "exposure condition 2".

In this case, signals A corresponding to the point 204 in FIG. 5 have a value of 125%. Thus, even the signals A corresponding to the brightest portion are not saturated. However, under the exposure condition 2, the conventional technique fails to obtain output signals E with an appropriate luminance level (for example, a luminance level of 70%) corresponding to the face point 202 (object 1) although the conventional technique successfully prevents signals corresponding to the sky and cloud portion 204 (point 204) from being saturated (object 2).

Third Conventional Technique

The exposure condition 2 used with the second conventional technique is similar to an exposure condition used for a dark scene with an insufficient exposure light amount. Push processing, which is applied to image signals obtained under an exposure condition for a dark scene with an insufficient light amount, may be applied to the exposure condition 2.

Figure 6:
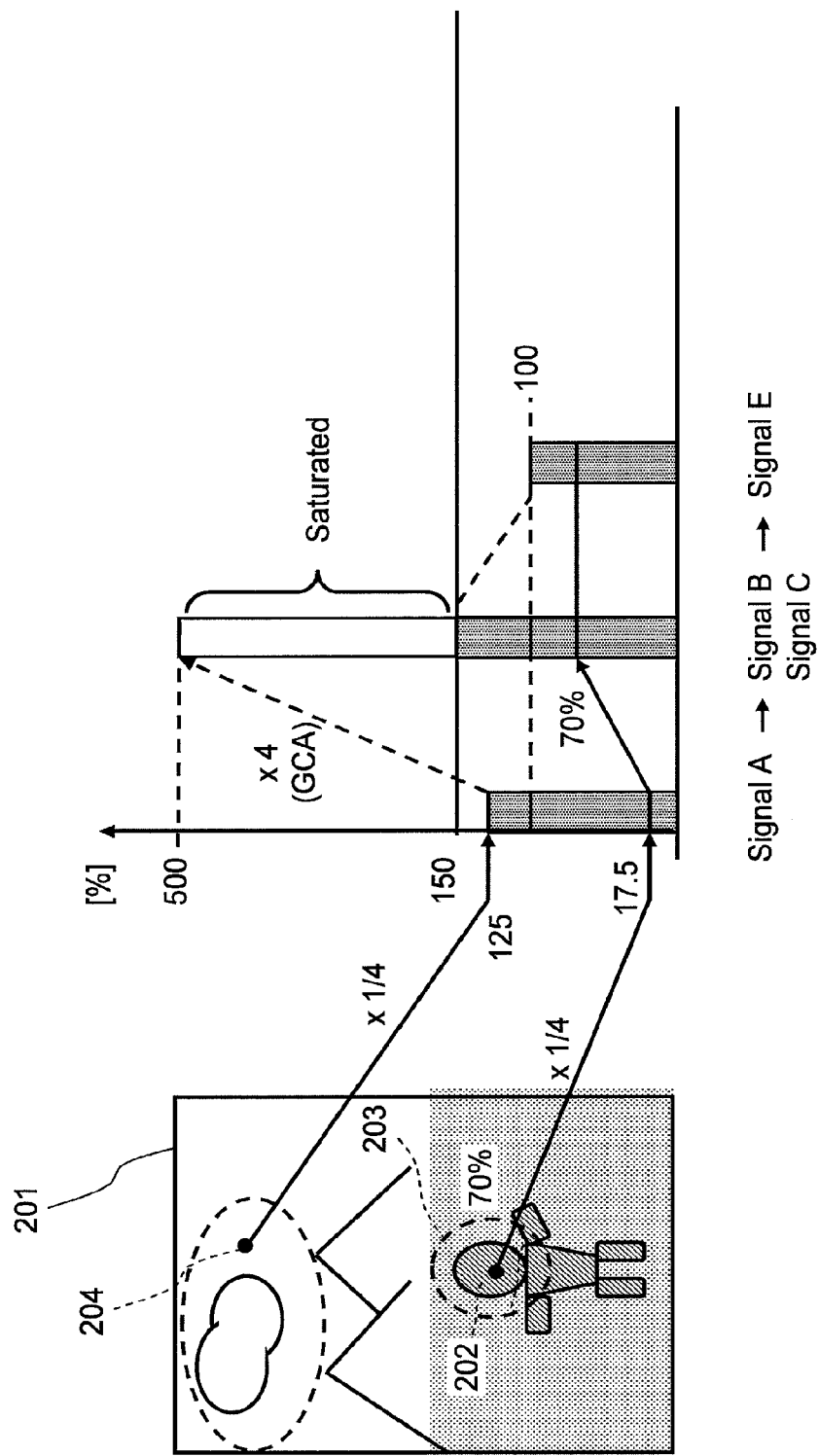
FIG. 6 is a diagram describing a predetermined image scene 201 and the dynamic range of signals corresponding to different portions of the scene.

The signal values that change when image signals are processed by the electrical amplification used in the push processing (amplification performed by the analogue signal processing unit (GCA)) (referred to as method 3) will now be described with reference to FIG. 6.

When the image signals (signals A) are subjected to the exposure with the aperture value of ¼ (under the exposure condition 2), the sky and cloud portion 204, which actually has a luminance level of 500%, will have a luminance level of 125%. In this case, signals corresponding to the sky and cloud portion 204 are not saturated. The bar graph in FIG. 6 (signals B and C) (signals B correspond to signals at point B in FIG. 1 and signals C correspond to signals at point C in FIG. 1) (the same applies hereafter) indicates that the 4× push processing of signals (signals B) performed by the CDS circuit 22 recovers the luminance level of the face portion 202 to an appropriate luminance level of 70%. However, signals corresponding to the point 204, which actually have a luminance level of 500%, are saturated when the input maximum value of the A/D converter 23 is 150%. As a result, signals within the range RA (150% or more) (for example, the saturated sky portion) in FIG. 5 would never be recovered at the time when the image signals are input into the A/D converter 23. As a result, the third conventional technique also fails to achieve an appropriate luminance of the face point 202 (for example, a luminance level of 70%) (object 1) and at the same time fails to prevent signals corresponding to the sky and cloud portion point 204 or its vicinity portion from being saturated (object 2).

As described above, with any of the first to third conventional techniques described above, the conventional imaging apparatus that includes the signal processing unit 90 shown in FIG. 4 fails to achieve both the object 2 of obtaining unsaturated outputs corresponding to the sky point 204 and its vicinity portion and the object 1 of achieving an appropriate luminance level (a luminance level of 70%) of the main subject portion within the range RC.

Advantageous Effects of the Imaging Apparatus 100

Figure 7:
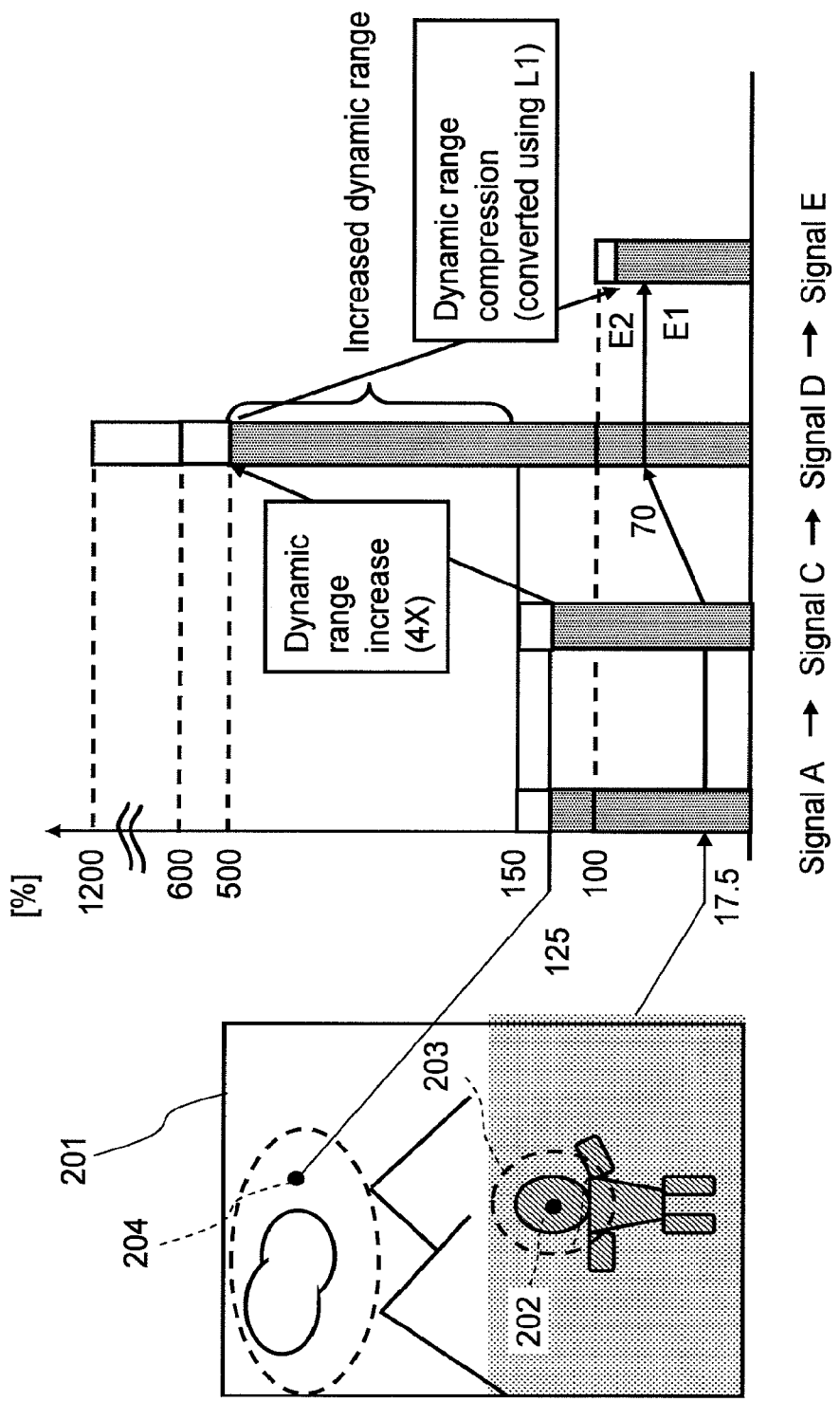
FIG. 7 is a diagram describing a predetermined image scene 201 and the dynamic range of signals corresponding to different portions of the scene.

The advantages effects of the imaging apparatus 100 will now be described with reference to FIG. 7. The imaging apparatus 100 is assumed to capture an image of the same scene 201 as described above.

In the same manner as the second and third conventional techniques, the imaging apparatus 100 first sets the exposure condition 2 (with the aperture value of ¼) for the aperture 12 to prevent signals A corresponding to the bright portion (sky and cloud portion including the point 204) from being saturated. Under the exposure condition 2, signals corresponding to the point 204 included in the sky and cloud portion, which is the brightest portion, are subjected to the exposure with the aperture value of ¼. In this case, signals corresponding to the point 204, which can actually have a value of 500%, will have a value of 125%. The signals corresponding to the point 204 are not saturated.

The signals A with a value of 125% are converted to digital signals (signals C) while maintaining their signal values of 125% without being amplified by the analogue processing unit. The signals C (125%) are subjected to 4× (the inverse of ¼) multiplication performed by the dynamic-range increasing unit 202. Through the multiplication, the signals C with a value of 125% are converted to signals D with a value of 500%.

The signals D with this signal value (500%), which is within the increased dynamic range, are converted to signals E2 using the conversion characteristic L1 shown in FIG. 3 (the value of each signal E2 is calculated as 80+20*(500−80)/(600−80)). In this manner, the imaging apparatus 100 prevents the signals corresponding to the point 204 of the brightest portion (or its vicinity portion) from being saturated (object 2).

The signals A corresponding to the face point 202, which can actually have a dynamic range of 70%, have a value of 17.5%. The signals A with this value (17.5%) are converted to digital signals (signals C) through A/D conversion while maintaining their values. The signals C (17.5%) are then subjected to 4× push processing, which is performed by the dynamic-range increasing unit 2002. Signals D into which the signals C are converted recover the signal value of 70% (=17.5*4). The signals D have the value of 70%, which is smaller than a value corresponding to an inflection point P (80%) of the conversion characteristic L1. As a result, signals E into the which the signals D are converted by the dynamic-range compression unit 2001 have a value of 70%. The signals E with the value of 70% are then output.

The imaging apparatus 100 outputs signals corresponding to the main subject with an appropriate luminance level (luminance level of 70%). In other words, the imaging apparatus 100 achieves the object 2.

As described above, the imaging apparatus 100 of the first embodiment presets a smaller aperture value of the aperture 12 to prevent the received light amount from being saturated, and then subjects digital signals (signals C) resulting from A/D conversion to various processing.

In particular, the imaging apparatus 100 sets the dynamic range increase ratio at a value (1, 2, or 4) that is inversely proportional to the value (1, ½, or ¼) of the aperture 12. This enables signal values to be recovered to values that can be achieved under the exposure condition 1. Additionally, the imaging apparatus 100 selects the dynamic-range compression conversion characteristic according to the aperture value (1, ½, or ¼). Thus, the imaging apparatus 100 converts even output signals D that are within the increased dynamic range (150 to 1200%) to output signals E having changing tone levels.

As described above, the imaging apparatus 100 of the first embodiment obtains image data that prevents even a bright portion, such as a point included in a sky and cloud portion of an image, from being saturated. The imaging apparatus 100 of the first embodiment further obtains an appropriate luminance level of a point corresponding to a face position. In other words, the imaging apparatus 100 achieves both the objects 1 and 2.

First Modification

The first embodiment describes the case in which the dynamic-range compression conversion characteristics L0 to Lmax are selected according to the preset aperture amount (exposure light amount). Alternatively, the dynamic-range compression unit 2001 may select the dynamic-range compression characteristic Ln according to a maximum value of signals D corresponding to the entire image (first modification).

Figure 8:
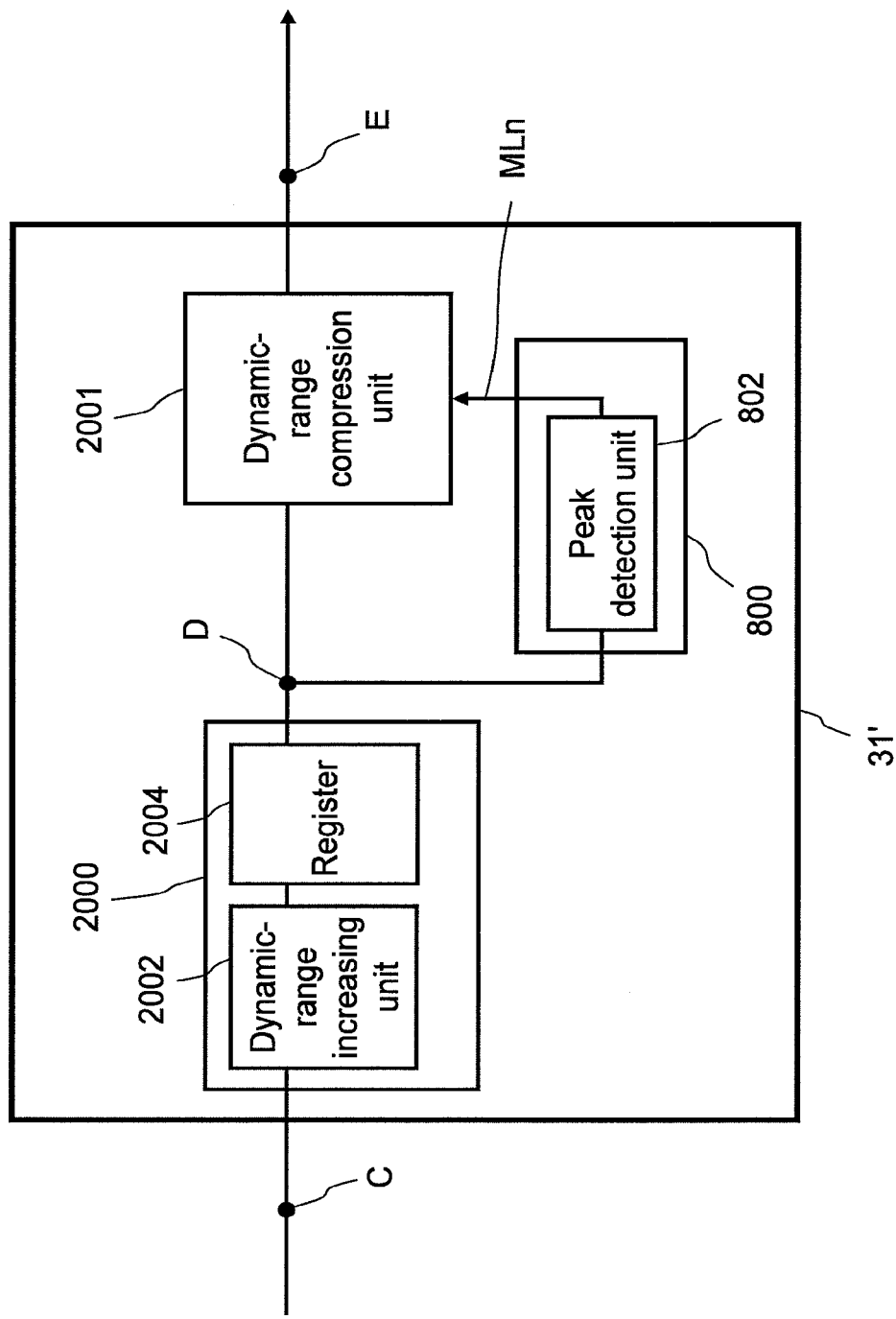
FIG. 8 shows main components of a signal processing unit 31' according to a first modification of the first embodiment.

FIG. 8 shows the structure of a signal processing unit 31' according to the first modification. In FIG. 8, the processing units that are the same as the units described in the first embodiment are given the same reference numerals as those components. The signal processing unit 31' according to the first modification differs from the signal processing unit 31 shown in FIG. 2 only in its parameter determination unit 800.

The parameter determination unit 800 includes a peak detection unit 802.

The peak detection unit 802 receives signals D corresponding to one image that are stored in the register 2004 of the dynamic-range increasing unit 2000, and extracts a maximum value (or peak value) (in a value of the brightest portion) of the image data corresponding to one image.

The peak detection unit 802 then outputs a parameter MLn to the dynamic-range compression unit 2001. The parameter MLn is used to set the conversion characteristic corresponding to the extracted maximum value. When, for example, the maximum value of the predetermined entire image is 500%, the peak detection unit 802 outputs the selection parameter ML2.

Figure 9:
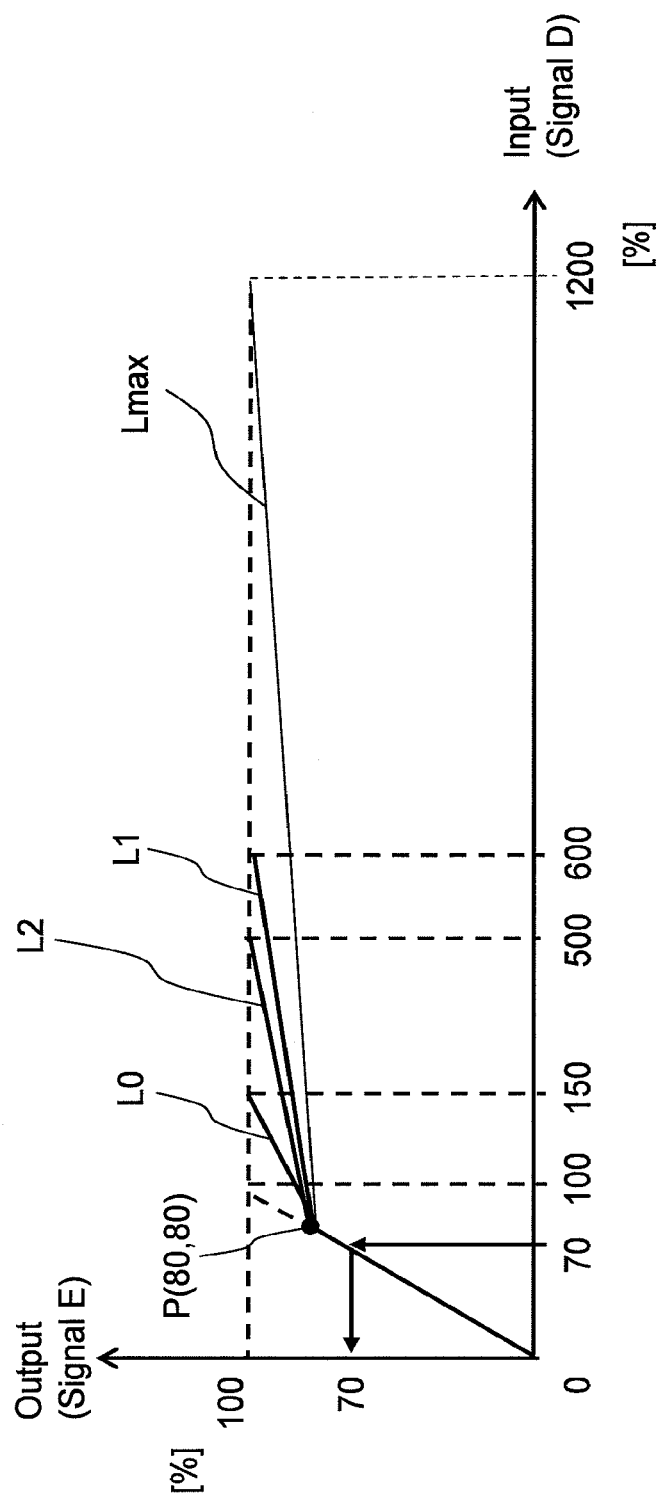
FIG. 9 shows examples of dynamic-range compression characteristics.

The dynamic-range compression unit 2001 selects the corresponding conversion characteristic Ln (L2 in the figure) shown in FIG. 9 according to the selection parameter MLn, which is output from the parameter determination unit 800.

Figure 10:
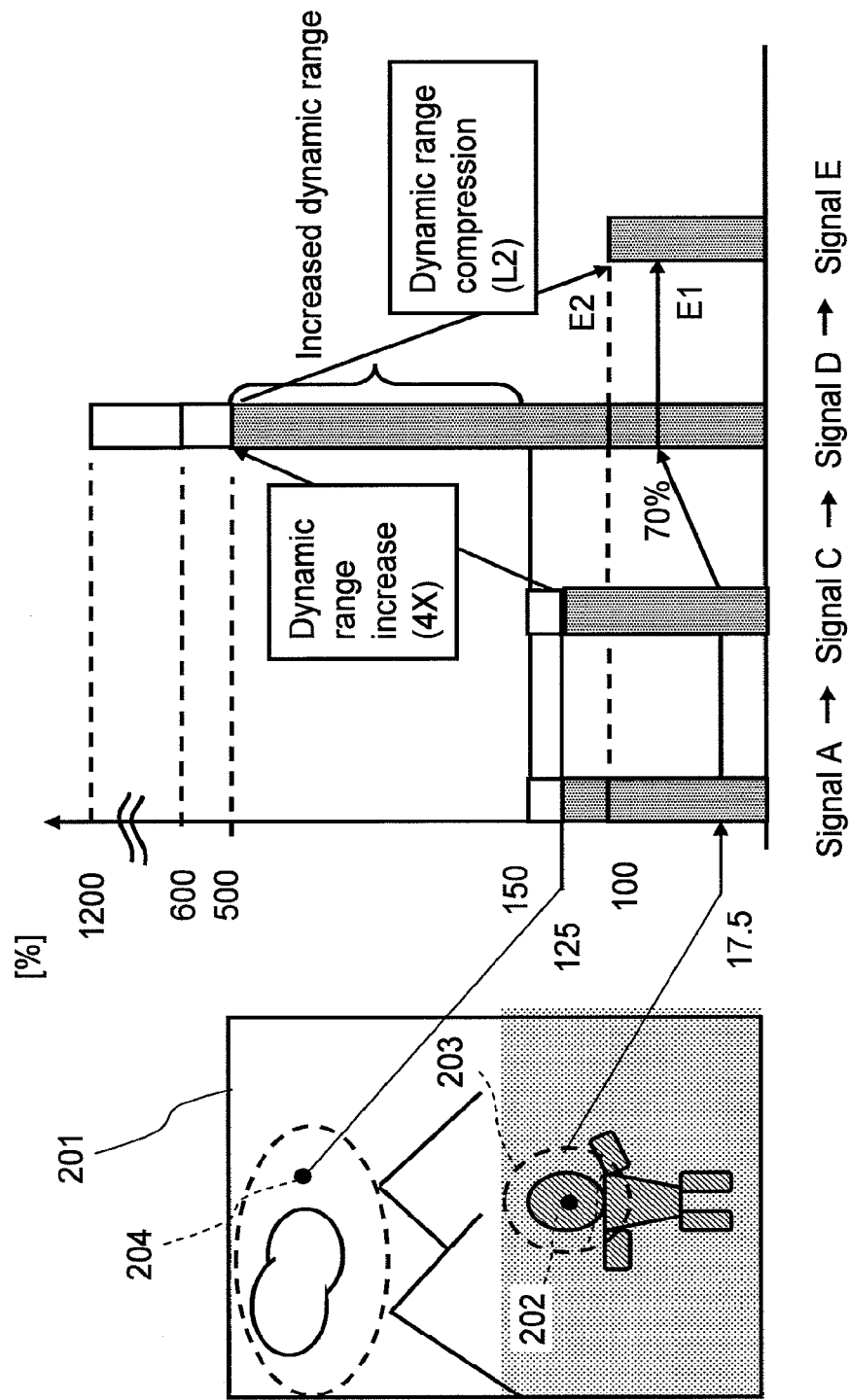
FIG. 10 is a diagram describing a predetermined image scene 201 and the dynamic range of signals corresponding to different portions of the scene.

The advantageous effects of the first modification will now be described using the same scene as described above shown in FIG. 10.

Signals D corresponding to the sky and cloud portion 204, which is the brightest portion, have the same output values as described in the first embodiment before or at the timing at which the value of 500% is output.

The parameter determination unit 800 extracts the maximum value of 500% of image data corresponding to one image (image data corresponding to one frame) that is formed using signals D, and outputs a parameter ML2. Based on the parameter ML2, the dynamic-range compression unit 2001 selects the conversion characteristic L2. The dynamic-range compression unit 2001 converts the signals D stored in the register 2004 using the conversion characteristic L2, and outputs the signals.

The signals D with a value of 500% corresponding to the brightest portion are converted using the conversion characteristic L2. The signals with the maximum value of 500% of the image are converted to signals E with a value of 100%. The signals E with a value of 100% are then output. With the structure described above, the signals D (500%) with the maximum value corresponding to the sky and cloud portion are converted to signals with a value smaller than 100% (80+20*(500−80)/(600−80)). The structure according to the first modification shown in FIG. 8 achieves both the objects 1 and 2 described above, and further obtains outputs whose peak value of the entire image is 100%.

The conversion timings may be adjusted to use the conversion characteristic extracted for image data of one image by the parameter determination unit 800 to convert subsequent image data of the same image. For example, a delay circuit with a delay of an image corresponding to one screen may be arranged to precede the dynamic-range compression unit 2001.

Second Modification

Alternatively, the aperture amount of the aperture 12 and the dynamic range increase ratio may be set according to the peak value of the entire image that is detected by the parameter determination unit 800 of the first modification (second modification).

The structure according to the first modification uses the aperture value of the aperture 12 preset by a separate means (for example, ¼). In that case, signals A corresponding to the brightest portion of the scene 201 stored in the imaging unit 13 (output from the imaging unit 13) do not have a value as high as the maximum dynamic range of 150% (signals only have a value of up to 125%). In this case, digital signals C obtained for the scene at the imaging timing do not have values as high as the maximum input dynamic range (quantization resolution) of the A/D conversion. Thus, the structure according to the first modification fails to effectively use the maximum input dynamic range (quantization resolution).

The structure according to the second modification sets the aperture value larger to increase the exposure light amount in a manner that the peak value of signals D will be as high as the maximum dynamic range of the input. This structure effectively uses the resolution of the A/D converter 23.

Figure 11:
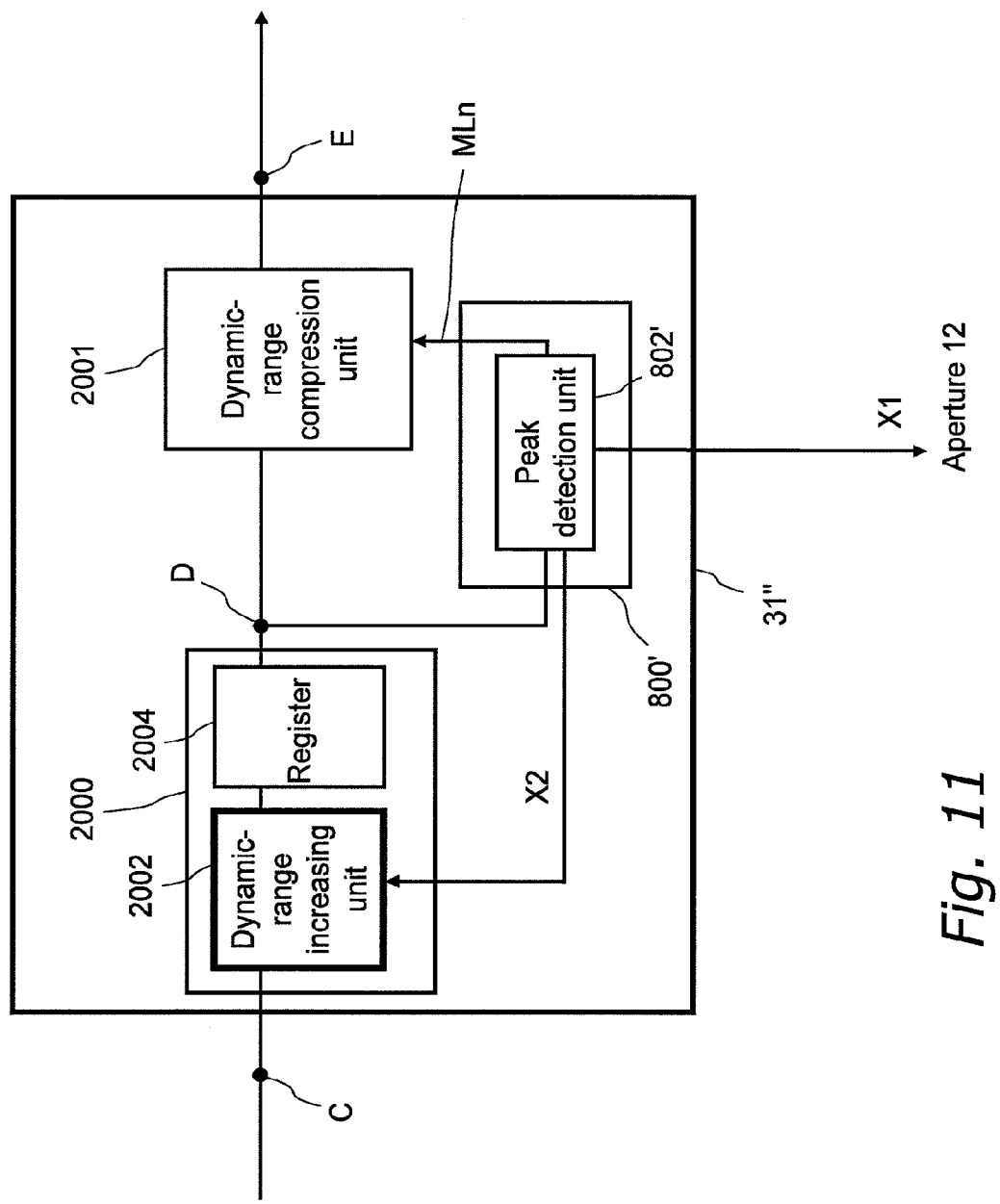
FIG. 11 shows main components of a signal processing unit 31" according to a second modification of the first embodiment.

FIG. 11 shows the structure of a signal processing unit 31" according to the second modification.

A peak detection unit 802' outputs a signal (ML2) for selecting the conversion characteristic L2 according to the peak value of signals D in the same manner as the structure of the first modification.

As shown in FIG. 11, the peak detection unit 802' of the second modification outputs a setting signal X1 for controlling the aperture amount of the optical system 1 and a setting signal X2 for setting the dynamic range increase ratio of the dynamic-range increasing processing unit.

Based on the setting signal X1, the aperture 12 is controlled in a manner that the peak value of 500% of signals D will be 150%, which is the maximum input value of the A/D conversion (the value of the signal X1 is $^{150}/_{500}$ (=0.3)).

As shown in FIG. 1, the control unit 34 may receive the setting signal X1, and control the aperture 12 based on the setting signal X1.

Based on the setting signal X2, the dynamic range increase ratio is set at 500/150, which is the inverse of the aperture amount. More specifically, the signals X1 and X2 have values determined using amounts contradictory to each other. The value of the setting signal X2 may directly be the peak value or may directly be the dynamic range increase ratio.

Figure 12:
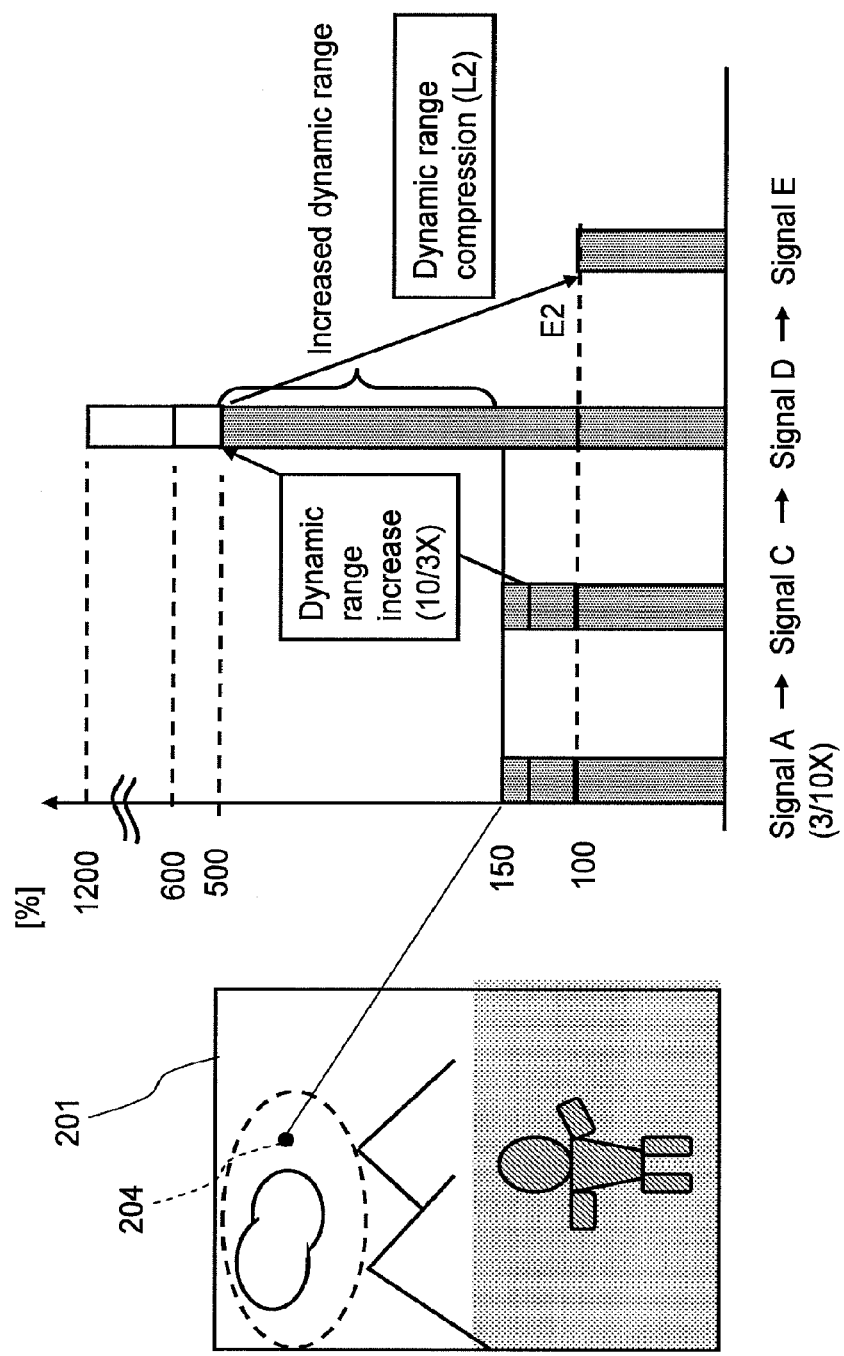
FIG. 12 is a diagram describing a predetermined image scene 201 and the dynamic range of signals corresponding to different portions of the scene.

The advantageous effects of the second modification will now be described with reference to FIG. 12.

The structure according to the second modification does not change the peak value of the image (500%), but uses a larger value as the aperture amount of the aperture 12 ($^{150}/_{500}$). Therefore, signals A have values as high as the input maximum value of 100% of the A/D conversion. More specifically, the imaging apparatus 100 according to the second modification improves the relationship between the aperture value and the dynamic range increase ratio as compared with the imaging apparatus of the first modification, which presets the aperture value of the aperture 12 at ¼. As a result, the imaging apparatus 100 of the second modification increases the peak value of analogue signals to the input maximum range of the A/D conversion. Therefore, the imaging apparatus 100 of the second modification effectively uses the maximum quantization resolution of the A/D conversion.

Third Modification

Unlike the second modification, the parameter determination unit 800 may not use the maximum value of the entire image as a reference. Instead, the parameter determination unit 800 may use a representative value of a predetermined portion (main subject portion) as a reference to determine the dynamic range increase ratio or the aperture value of the aperture (including the adjustment value of the exposure light amount as described above). The imaging apparatus 100 of the third modification may further adjust the aperture amount of the aperture 12 or the dynamic range increase ratio in a manner that a representative value F of the image signals corresponding to the predetermined portion will coincide with a predetermined reference value.

The aperture value of the aperture 12 may be preset (at 3/10) and the dynamic range increase ratio may be preset (at 10/3) in a manner that the maximum output value of signals D corresponding to the predetermined portion is 70% at timing tk shown in the first embodiment and the first and second modifications. However, depending on the circumstances such as the amount of incident light in the vicinity of the subject, the structures of the first embodiment and the first and second modifications may fail to have the output value of the predetermined portion (for example, the subject portion) close to the target value of 70% at timings subsequent to timing tk. The structure according to the third modification enables the output value of the predetermined portion to be adjusted toward the target value even in such a case.

The structure of the third modification will now be described with reference to FIG. 13.

Figure 13:
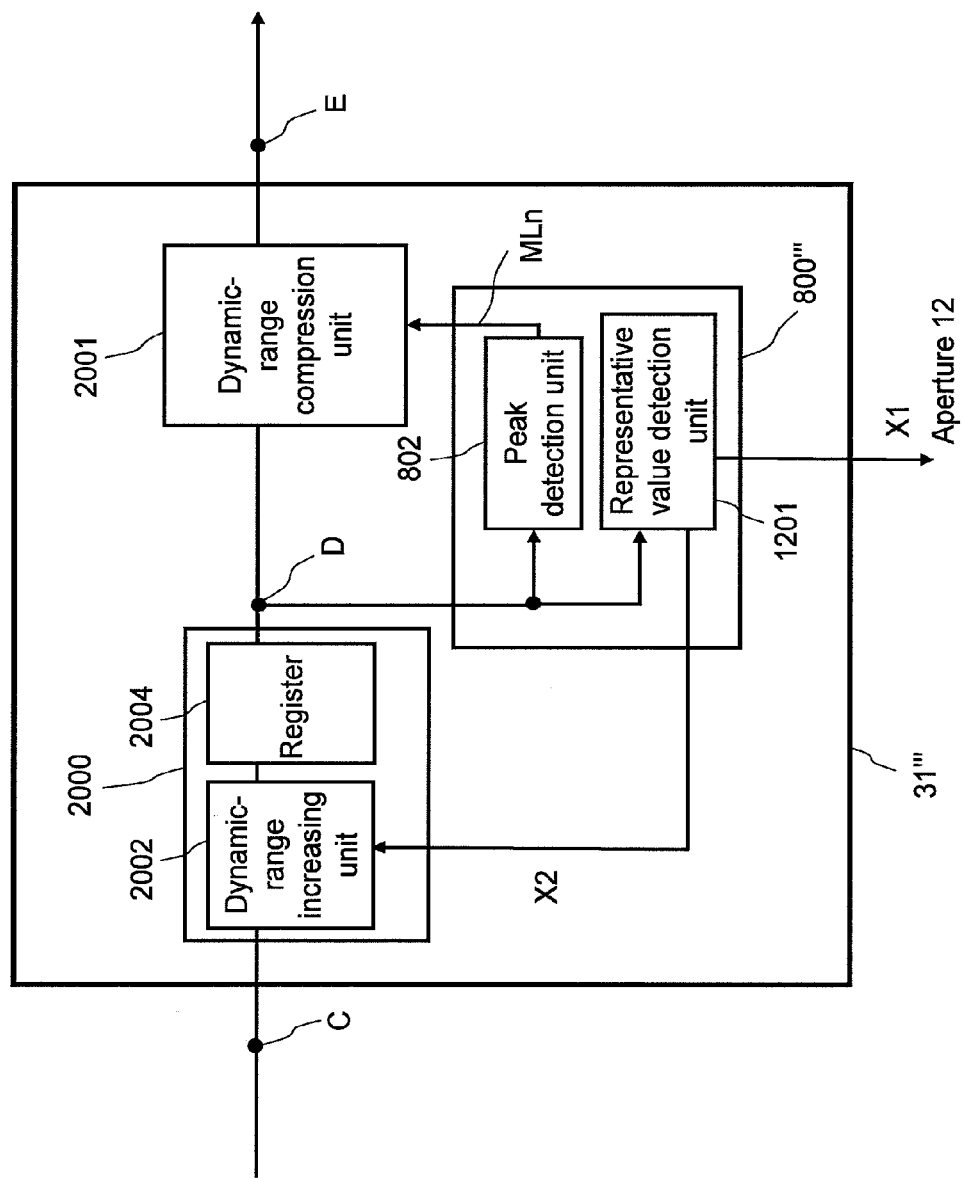
FIG. 13 shows main components of a signal processing unit 31''' according to a third modification of the first embodiment.

As shown in FIG. 13, a parameter determination unit 800''' includes a representative value detection unit 1201. The representative value detection unit 1201 determines a representative value (F1) of a predetermined portion of image data corresponding to one image (image data corresponding to one frame). The predetermined portion is a preset central portion of the image. The predetermined portion may contain a subject designated by the user. In this example, the maximum value of signals D corresponding to pixel positions included in the predetermined portion is determined as the representative value F1.

The representative value detection unit 1201 outputs (A) a setting signal X1 for setting the aperture amount of the optical system or (B) a setting signal X2 for setting the dynamic range increase ratio that is used by the dynamic-range increasing unit 2002 in a manner that the representative value F1 determined at the predetermined timing is maintained close to its target value at timings subsequent to the predetermined timing.

The peak detection unit 802 outputs a parameter MLx, which is used by the dynamic-range compression unit 2001 to select the conversion characteristic Lx based on the peak value (P) of the entire image.

Advantageous Effects of the Third Modification

The operation of the imaging apparatus 100 according to the third modification and its advantageous effects will now be described using the same scene 201 as described above with reference to FIG. 14.

The representative value detection unit 1201 is assumed to extract a representative value of 70% for a predetermined portion at a predetermined timing in the manner described above. The dynamic range increase ratio is set at 10/3 at timing tk. The aperture value is set at 3/10.

The representative value detection unit 1201 is then assumed to extract a representative value of the central portion (portion 203) of image data obtained at predetermined timing tn. More specifically, the representative value detection unit 1201 is assumed to extract a representative value of 50% for the central portion of the image data.

The representative value detection unit 1201 outputs either a setting signal X1 or a setting signal X2 in a manner that the representative value of 50% will be output as a target appropriate value (target value of 70%) for the same portion of the image data (signals D) obtained at timing tn+1.

When the Signal X1 is Output:

(A) In response to the setting signal for setting the aperture amount of the optical system, the representative value detection unit 1201 sets a signal X1 for newly setting the aperture amount at a value that is 70/50 times the aperture amount set at timing tn.

When the Signal X2 is Output:

(B) In response to the setting signal for setting the dynamic range increase ratio used by the dynamic-range increasing unit 2002, the representative value detection unit 1201 outputs a signal X2 for setting the dynamic range increase ratio at a value that is 70/50 times the dynamic range increase ratio set at timing t1 to the dynamic-range increasing unit 2002.

Figure 14:
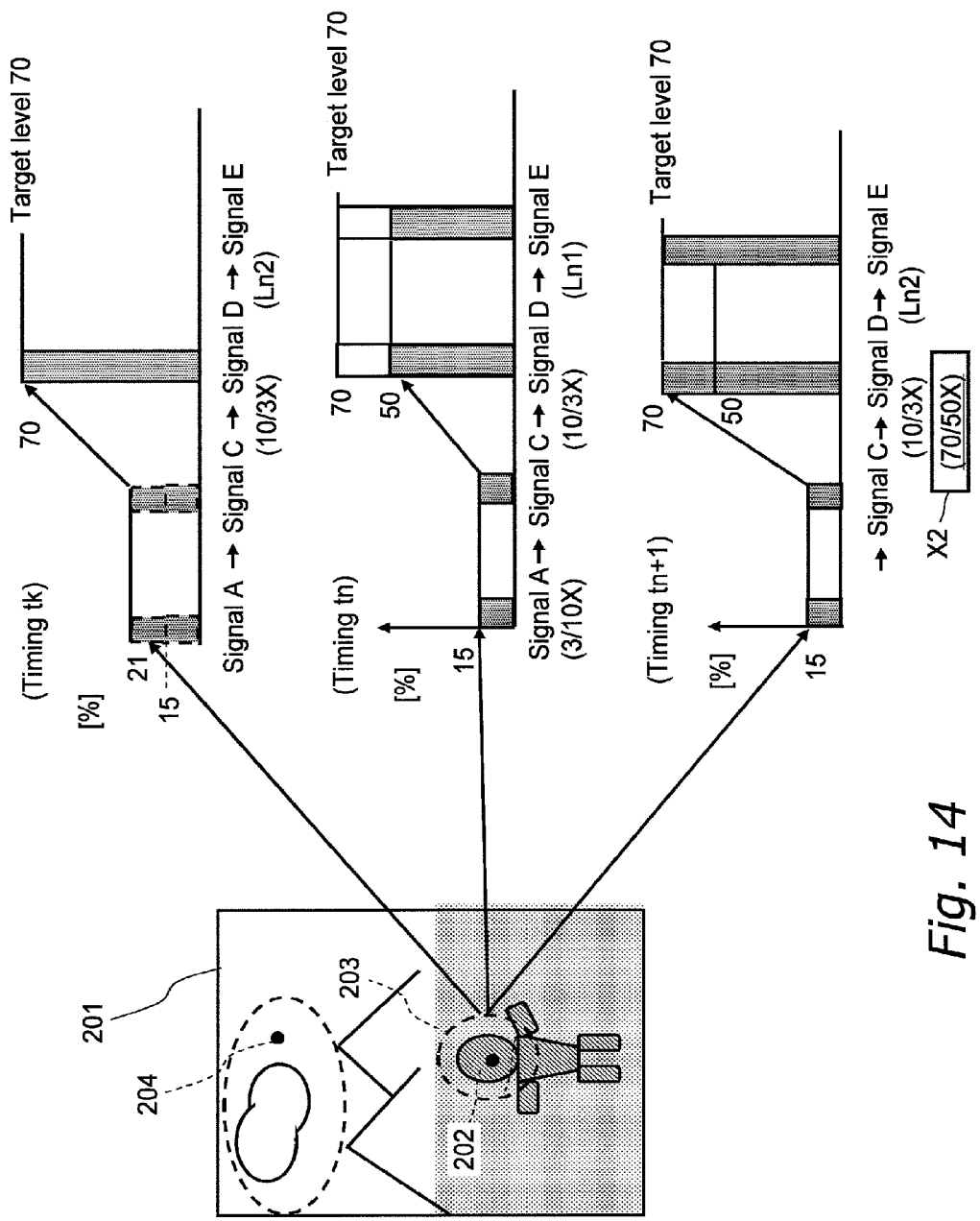
FIG. 14 is a diagram describing a predetermined image scene 201 and the dynamic range of signals corresponding to different portions of the scene.

In the example shown in FIG. 14, the representative value detection unit 1201 outputs the setting signal X2 for newly setting the dynamic range increase ratio at 10/3*70/50.

In this case, the maximum value of the signals A and C corresponding to the central portion of the image data obtained at timing tn+1 (the output of the representative value detection unit 1201) is maintained to be 15%, whereas the signals D corresponding to the central portion of the image data have a value of 70% based on 15(%)*10/3*70/50)=70 (%), after conversion is performed using the dynamic range increase ratio updated based on data obtained at timing tn. The entire image data is converted using the predetermined conversion characteristic Ln2 based on the peak value of the signals D of the entire image obtained at timing tn.

This structure maintains the representative value of the predetermined portion to be a value close to the target value of 70%. When, for example, processing continuous image data (moving image etc.), the imaging apparatus with this structure prevents the luminance level of a predetermined portion of image data from changing drastically and enables the luminance level of the predetermined portion to change gradually.

Although not shown, the dynamic range is compressed with conversion characteristics determined according to the maximum value (P) of signals D of the entire image. This prevents the output of signals (signals E) corresponding to the brightest portion from being saturated.

According to the third modification, when the signal X2 for updating the dynamic range increase ratio is generated, or specifically in case (B) described above, the output signals (signals E) are obtained in a manner that the representative value (luminance level) of the predetermined portion (central portion) will be the target output value of 70% without causing mechanical delays of the aperture 12.

Figure 15:
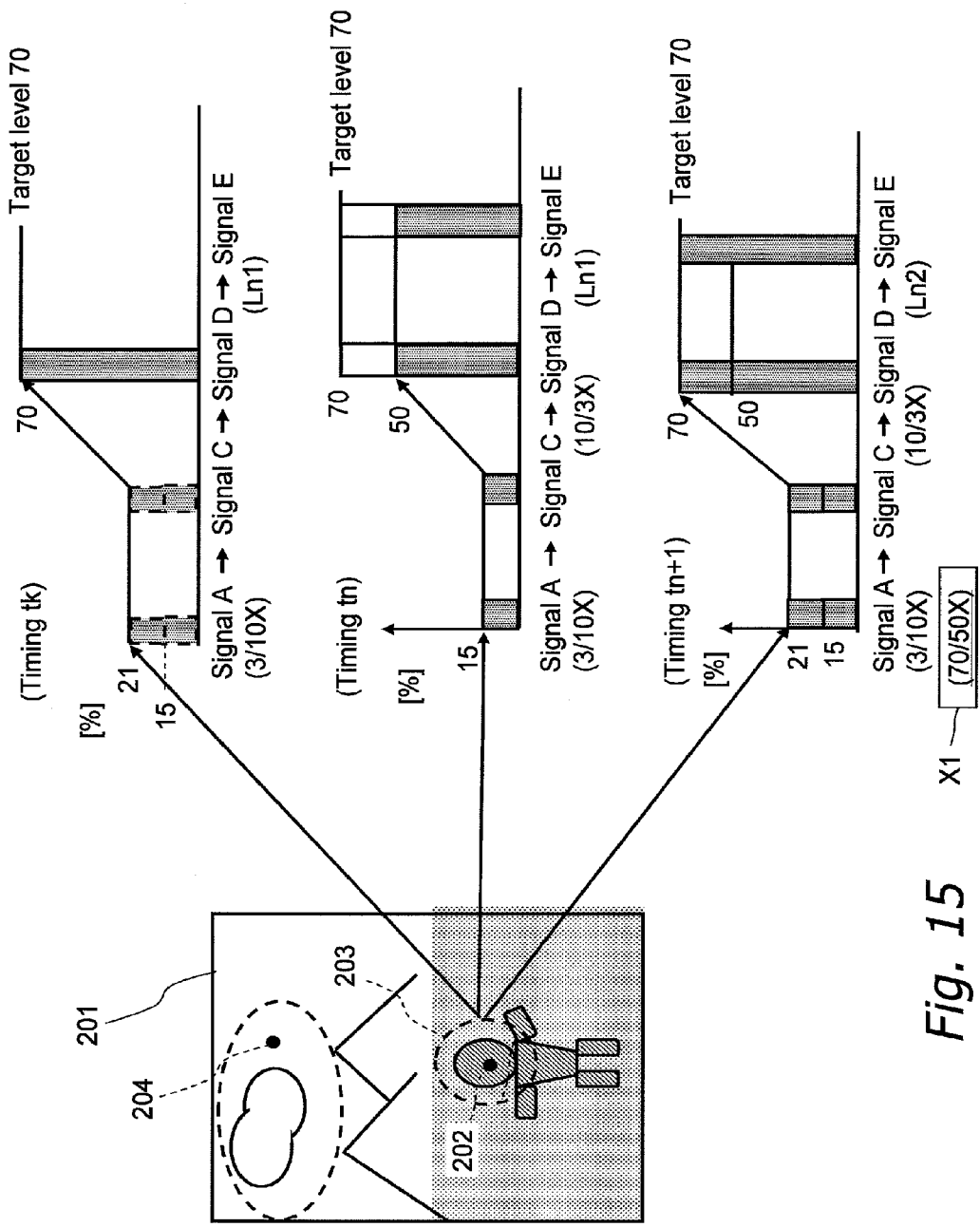
FIG. 15 is a diagram describing a predetermined image scene 201 and the dynamic range of signals corresponding to different portions of the scene.

According to the third modification, when the signal for changing the aperture amount of the optical system is generated, or specifically in case (A) described above, the signals A to E change in the manner shown in FIG. 15.

In this case, the values of analogue signals A corresponding to the subject vicinity portion (portion 203 in the above example), which are accumulated in the imaging unit 13, are smaller in the scene newly obtained at each of the timings to and tn+1. However, the imaging apparatus of the third modification sets an appropriate exposure amount of 21% at timing tn+1. In total, the imaging apparatus of the third modification sets the appropriate exposure light amount and the dynamic range increase ratio centering on the subject.

Although the present embodiment describes the case in which the maximum value of the signals D corresponding to the predetermined portion is used as the representative value, the representative value may be a value other than the maximum value of the signals D. For example, the representative value may be an average value of the signals D, a median value of the signals D, or a value obtained by eliminating certain signals out of the signals D.

1.4 Imaging Method

The imaging apparatus 100 and the signal processing units 31, 31', 31", or 31''' of the first embodiment (including the first to third modifications) (the same applies hereafter) may use an imaging method including processing that is performed by various processing units.

Figure 16:
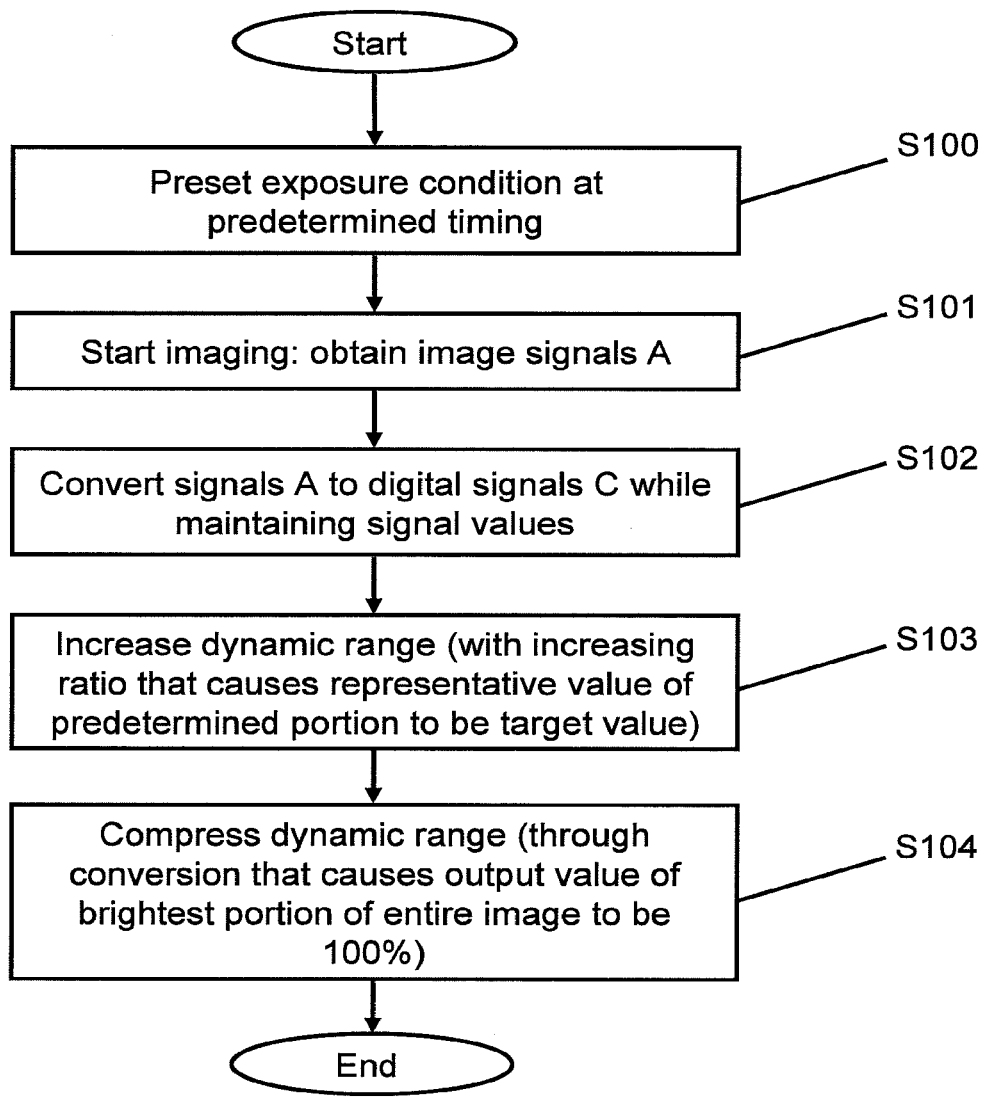
FIG. 16 is a flowchart showing an imaging method according to the first embodiment of the present invention.

The imaging method according to the first embodiment of the present invention (imaging method used in the imaging apparatus 100) will now be described with reference to a flowchart shown in FIG. 16.

According to the imaging method of the first embodiment, the exposure condition of the imaging unit (image sensor) 13 is set in a manner that a highlight portion of a scene is not saturated based on, for example, values corresponding to a brightest portion of an immediately preceding image of the scene captured with the live view function or the like (S100).

Under the set exposure condition, image signals are generated by the imaging unit (image sensor) 13 (S101).

The image signals are converted to digital image data by the A/D converter 23 (S102).

The digital image data is subjected to the linear dynamic range increase and the push processing performed simultaneously by the dynamic-range increasing unit 2002 in a manner that the subject main portion will have a predetermined luminance level (for example, a luminance level of 70%) (S103).

The image data is then subjected to the dynamic range compression based on the conversion characteristic determined according to the luminance level of the brightest portion of the scene (S104).

Through the processing from steps S100 to S104 of the imaging method of the present embodiment, image data of the main subject portion will recover its predetermined luminance level and the highlight portion will retain its tone levels without saturation even with the preset smaller exposure light amount.

The imaging apparatus and the imaging method according to the present embodiment produce the advantageous effects unique to the present invention by performing electric signal amplification for a bright scene as well as performing dynamic range increase, although the electric signal amplification is conventionally considered unnecessary for a bright scene with a sufficiently large amount of light. More specifically, the imaging apparatus and the imaging method of the present embodiment intentionally set a smaller exposure light amount for a bright scene by adjusting the aperture amount and the shutter speed, and perform the electric signal amplification in combination with the dynamic range increase.

According to the present invention, the exposure condition for a bright scene is set to be the condition conventionally considered disadvantageous for a bright scene. Image signals generated by the imaging unit 13 under the set exposure condition are converted to digital image signals by A/D conversion. The digital image signal are then subjected to the dynamic range increase, which is performed through digital processing. Consequently, the imaging apparatus and the imaging method of the present invention obtain image signals that achieve a predetermined luminance level of a main subject portion of the scene and at the same time prevent a highlight portion of the scene from being saturated.

In the present embodiment, the optical system 1 may have any structure as long as the optical system 1 can control the exposure light amount of the imaging unit 13. Although the present embodiment describes the case in which the imaging lens 11 is formed by a single lens, the imaging lens 11 may be formed by a plurality of lenses.

The shutter, which is not shown, may be a mechanical shutter, or may be an electronic shutter that adjusts the amount of light by adjusting the driving timing of the imaging unit (image sensor) 13.

The A/D converter 23 may be arranged separately from the analogue signal processing unit 2, or may be incorporated in the digital signal processing unit 3.

The imaging unit (image sensor) 13 may be an image sensor with another structure, such as a CMOS image sensor. The structure of the imaging unit (image sensor) 13 should not be limited to a single-sensor structure, but may be a triple-sensor structure.

The dynamic-range increasing unit 2002 should not be limited to a multiplier. It is only required that the dynamic-range increasing unit 2002 can linearly increase the dynamic range of a signal through digital processing. For example, the dynamic-range increasing unit 2002 may be formed by a lookup table (LUT) that has an output value with a three-bit higher resolution than an input value when, for example, the maximum dynamic range increase ratio is 8. When, for example, the dynamic range increase ratio is the power of two, a shifter (bit shifter) may be used.

Although the present embodiment describes the case in which the dynamic-range compression unit 2001 compresses the dynamic range of signals with values corresponding to luminance levels exceeding 80% and does not compress the dynamic range of signals with values corresponding to luminance levels of 80% and less, the present invention should not be limited to such a structure. It is only required that the compression characteristic of the dynamic-range compression unit 2001 be such that the dynamic range of signals is converted with any compression characteristic that changes according to a maximum value of an input value.

For example, the dynamic-range compression unit 2001 may convert the dynamic range of signals corresponding to an input value of 20% or less to signals D with small differences between their tone levels. It is preferable that the conversion characteristic is set to maintain or coordinate differences between tone levels of signals corresponding to a main subject vicinity portion.

Although the second modification describes the case in which the dynamic range increase is performed in a manner that the luminance level of the brightest portion of the scene coincides with the maximum dynamic range of the imaging unit (image sensor) 13 (the maximum value of image signal values output from the imaging unit 13), the present invention should not be limited to such a structure. The luminance level of the brightest portion of the scene may be lower than the maximum dynamic range of the imaging unit 13. Alternatively, the relationship between the luminance level of the brightest portion of the scene and the dynamic range of the imaging unit 13 may be set to permit signals corresponding to the brightest portion to be saturated to a degree at which the image is not substantially seen degraded.

The compression characteristic of the dynamic-range compression unit 2001 may not necessarily be set based on an output of the peak detection unit 802. To calculate an approximate value, the maximum dynamic range of the imaging unit (image sensor) 13 may be multiplied by the exposure light amount correction value described above. The calculated approximate value may then be set in the dynamic-range compression unit 2001.

Second Embodiment

An imaging apparatus (camera) according to a second embodiment of the present invention will now be described.

2.1 Structure of the Imaging Apparatus

Figure 17:
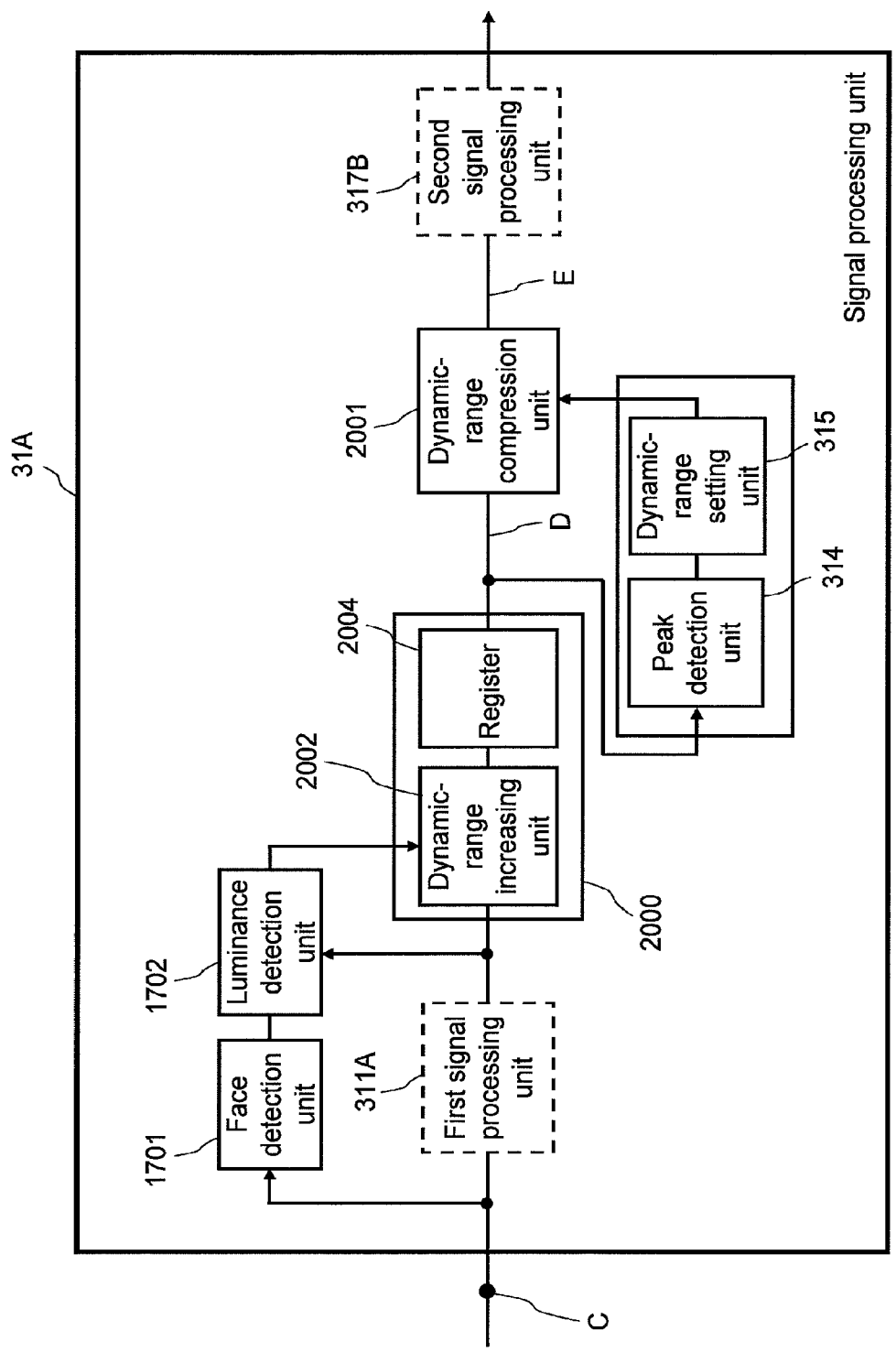
FIG. 17 shows main components of the signal processing unit 31A.

The imaging apparatus of the present embodiment differs from the imaging apparatus 100 of the first embodiment in its signal processing unit 31A shown in FIG. 17, which replaces the signal processing unit 31. The other structure of the imaging apparatus of the present embodiment is the same as the structure of the imaging apparatus 100 of the first embodiment. The components of the imaging apparatus of the present embodiment that are the same as the components of the imaging apparatus 100 of the first embodiment are given the same reference numerals as those components, and will not be described.

FIG. 17 shows the structure of the signal processing unit 31A of the present embodiment.

As shown in FIG. 17, the signal processing unit 31A differs from the signal processing unit 31 of the first embodiment in its face detection unit (characteristic image portion detection unit) 1701 and a luminance detection unit 1702, which are additional components not included in the signal processing unit 31 of the first embodiment. The functional blocks of the signal processing unit 31A that are the same as the functional blocks of the signal processing unit 31 (functional blocks with the same reference numerals as in FIG. 2) will not be described.

The face detection unit 1701 analyzes characteristic amounts of an image that is formed using image data (image signals), and detects a person's face portion of the image. The face detection unit 1701 then outputs information about the coordinates representing the face portion and about the range of the face portion to the luminance detection unit 1702.

The luminance detection unit 1702 detects the luminance level of the face portion based on the information about the coordinates representing the face portion and about the range of the face portion, which is output from the face detection unit 1701.

The dynamic-range increasing unit 2002 receives an output of the luminance detection unit 1702 and image signals output from a first signal processing unit 311A, and increases the dynamic range of the image signals in a manner that the face portion, which is detected by the luminance detection unit 1702, will have an appropriate luminance level.

2.2 Operation of the Imaging Apparatus

The operation of the imaging apparatus of the present embodiment will now be described with reference to FIG. 12 described above.

The imaging apparatus is assumed to capture an image of a scene whose portions have the same dynamic range as the dynamic range of the portions of the scene described in the first embodiment. Thus, FIG. 8 is also referred to in describing the operation of the imaging apparatus.

The imaging apparatus is assumed to capture an image of the same scene as described above. In the first embodiment, the imaging apparatus 100 captures an image of the scene by assuming that the main subject portion 202, such as the face portion, is included in the main subject vicinity portion 203, which is about the center of the scene 201. In this case, it may not be possible for the imaging apparatus of the first embodiment to always use the optimal condition to capture the image. The imaging apparatus of the present embodiment eliminates the above assumption, and always uses the optimal condition to capture an image of the scene. More specifically, the imaging apparatus of the present embodiment performs exposure control based only on values corresponding to a brightest portion of the scene 201.

The imaging apparatus of the present embodiment will hereafter be described in detail.

The control unit 34 calculates an exposure light amount AP1 in a manner that a highlight portion of the subject scene is not saturated in the imaging unit (image sensor) 13 based on, for example, measurement values of an exposure meter (not shown) or values corresponding to a brightest portion of an immediately preceding image of the scene (values corresponding to a brightest portion included in the sky and cloud portion 204) captured by the imaging unit (image sensor) 13 with the live view function or the like. The exposure light amount is actually controlled (by adjusting the aperture amount and the shutter speed) to be the exposure light amount AP1. In this case, the sky and cloud portion 204, which is the brightest portion, has the luminance level of 150%, and is not saturated in the imaging unit (image sensor) 13. Therefore, the signal values of image signals generated by the imaging unit (image sensor) 13 are not saturated. When the exposure light amount of the imaging apparatus of the present embodiment is set to the exposure light amount AP1, the person's face portion 202 will have a luminance level of 21% in the same manner as in the first embodiment.

The face detection unit 318 analyzes an image that is formed using the image data (image signals) resulting from A/D conversion, and detects the person's face portion of the image and obtains the coordinates representing the face portion of the image. The face detection unit 318 then outputs information about the coordinates representing the face portion of the image to the luminance detection unit 319.

The luminance detection unit 319 calculates the average luminance level of the face portion of the image, which is formed using the image data (image signals), based on the information about the coordinates representing the face vicinity portion of the image output from the face detection unit 318. The face detection unit 318 calculates the average luminance level of skin portions of the face vicinity portion excluding hair, eyes, etc. (the average luminance level is referred to as the "face luminance level", which is specifically 21% in the present example). The luminance detection unit 319 then calculates the dynamic range increase ratio (70(%)/21(%)=3.33), with which the face luminance level will be an appropriate luminance level of 70%. The luminance detection unit 319 sets the calculated dynamic range increase ratio in the dynamic-range increasing unit 2002.

The dynamic-range increasing unit 2002 increases the dynamic range of the image signals based on the dynamic range increase ratio, which is set by the luminance detection unit 319. More specifically, the dynamic-range increasing unit 2002 increases the dynamic range of the image signals in a manner that the main subject portion 202 will have a luminance level of 70% based on 21(%)*10/3=70(%), and the sky and cloud portion 204 will have a luminance level of 500% based on 150(%)*10/3=500(%). The dynamic-range increasing unit 2002 then outputs the image signals, whose dynamic range has been increased, to the register 2004.

The dynamic-range increasing unit 2002 and the register 2004 for storing image signals whose dynamic range has been increased by the dynamic-range increasing unit 2002 can handle image signals with values corresponding to luminance levels up to 1200% without saturating the signals. Consequently, the imaging apparatus of the present embodiment achieves an appropriate luminance level of the main subject portion 202 of the image and at the same time prevents the sky and cloud portion 204 of the image from being saturated.

The operation of the dynamic-range compression unit 2001 is the same as the operation described in the first embodiment, and will not be described.

As described above, the imaging apparatus (camera) of the present embodiment obtains image signals that achieve a predetermined luminance level of a face portion of a scene with higher precision than in the first embodiment and retain tone levels of a highlight portion of the scene without saturation.

The face detection unit 318 may detect a face portion using various other algorithms known in the art. For example, the face detection unit 318 may use pattern matching based on learning to detect the face portion using the face line or the arrangement of the mouth, eyes, and nose, or may use color information, such as skin color information, to detect the face portion.

Third Embodiment

A dynamic-range compression unit 2001 included in an imaging apparatus (camera) according to a third embodiment of the present invention will now be described. In the first and second embodiments, the dynamic-range compression unit 2001 performs dynamic range compression using the tone curves with the nonlinear characteristics shown as in FIG. 3 (conversion characteristics having inflection points larger than and smaller than the input range value of 80%). With this structure, the imaging apparatus effectively uses the increased large dynamic range (for example, the dynamic range of 1000%), which is increased by the dynamic-range increasing unit 2002, and thereby captures an image of a scene in a manner that a main subject portion of the scene, such as a face portion, has a predetermined luminance level and a highlight portion of the scene with a large dynamic range retains its tone levels without saturation.

However, the dynamic-range compression unit 2001 shown in FIG. 2 does not compress the dynamic range of signals with values corresponding to luminance levels of 80% and less, and compresses the dynamic range of signals with values corresponding to luminance levels exceeding 80% and up to 1200% to the dynamic range of 80 to 100%. The dynamic range compression performed with this dynamic range compression characteristic retains tone levels of highlight portions with a wide range of luminance levels. However, because the input and output characteristic curve of the dynamic range compression (straight line in FIG. 3) has an extremely small gradient, the contrast of the highlight portion decreases greatly after the dynamic range compression is performed with the above dynamic range compression. In FIG. 3, the input and output characteristic curve of the dynamic range compression of the highlight portion has a gradient of 0.0176, which is calculated as (100−80)/(1200−80)=0.0176. The gradient of 0.0176 indicates a high compression ratio.

In other words, the gradient of the input and output characteristic curve of the dynamic range compression of the highlight portion is smaller as the dynamic-range compression unit 2001 compresses the dynamic range more. As a result, although the highlight portion retains its changing tone levels after the tone level conversion, the tone values (signal values) of the highlight portion differ only too slightly from one another. In this case, the image captured by the imaging apparatus of the present embodiment differs insignificantly from a saturated image that would be captured with a conventional technique. In other words, the image captured by the imaging apparatus of the present embodiment can be seen as a saturated image. This can be the fundamental problem of the dynamic range compression of the imaging apparatus. Despite this problem, the imaging apparatus of the present invention is still obviously advantageous over the saturation occurring with the conventional technique (the phenomenon in which a highlight portion of a captured image is saturated), because the gradient of the input and output characteristic curve of the dynamic range compression of a highlight portion of a scene would not be extremely small when the dynamic range compression performed with the dynamic range compression conversion characteristic shown in FIG. 3 is applied to the scene portions with luminance levels of several hundred percent or less.

To solve this fundamental problem, the tone characteristic of each position on an image may be changed according to the luminance level of a vicinity portion of spatial signals determined for each position on the image. One such technique is described in International Publication No. WO 2005/027041. More specifically, the patent document describes a technique for using a vicinity portion of processing target pixels of an image. With this technique, for example, the histogram of a vicinity portion of processing target pixels of an image is measured, and the tone curve used for the target pixels is determined based on the distribution of values of the histogram. Alternatively, the average luminance level of the vicinity portion of the processing target pixels is calculated, and the tone curve used for the target pixels is determined according to the luminance level of the vicinity portion. The conventional technique is ineffective when input signals have already been saturated. Therefore, the conventional technique alone will not produce the advantageous effects of the present invention.

When the technique described above is applied to the dynamic-range compression unit 2001, the imaging apparatus (camera) of the present invention will solve the problem of low contrast in the highlight portion by minimizing the contrast decrease caused by the dynamic range compression. More specifically, the imaging apparatus of the present invention converts large-dynamic-range information, which is information about an image with the increased large dynamic generated by the dynamic-range increasing unit 2002, to small dynamic range information, which is information about an image with a dynamic range of 100% or less, without visually causing almost no loss of the image information. Consequently, the imaging apparatus of the present embodiment maximizes the effects of the dynamic range increase of the present invention.

The imaging apparatus according to the present embodiment will now be described.

3.1 Structure of the Imaging Apparatus

Figure 18:
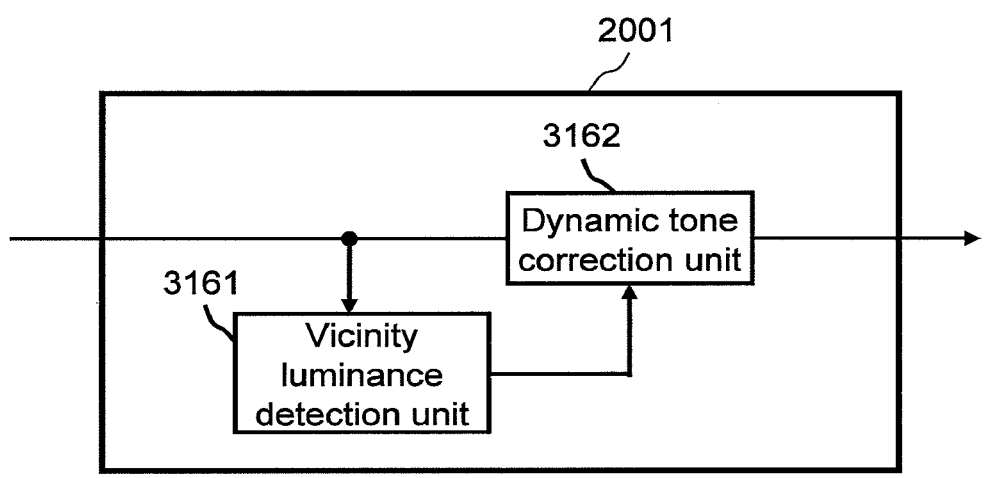
FIG. 18 shows main components of the dynamic-range compression unit 2001.

The imaging apparatus of the present embodiment includes the dynamic-range compression unit 2001 having the structure shown in FIG. 18 instead of the structure of the dynamic-range compression 2001 included in the imaging apparatus of the first and second embodiments. The other structure of the imaging apparatus of the present embodiment is the same as the structure of the imaging apparatuses of the first and second embodiments. The components of the imaging apparatus of the present embodiment that are the same as the components of the imaging apparatuses of the first and second embodiments are given the same reference numerals as those components, and will not be described.

As shown in FIG. 18, the dynamic-range compression unit 2001 includes a vicinity luminance detection unit 3161 and a dynamic tone correction unit 3162.

The vicinity luminance detection unit 3161 receives image signals output from the register 2004. The vicinity luminance detection unit 3161 detects a representative value (for example, an average value) of luminance levels (pixel values) of a vicinity portion of processing target pixels included in an image formed using the image signals. The vicinity luminance detection unit 3161 then outputs the detected representative value to the dynamic tone correction unit 3162.

The dynamic tone correction unit 3162 receives the image signals output from the register 2004 and the representative value output from the vicinity luminance detection unit 3161. The dynamic tone correction unit 3162 subjects the image signals to dynamic tone correction using a tone level conversion characteristic. The tone level conversion characteristic is represented by a dynamic range compression curve that changes according to an output of the vicinity luminance detection unit 3161. More specifically, the dynamic tone correction unit 3162 performs the dynamic tone correction with the tone characteristic that changes according to positions on the image (spatial positions (or the luminance level of a vicinity portion determined for each vicinity portion)). The dynamic tone correction unit 3162 outputs the image signals, whose dynamic range has been compressed, to a second signal processing unit 317B.

The first signal processing unit 311A receives image signals output from the analogue signal processing unit 2, and subjects the image signals output from the analogue signal processing unit 2 to signal processes including white balance correction, pixel interpolation, color correction, noise reduction, and enhancement, and outputs the processed signals to the dynamic-range increasing unit 2002. Alternatively, the second signal processing unit 317B may perform the signal processes including white balance correction, pixel interpolation, color correction, nose reduction, and enhancement. It is only required that each of the signal processes including white balance correction, pixel interpolation, color correction, noise reduction, and enhancement be performed either by the first signal processing unit 311A or by the second signal processing unit 317B. The signal processes may be performed in any order, and any of the signal processes may be assigned to the first signal processing unit 311A or the second signal processing unit 317B.

3.2 Operation of the Imaging Apparatus

The operation of the imaging apparatus of the present embodiment will now be described. The operation parts of the imaging apparatus other than the operation of the dynamic-range compression unit 2001 are the same as described in the above embodiments, and will not be described.

The operation of the dynamic-range compression unit 2001 of the present embodiment will be described with reference to FIG. 19.

Figure 19:
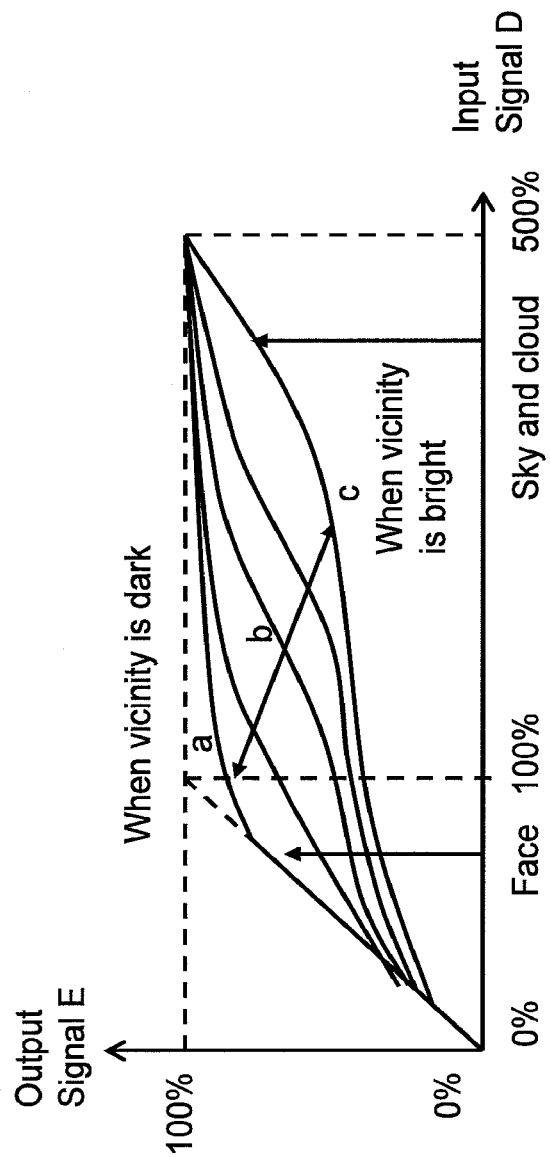
FIG. 19 shows examples of dynamic-range compression characteristics.

The dynamic-range compression unit 2001 has five tone curves (tone level conversion characteristic curves) shown in FIG. 19. The dynamic-range compression unit 2001 selects one of the five tone curves according to the luminance level of a vicinity portion of processing target pixels.

As shown in FIG. 19, the dynamic-range compression unit 2001 selects the curve a when the vicinity portion of the target pixels is the darkest, the curve c when the vicinity portion of the target pixels is the brightest, and the curve b when the vicinity portion of the target pixels has an intermediate luminance level between the darkest and the brightest cases. Although the present embodiment describes the case in which the dynamic-range compression unit 2001 has the five tone level conversion characteristic curves for ease of explanation, the number of the characteristic curves should not be limited to five. It is preferable that the dynamic-range compression unit 2001 actually uses in the tone level conversion of image signals as many tone level conversion characteristic curves as curves that can be assumed substantially continuous to one another. For example, the dynamic-range compression unit 2001 may have several tens of tone level conversion characteristic curves.

The dynamic-range compression unit 2001 uses the tone level conversion characteristic curve a when processing image signals corresponding to a dark vicinity portion of target pixels included in an image (for example, the face vicinity portion 203 in FIG. 5). Thus, the tone levels of image signals corresponding to the person's face portion are converted to tone levels (signal values) corresponding to an appropriate luminance level of about 70%. The dynamic-range compression unit 2001 uses the tone level conversion characteristic curve c when processing image signals corresponding to an extremely bright vicinity portion of target pixels included in the image (for example, the sky and cloud portion 204 in FIG. 5). Thus, the image signals corresponding to the sky and cloud portion 204 are converted to image signals with a sufficiently large number of tone levels and a sufficiently high contrast (gradient). In this manner, through the dynamic range compression performed by the dynamic-range compression unit 2001, the imaging apparatus of the present embodiment (1) sets the large gradient of the input and output characteristic indicating bright range values for a bright portion, and (2) sets the large gradient of the input and output characteristic conversion for a dark portion. Consequently, the imaging apparatus of the present embodiment obtains an image with a high definition (image signals) that is seen (extremely) natural by human eyes.

The dynamic range compression technique described above is based on the visualization characteristics of humans, and this technique is called "visual processing". Such a visualization-characteristic-based technique (visual processing) is based on the visualization characteristics of the eyes of humans. The human eyes (1) increase sensitivity when viewing a bright portion and (2) decrease sensitivity when viewing a dark portion. More specifically, the dynamic range compression technique considers the visualization characteristics of humans that the relative contrast between a predetermined position and its vicinity position is important in viewing the predetermined position irrespective of the actual luminance levels of output signals corresponding to the predetermined position. As a result, the imaging apparatus of the present embodiment that performs the visualization-characteristic-based processing effectively compresses the large dynamic range of an image and prevents an image from being seen unnatural.

The imaging apparatus of the third embodiment compresses an increased dynamic range of 1000% or more of an increased-dynamic-range image, or for example, an increased dynamic range of several thousands percent of an increased-dynamic-range image, which is obtained by the dynamic-range increasing unit 312, to a dynamic range of 100% or less without visually degrading the increased large dynamic range of the image.

3.3 Advantageous Effects of the Imaging Apparatus

The advantageous effects of the imaging apparatus of the present embodiment will now be described using images that are actually captured by the imaging apparatus (camera) of the present embodiment and a conventional imaging apparatus (camera).

Figure 20B:
FIGS. 20A and 20B show photographic images from which the advantageous effects of the imaging apparatus are obvious.
Figure 20A:
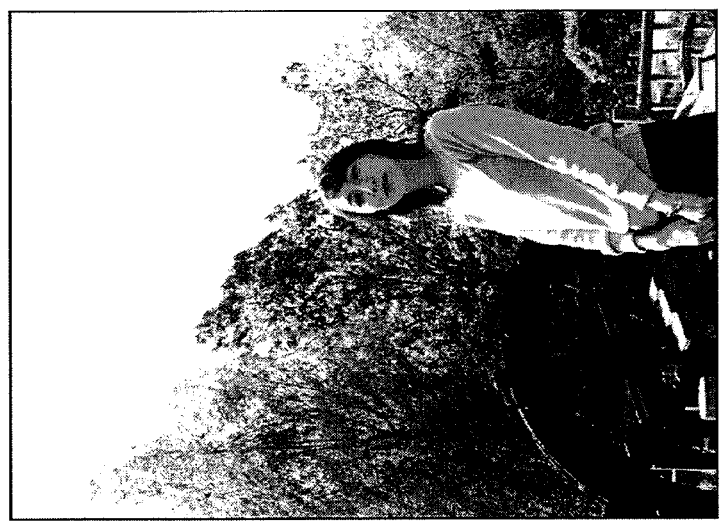

FIG. 20A shows an image captured through conventional camera processing whose exposure is controlled in a manner that a person's face, which is a main subject, has an appropriate luminance level. FIG. 20B shows an image captured by the imaging apparatus that incorporates the dynamic-range compression unit 316 of the present embodiment in the signal processing unit 31 of the second embodiment (an image captured through camera processing of the present embodiment).

The images shown in FIGS. 20A and 20B have almost the same luminance level in dark portions, such as the shaded portion of the waterwheel, and also have almost the same luminance level in the face portion. However, the images have different luminance levels in bright portions, such as the sky and cloud portion and the person's clothing portion in which sunlight is reflected. In detail, the bright portions of the image shown in FIG. 20A are saturated, and overexposed and fail to appropriately reproduce color. In contrast, the bright portions of the image shown in FIG. 20B are seen natural as the bright portions of the image retain their continuously changing tone levels as well as the contours and the contrast of the sky and the cloud.

The images in FIGS. 20A and 20B also differ from each other in the color of the sky. The sky portion of the image in FIG. 20A is overexposed and fails to appropriately reproduce color, whereas the sky portion of the image in FIG. 20B appropriately reproduces color of the blue sky. The comparison between the two images reveals that the dynamic-range compression unit 2001 of the present embodiment effectively compresses the increased dynamic range of image signals to the small dynamic range of 100% and obtains a natural image while effectively using the large dynamic range increased by the dynamic-range increasing unit 2002.

Although the present embodiment describes the case in which the dynamic-range compression unit 2001 has the structure shown in FIG. 18, the present invention should not be limited to this structure of the dynamic-range compression unit 2001. The dynamic-range compression unit 2001 may have another structure. It is only required that the dynamic-range compression unit 2001 can change the input and output conversion characteristic according to spatial positions within an image (or the luminance level of a vicinity portion of predetermined target pixels). For example, the structure of the dynamic-range compression unit 316 of the present invention may be modified to use other techniques known in the art, such as a Retinex-theory-based technique and local histogram equalization, with which the dynamic-range compression unit 2001 can have substantially the same advantageous effects as described above.

The dynamic tone correction unit 3162 may not calculate the tone conversion characteristic curve or the output value according to the vicinity luminance value, but may store the tone conversion characteristic curve or the output value in a two-dimensional LUT.

Figure 21:
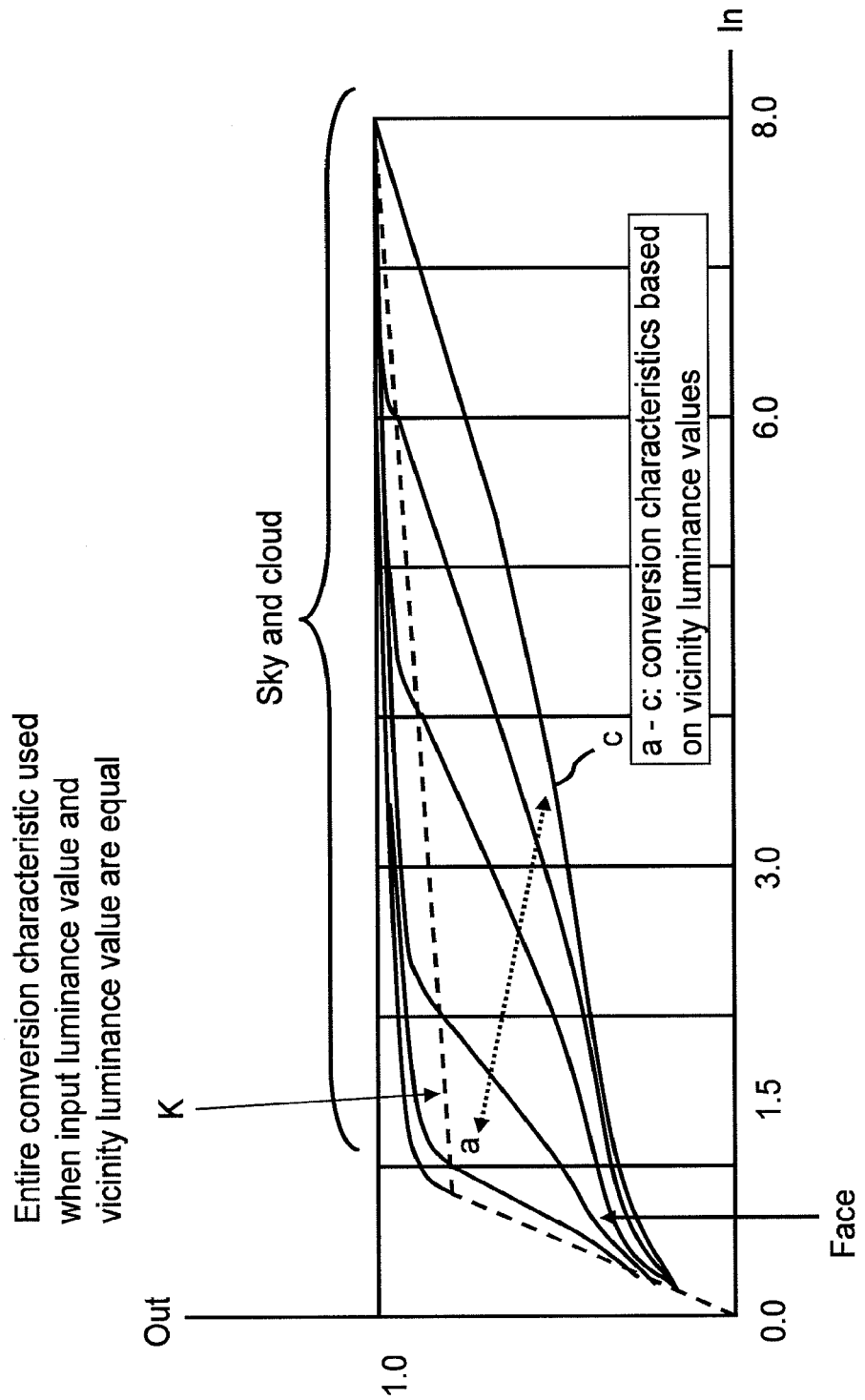
FIG. 21 shows examples of characteristics of data stored in a two-dimensional LUT.

FIG. 21 shows examples of characteristics of data stored in the two-dimensional LUT.

FIG. 21 shows examples of conversion characteristic data of dynamic range compression performed using the two-dimensional LUT when the input dynamic range of the dynamic-range compression unit 2001 is increased to 800% (8.0 in FIG. 21) (the same applies hereafter).

In the figure, a broken line indicated by arrow k represents the conversion characteristic of luminance levels of an image used in the dynamic range compression performed using the two-dimensional LUT. This conversion characteristic corresponds to the knee function of the camera. The conversion characteristic (conversion characteristic indicated by the broken line k) represents values output when an input equal to the vicinity luminance value is input into the dynamic tone correction unit 3162.

In the figure, each curve drawn with a solid line indicates the conversion characteristic that uses the visualization characteristics described above (characteristics that change according to the luminance level of the vicinity portion). In the same manner as described above, the curve a, which indicates the conversion characteristic based on the visual characteristics, is selected when the vicinity portion of processing target pixels is the darkest, and the curve c, which indicates the conversion characteristic based on the visual characteristics, is selected when the vicinity portion of the processing target pixels is the brightest.

When the vicinity luminance value is smaller (darker), a curve located more leftward is selected accordingly. This means that signals corresponding to a darker portion of a natural image are converted in a manner that signals with small input values will retain contrast. As described above, human eyes do not perceive absolute luminance levels based on predetermined pixel values but perceive luminance levels of pixels based on the relative contrast within the closed range of a dark portion.

This particular feature will now be described in detail with reference to FIG. 22.

In a portion (sky and cloud portion) whose input value is 80% (0.8 or more), a vicinity portion (local area) of a point included in the sky portion has a high luminance level that is the same as the luminance level of a point included in the sky portion. Thus, the input value corresponding to this portion (sky and cloud portion) and the luminance level of its vicinity portion are substantially equal to each other. For inputs that are substantially equal to their vicinity luminance values (inputs corresponding to vicinities A, B, and C in the figure), the curves (curves a to c) of the conversion characteristics are set in a manner that the contrast ratio will be maintained at each of the points on the broken line K (vicinities A, B, and C in the figure) (in a manner that the gradient of each of the conversion curves a, b, and c will be greater than the gradient of the curve K (kinked line in FIG. 22), which is defined by the knee function of the camera in the vicinities A, B, and C).

Figure 22:
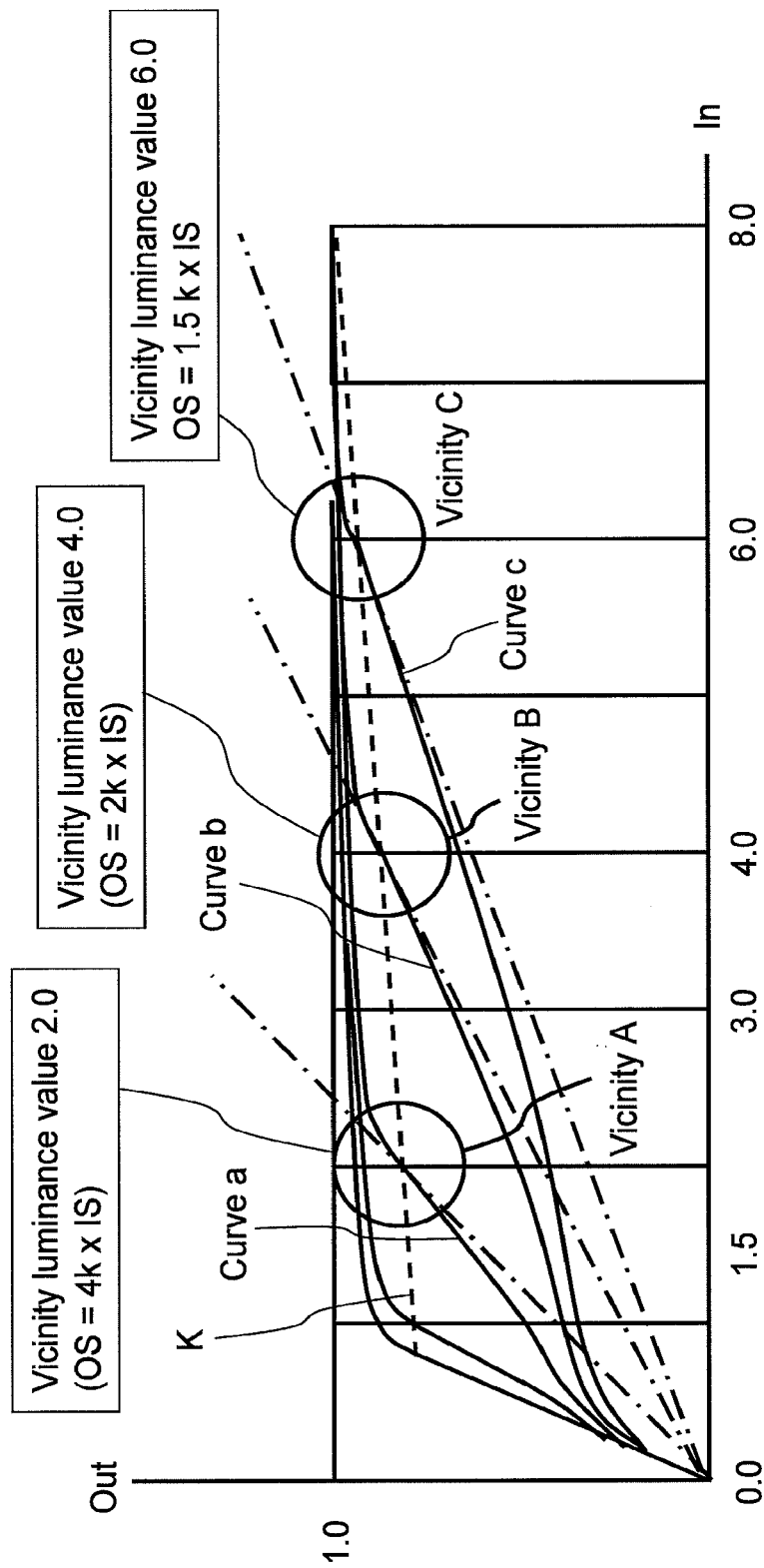
FIG. 22 shows examples of dynamic-range compression characteristics used in a dynamic-range compression process using a visualization-characteristic-based technique.
Figure 23:
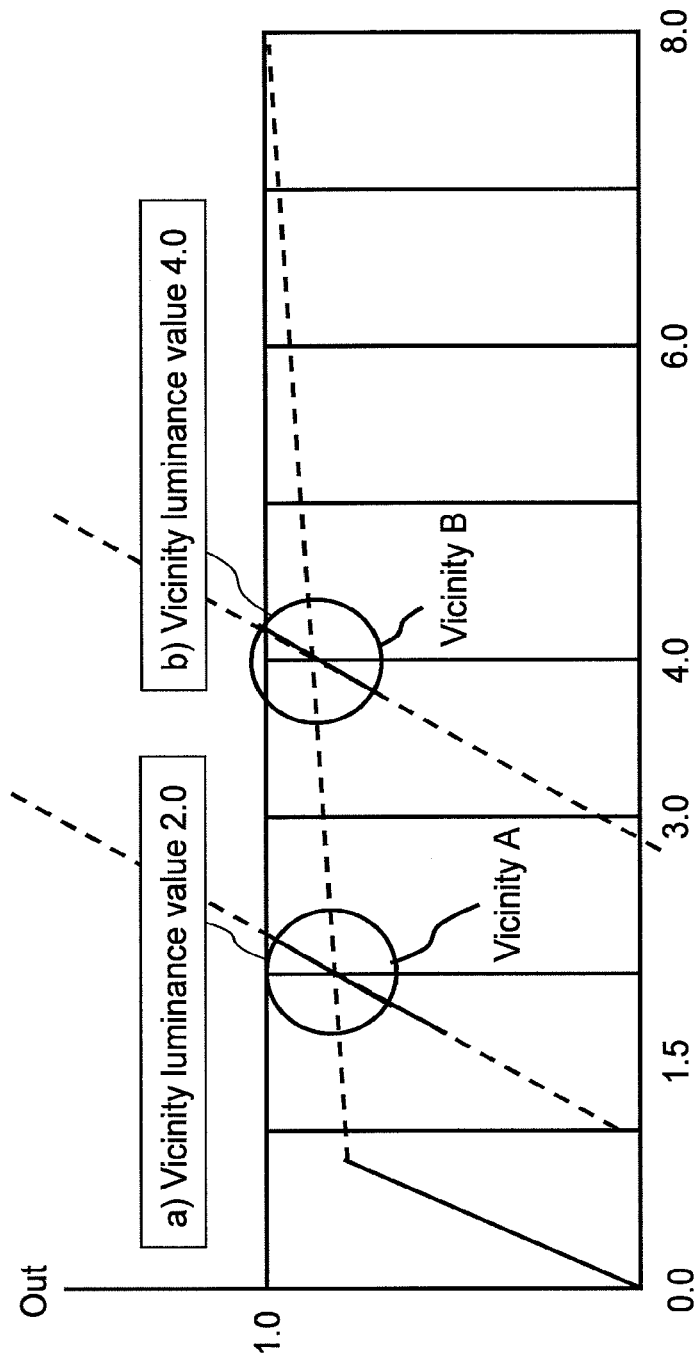
FIG. 23 shows examples of dynamic-range compression characteristics used in a dynamic-range compression process using a visualization-characteristic-based technique.

As shown in FIG. 22, the gradient of the conversion curve in the vicinity (indicated by a circle in the figure) of the point of intersection between the curve K and each of the conversion curves a to c, which is defined by the knee function of the camera, is set the same as the gradient of the straight line that elongates on the point of origin. The gradient of the conversion curve is set in this manner to compress the dynamic range while visually maintaining the contrast. Alternatively, the conversion curve (tone conversion curve) may be set to have a sharp gradient at positions corresponding to a bright portion. In this case, the contrast in the bright portion increases further as shown in FIG. 23.

This means the conversion characteristic changes a value of input digital signal more dynamically in the case a value of the digital signal is close to a value of the vicinity luminance value. If input value (Vi) is close to a vicinity luminance value (VLVi), an amount of change (delta Vi) for value (Vi) is more than an amount of change (delta Vj) for the input value (Vj) which is far from the VLVi (i.e. in the case value Vj is around 0).

Figure 24:
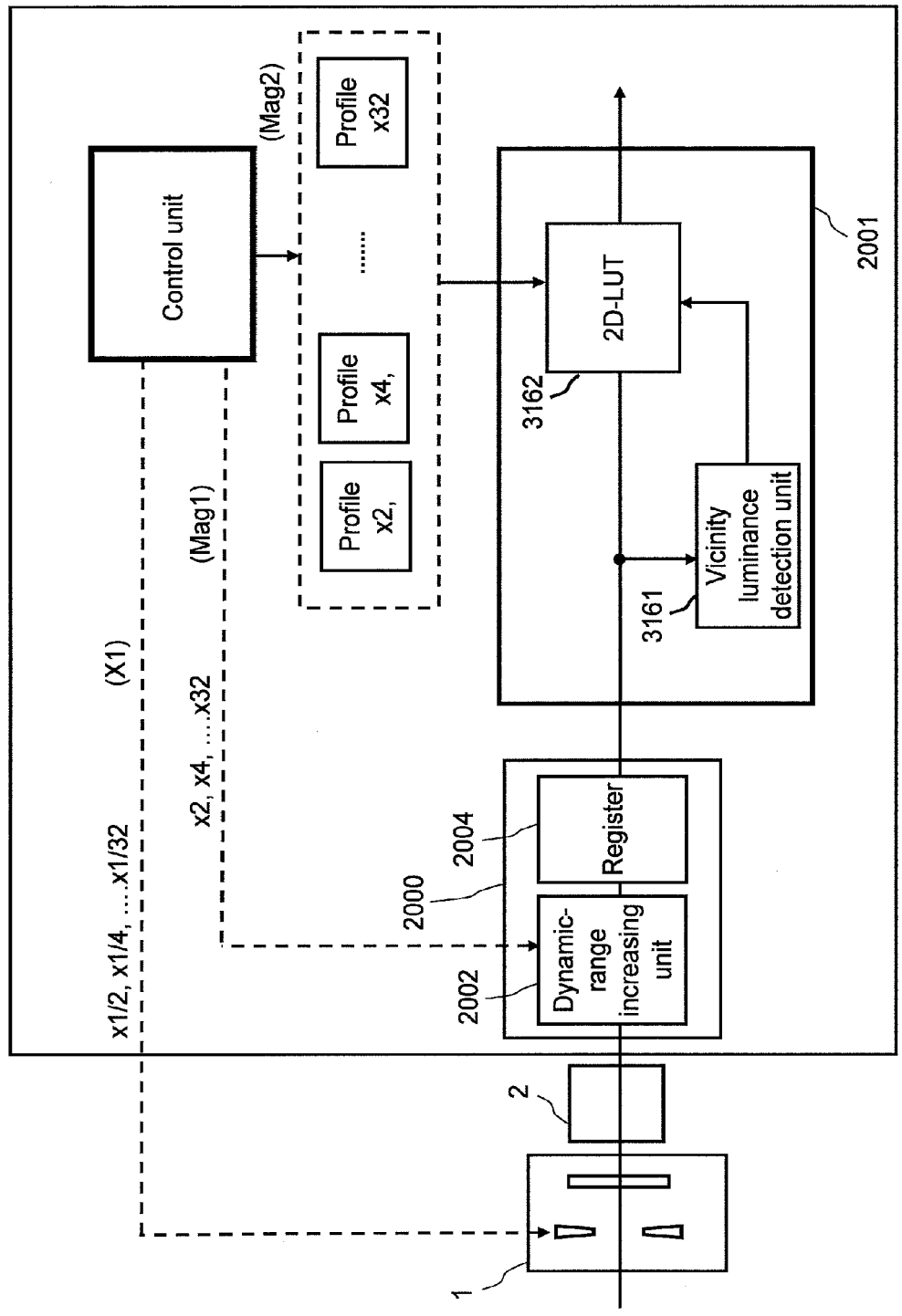
FIG. 24 shows main components of an imaging apparatus using a two-dimensional LUT.

The conversion characteristic data stored in the LUT may be obtained from an external source based on a selection signal MLn (aperture value). In this case, the imaging apparatus has the structure shown in FIG. 24.

Figure 25:
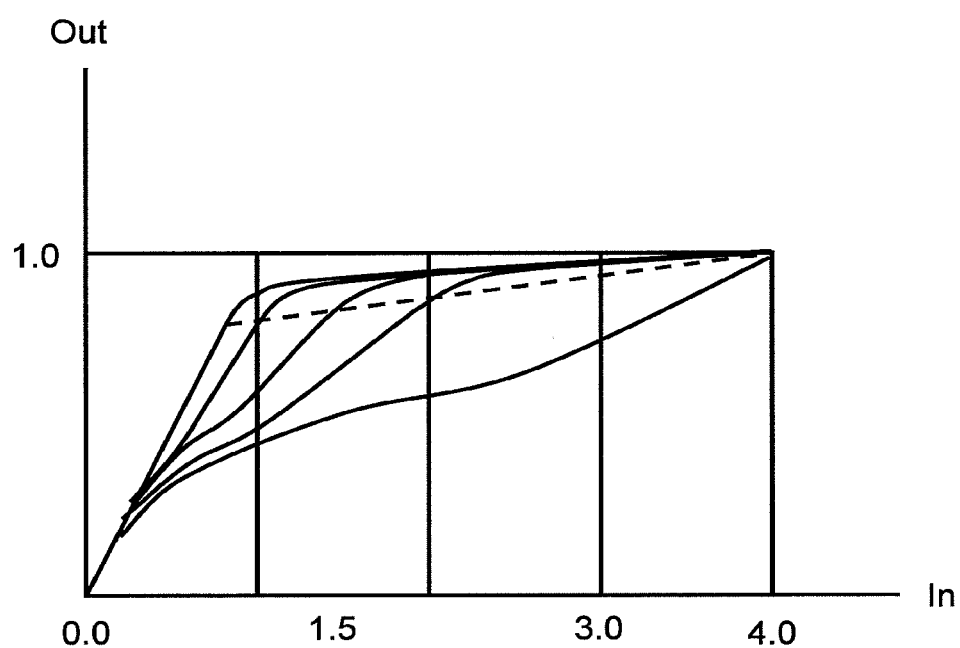
FIG. 25 shows tone conversion characteristics with profiles used when an input range of a two-dimensional LUT is 400% (4.0)
Figure 26:
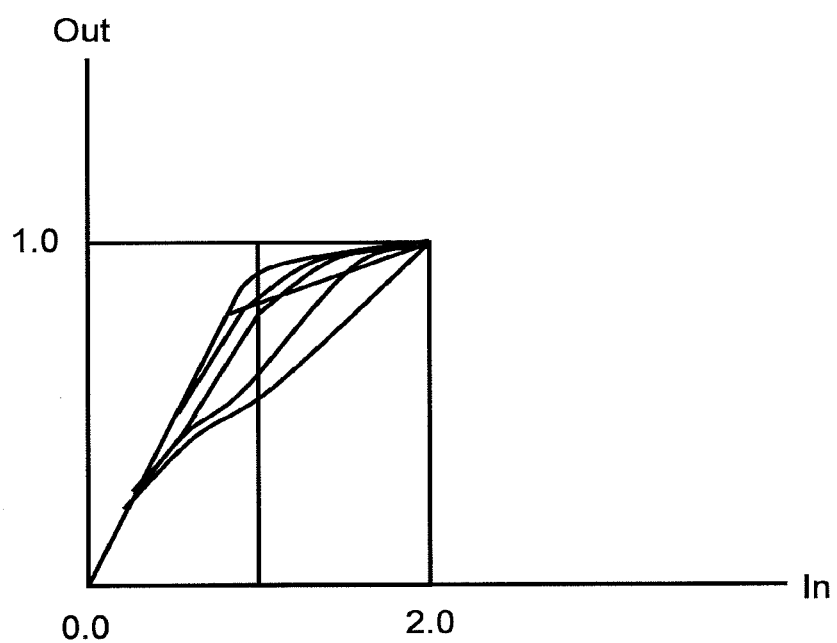
FIG. 26 shows tone conversion characteristics with profiles used when the input range of the two-dimensional LUT is 200% (2.0)

In this case, profiles stored in the LUT define the conversion characteristic curves with the characteristics shown in FIG. 25, which are used when the input range is 400% (4.0), and the conversion characteristic curves with the characteristics shown in FIG. 26, which are used when the input range is 200% (2.0).

Figure 27:
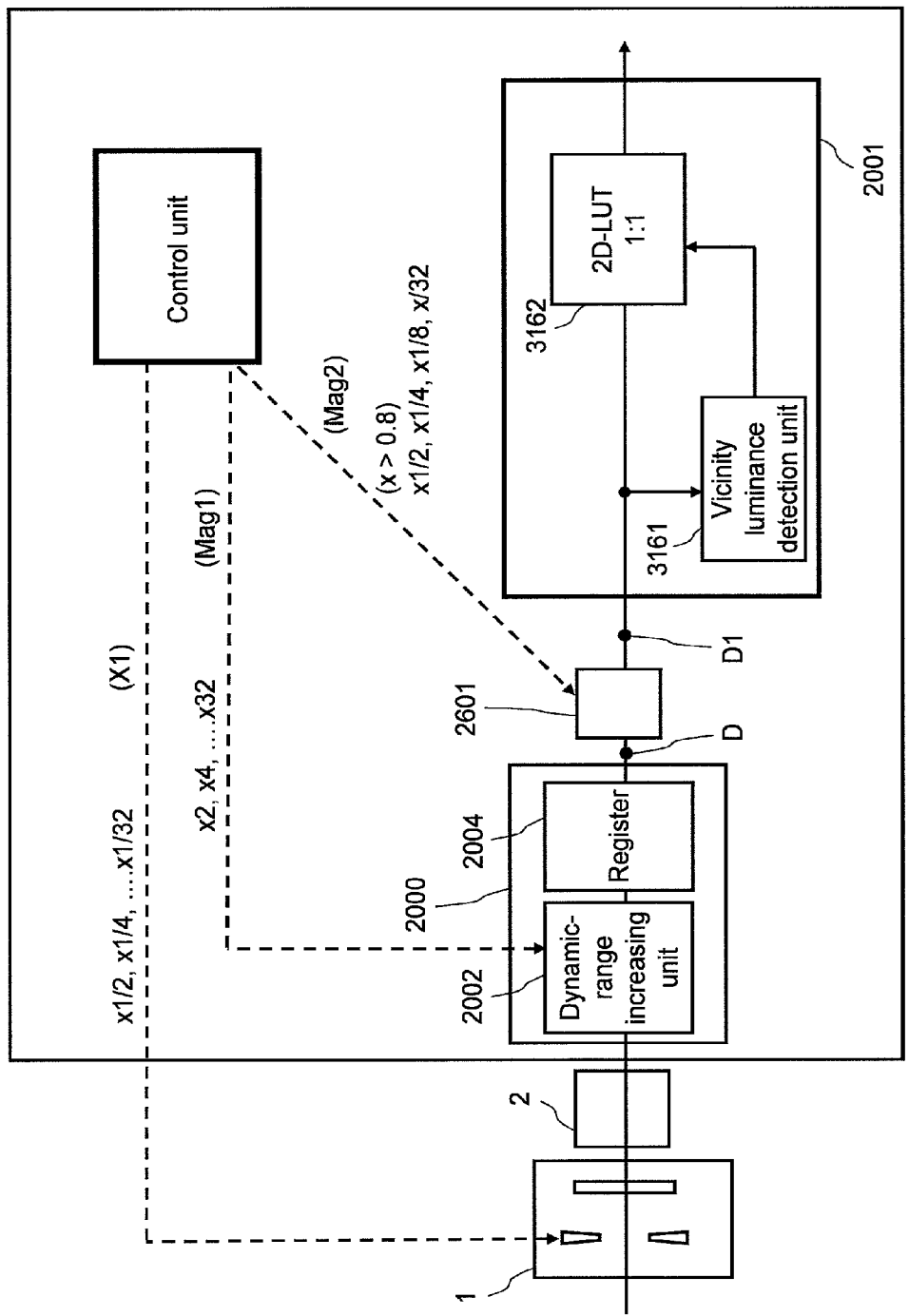
FIG. 27 shows main components of an imaging apparatus that includes a range adjustment unit 2601.

Alternatively, the two-dimensional LUT 3162 may not store a plurality of profiles each of which corresponds to a different dynamic range increase ratio. The two-dimensional LUT 3162 may store only a single profile. In this case, the imaging apparatus is required to include a range adjustment unit 2601 as shown in FIG. 27. More specifically, the range adjustment unit 2601 adjusts the dynamic range when the input signal value (signal value of the signal D) is 80% or more, and may input the signal value (signal value of the signal D), whose dynamic range has been adjusted, into the two-dimensional LUT 3162.

For example, the two-dimensional LUT 3162 may have a profile with an increase ratio of 1 (the conversion characteristic profile that sets the ratio of the output range to the input range as 1). The output range of a signal output from the register 2004 is assumed to be 4.0, and the input range of the two-dimensional LUT is assumed to be 1.0.

In this case, the range adjustment unit 2601 may have an input value D of the signal D, which is generated by increasing the dynamic range of the input value greater than 0.8 (signal value of the signal D). In this case, the range adjustment unit 2601 may have an output value Dout, which is calculated as Dout=0.8+0.2*(D−0.8)/(4.0−0.8).

Figure 28:
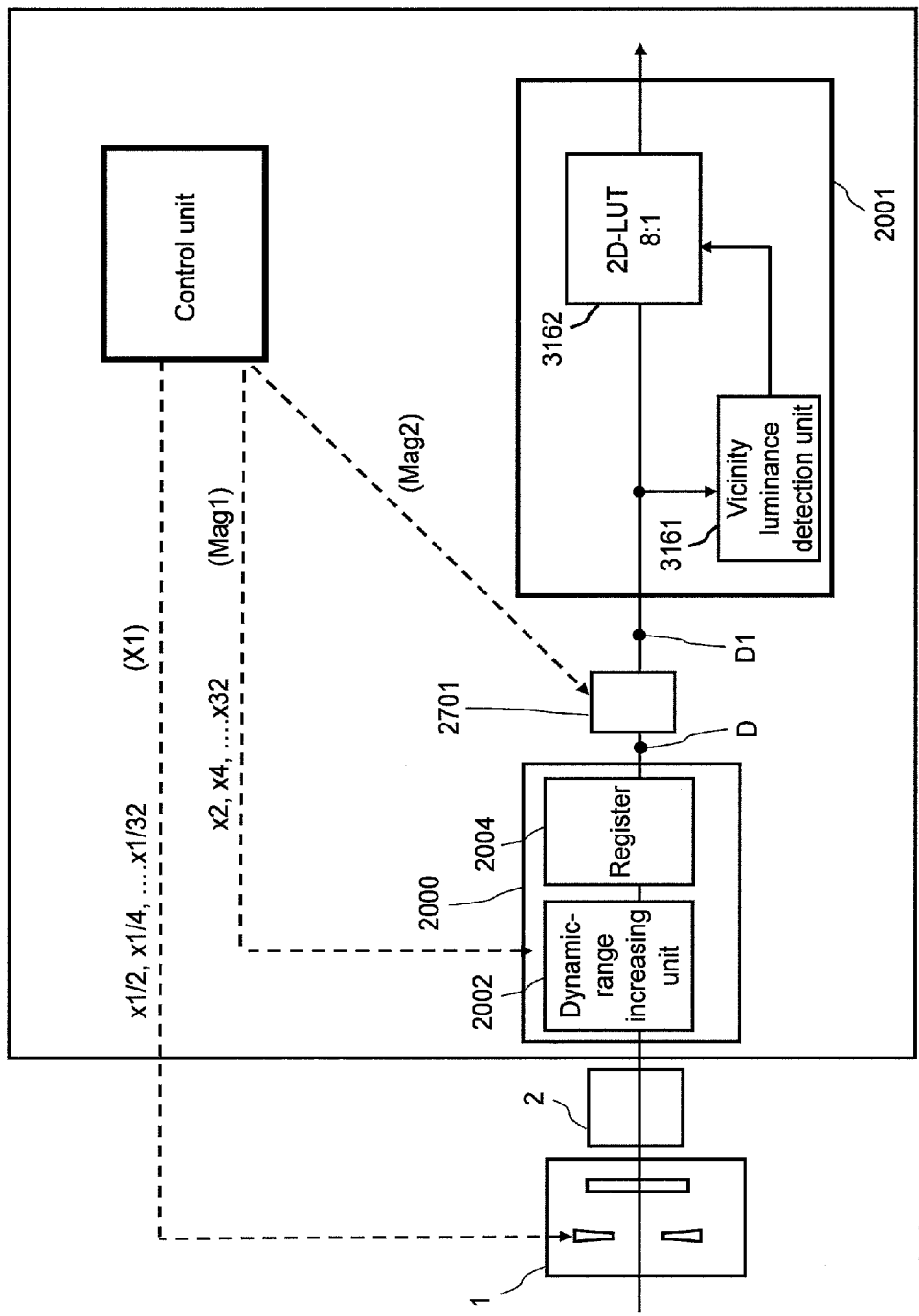
FIG. 28 shows main components of an imaging apparatus that includes a range adjustment unit 2701.

As shown in FIG. 28, the two-dimensional LUT may have a profile with an increase ratio of 8 (the conversion characteristic profile that sets the ratio of the output range to the input range as 8). The output range of a signal output from the register 2004 is assumed to be 4.0, and the input range of the two-dimensional LUT is assumed to be 8.0. In this case, the range adjustment unit 2701 may have an input value D of the signal D, which is generated by increasing the dynamic range of the input value four times. In this case, the range adjustment unit 2701 may have an output value Dout, which is calculated as Dout=0.8+7.2*(D−0.8)/(4.0−0.8), where D>0.8.

Alternatively, the imaging apparatus may include a range adjustment unit 2701, which adjusts the dynamic range based on a signal Mag2 as shown in FIG. 28.

Figure 29:
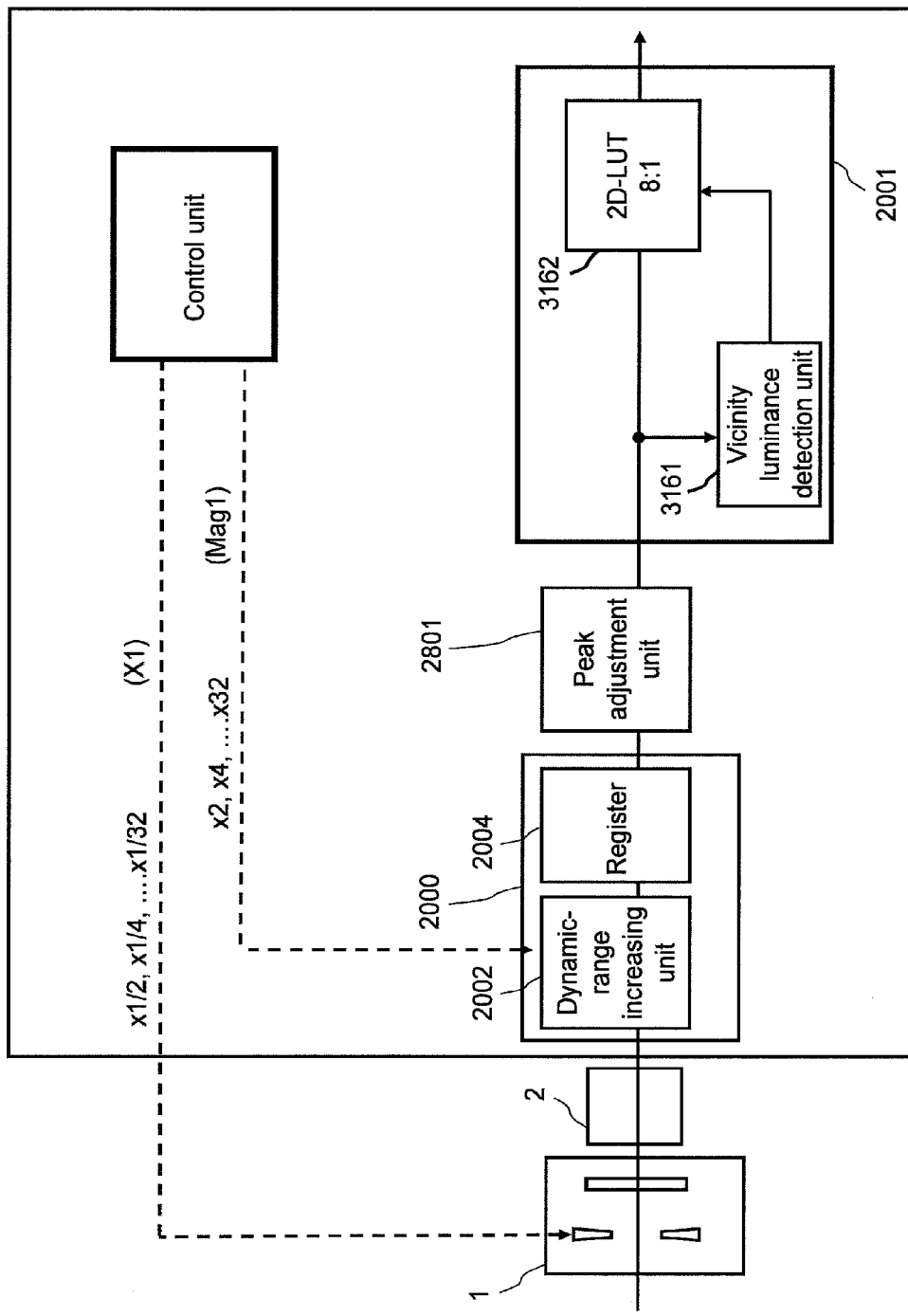
FIG. 29 shows main components of an imaging apparatus that includes a peak adjustment unit 2801.

Alternatively, the imaging apparatus may include a peak adjustment unit 2801 as shown in FIG. 29. The peak adjustment unit 2801 detects the peak value of image data corresponding to one image (image data corresponding to one frame) that is formed using the signals D whose dynamic range has been increased, and adjusts the input value greater than 80% (0.8) based on the maximum value (Pmax) according to the detected peak value. More specifically, the peak adjustment unit 2801 may adjust the signal value in a manner that the maximum value X of the signal will be increased to the input range of the two-dimensional LUT 3162 after the dynamic range of the signal is increased by the dynamic-range increasing unit 2002. For example, when the two-dimensional LUT 3162 stores a profile with a dynamic range increase ratio of 8 (the conversion characteristic profile that sets the ratio of the output range to the input range as 8), the peak adjustment unit 2801 may have an output value Dout, which is calculated as Dout=0.8+7.2*(D−0.8)/(Pmax−0.8), where D is the input value of the peak adjustment unit 2801.

Alternatively, the peak adjustment unit 2081 shown in FIG. 29 may adjust the peak value based on a signal Mag2.

Although the maximum value of the input value of the two-dimensional LUT 3162 is 8.0 (800%) in the above example, the input value of the two-dimensional LUT 3162 may be increased to 16.0 (to 1600%) or 32.0 (to 3200%) as long as the input has the same characteristic as described above (the gradient of the input and output conversion coefficient (input and output conversion curve) has the tendency of the curve defined by the knee function of the camera when the input value greater than 0.8 is equal to its vicinity luminance value).

The data (output data) stored into the two-dimensional LUT 3162 may not directly be an output value with respect to an input value and a vicinity luminance value. The data may be a coefficient from which the output value is calculated.

The size of the vicinity portion of an image that is processed by the vicinity luminance detection unit 3161 may be set according to a required level of the visual effect. It is preferable that the vicinity luminance detection unit 3161 uses a vicinity portion (portion consisting of pixels that are in the vicinity of processing target pixels) with a certain size to achieve a required level of the visual effect. For example, when the image is an XGA (eXtended Graphics Array) image (1024 by 768 pixels), it is preferable to set the vicinity portion (portion consisting of pixels that are in the vicinity of processing target pixels) having at least an area corresponding to 80 by 80 pixels.

Figure 30:
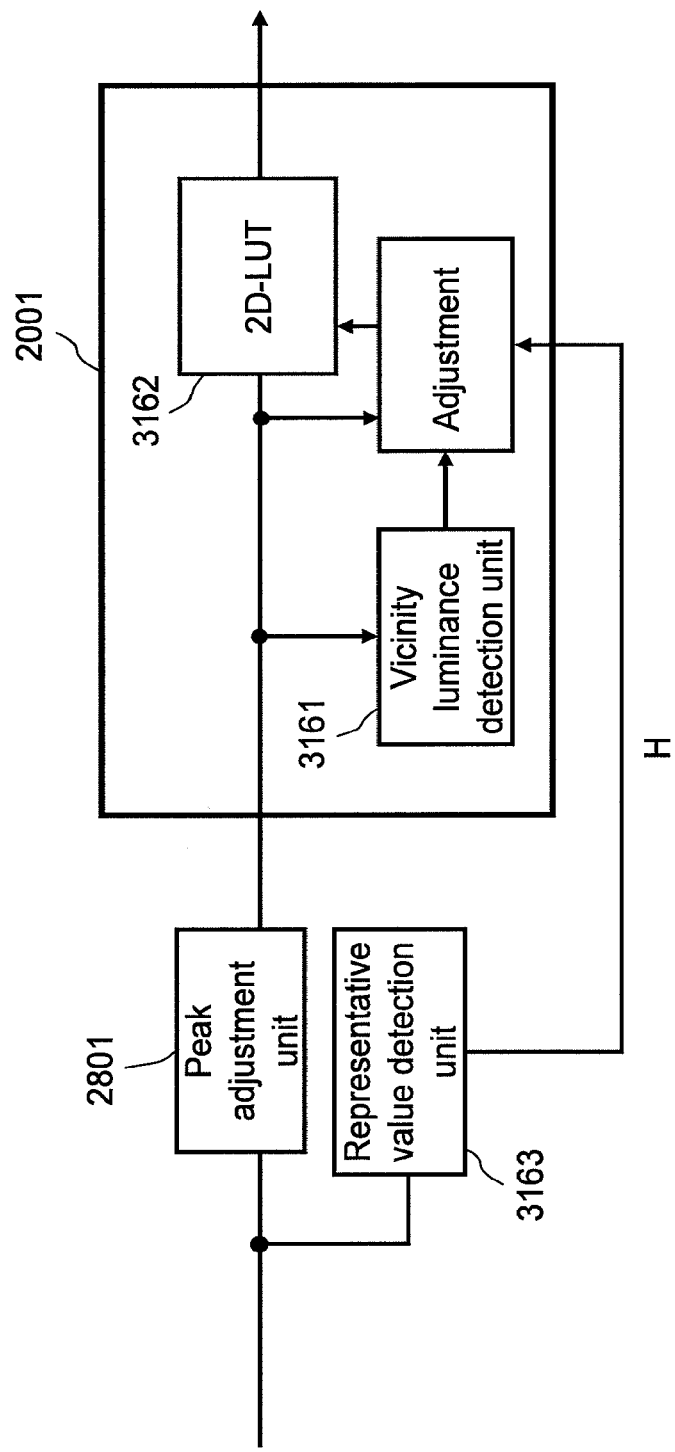
FIG. 30 shows main components of the peak adjustment unit 2801, the dynamic-range compression unit 2001, and a representative value detection unit 3163 included in the imaging apparatus.

The vicinity luminance detection unit 3161 may use a low-pass filter to obtain information about a vicinity portion of processing target pixels, such as an FIR (finite impulse response) low-pass filter or an IIR (infinite impulse response) low-pass filter, which is normally used to generate unsharp signals. Alternatively, the imaging apparatus may include a representative value detection unit 3163 as shown in FIG. 30. The representative value detection unit 3163 is used to adjust the local contrast of the image data.

Fourth Embodiment

An imaging apparatus according to a fourth embodiment of the present invention will now be described.

The imaging apparatus according to the fourth embodiment obtains image signals corresponding to a plurality of sub-frames by subjecting the image sensor to a plurality of sequential divisional exposures (short exposures), which are performed to prevent an output of the A/D converter from being saturated. Through the exposures, the image sensor reads an optical image of a subject, which has been formed using light focused by an optical system having the light amount adjustment function, and obtains the image signals corresponding to the plurality of sub-frames. The imaging apparatus of the present embodiment then converts the sub-frame image signals corresponding to the plurality of sub-frames by A/D conversion, which is performed by the A/D converter, to generate digital sub-frame images. The imaging apparatus then increases the dynamic range of each pixel of the digital sub-frame images and adds up the same pixels of the different images. As a result, the imaging apparatus forms an increased-dynamic-range image, which is an image with an increased dynamic range.

The imaging apparatus with this structure obtains the plurality of sub-frame images by subjecting the image sensor to the plurality of sequential divisional exposures. In this case, the sub-frame images obtained by the imaging unit are dark. Thus, outputs resulting from A/D conversion corresponding to even a bright portion of the subject are less likely to be saturated. The imaging apparatus increases the dynamic range of each pixel of the plurality of sub-frame images, which have been obtained through the plurality of divisional exposures, and adds up the same pixels of the plurality of sub-frame images. As a result, the imaging apparatus forms an increased-dynamic-range image. Therefore, the imaging apparatus prevents an output image from being saturated and enables the output image to have an appropriately high luminance level. Consequently, the imaging apparatus of the present embodiment obtains a large dynamic range image while preventing the S/N ratio of the image from deteriorating. The imaging apparatus of the present embodiment appropriately captures an image of even a scene including a backlit person outdoors without saturating a bright portion of the image, such as a sky or cloud portion, even when a dark portion of the image, such as a person's face portion, is corrected to have an appropriate luminance level.

4.1 Structure of the Imaging Apparatus

Figure 31:
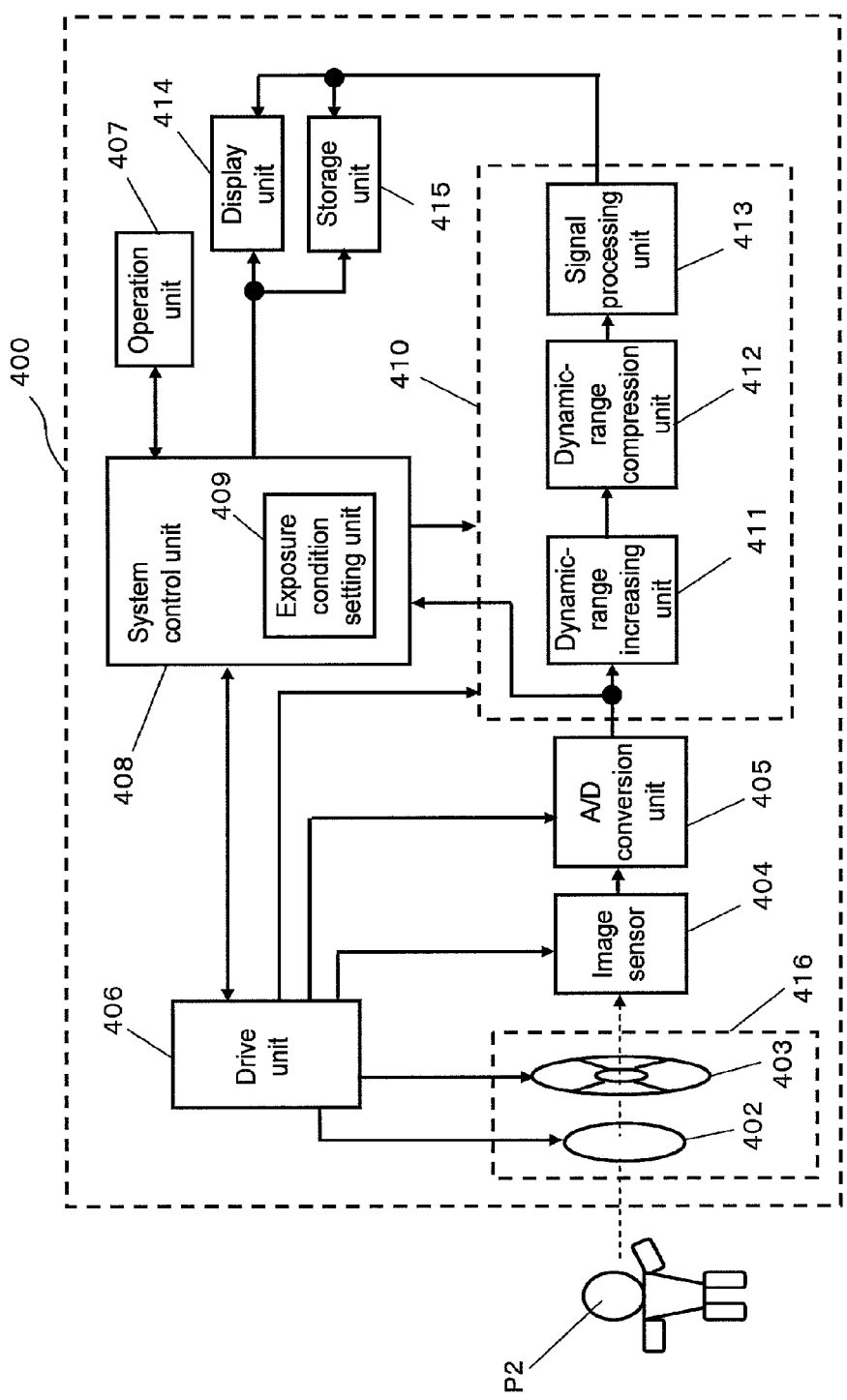
FIG. 31 shows main components of an imaging apparatus according to a fourth embodiment of the present invention.
Figure 33:
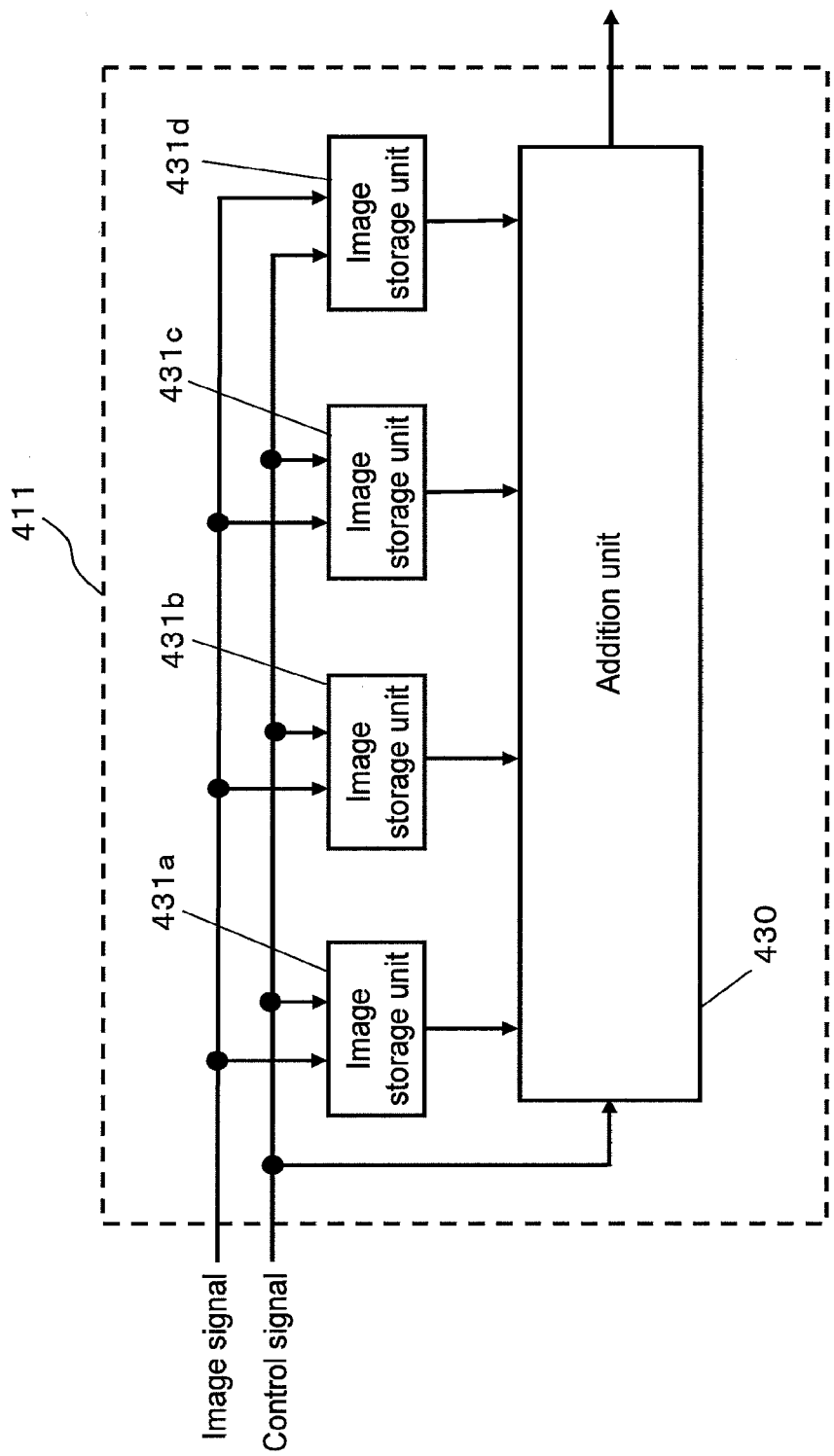
FIG. 33 shows main components of a dynamic-range increasing unit included in the imaging apparatus.

The structure of the imaging apparatus 400 according to the fourth embodiment will now be described with reference to FIGS. 31 to 33. FIG. 31 is a block diagram showing the structure of the imaging apparatus 400 of the present embodiment. FIGS. 32A and 32B are timing charts chronologically describing the operation of the imaging apparatus 400 of the present embodiment. FIG. 33 is a block diagram showing the structure of the dynamic-range increasing unit 411 included in the imaging apparatus 400. The number of divisional exposures into which the exposure for capturing one scene image is divided is determined according to a required dynamic range increasing ratio. For ease of explanation, the exposure is assumed to be divided into four divisional exposures in the present embodiment.

As shown in FIG. 31, the imaging apparatus 400 of the present embodiment includes an optical system 416, an image sensor (imaging unit) 404, and an A/D converter 405. The optical system 416 includes an optical system 402 and an aperture 403. The optical system 402 includes a lens and other components. The aperture 403 is arranged at the back of (subsequent to) the optical system 402, and adjusts the amount of incident light. The image sensor (imaging unit) 404 is, for example, a CCD image sensor or a CMOS image sensor. The image sensor (imaging unit) 404 converts an optical image of a subject P2, which has been formed with the light focused by the optical system 416, to electric signals. The A/D converter 405 converts analogue images, which are output from the image sensor (imaging unit) 404, to digital images. The imaging apparatus 400 further includes an operation unit 407, a system control unit 408, an optical system 416, and a drive unit 406. The operation unit 407 receives an operation command input by a user. The system control unit 408 controls the entire imaging apparatus according to settings output from the operation unit 407. The optical system 416 operates based on a command signal provided from the system control unit 408. The drive unit 406 drives the image sensor 404 and the A/D converter 405. The imaging apparatus 400 further includes an image processing unit 410, a display unit 414, and a storage unit 415. The image processing unit 410 generates a dynamic-range-increased image (image signals), which is an image with an increased dynamic range, based on RGB images (image signals), which are images resulting from A/D conversion performed by the A/D converter 405. The display unit 414 displays an image (image formed using the image signals), which has been processed by the image processing unit 410. The storage unit 415 stores the image processed by the image processing unit 410.

The optical system 416 includes the optical system 402 and the aperture 403, and forms the optical image of the subject P2 onto the image sensor (imaging unit) 404.

The optical system 402 includes a lens and other components, which are known in the art.

According to an exposure condition set by an exposure condition setting unit 409, which will be described later, the aperture 403 adjusts the amount of incident light before the image sensor 404 is subjected to the plurality of divisional exposures. More specifically, the aperture 403 adjusts the amount of incident light according to a predetermined exposure time in a manner that a subject main portion (for example, a person's face portion) will have a predetermined luminance level. In this manner, the optical system 402 and the aperture 403 correspond to the light amount adjusting function of the optical system 416.

The image sensor 404 includes an array of pixels each having the same sensitivity. The image sensor 404 receives incident light for the predetermined exposure time. The amount of the incident light is adjusted by the aperture 403. The image sensor 404 outputs analogue image signals, which are proportional to the amount of exposure light that is the incident light amount multiplied by the predetermined exposure time.

The A/D converter 405 converts analogue image signals output from the image sensor 404 to digital images (digital image signals).

The drive unit 406 drives the optical system 402, the aperture 403, the image sensor 404, and the A/D converter 405 based on a command signal provided from the system control unit 408.

The system control unit 408 includes a central processing unit (CPU), a read only memory (ROM), and a random access memory (RAM). The CPU executes predetermined processing according to programs. The ROM is a read-only storage device that stores programs and data. The RAM is a rewritable memory for temporarily storing data.

The operation unit 407 outputs the settings performed by the user, such as an imaging mode set by the user, to the system control unit 408, which will be described later. The user may selectively set the imaging mode according to, for example, a subject scene. The imaging apparatus may have, for example, an indoor imaging mode, an outdoor imaging mode, a sport scene imaging mode, a portrait scene imaging mode, and a landscape scene imaging mode. In particular, the user selects the outdoor imaging mode for an outdoor scene. In this case, the incident light has a large dynamic range. Thus, the exposure condition is set in a manner that a main subject portion (person's face portion) of the scene that may be backlit and dark will have an appropriate luminance level. Even in this case, the imaging apparatus is required to process image signals in a manner that an output corresponding to a bright subject portion of the scene (for example, a sky and cloud portion) is not saturated.

The system control unit 408 includes the exposure condition setting unit 409. The system control unit 408 reads RGB image signals, which are output from the A/D converter 405. The exposure condition setting unit 409 then calculates an appropriate exposure condition. More specifically, the system control unit 408 sets the exposure condition using the exposure condition setting unit 409 in a manner that a main subject portion will have a predetermined luminance level (appropriate luminance level). The system control unit 408 outputs a command signal to the drive unit 406. According to the command signal, the drive unit 406 is driven to appropriately adjust the light amount according to the determined exposure condition. The system control unit 408 also controls the entire imaging apparatus 400 according to the user settings in the operation unit 407.

The exposure condition setting unit 409 is included in the system control unit 408. When, for example, a preview image of a scene is formed before an image of the scene is actually captured, the exposure condition setting unit 409 temporarily reads RGB images corresponding to one screen (data of RGB images corresponding to one screen formed using RGB image signals), which are output from the A/D converter 405, and temporarily stores the RGB images into an internal memory (not shown). The exposure condition setting unit 409 then calculates the exposure condition in a manner that an output value corresponding to a main portion of the subject P2 will have an appropriate luminance level. For example, the exposure condition of the imaging apparatus 400 is set in a manner that a person's face portion of the image will have a luminance level of 70% when the dynamic range of an output image is 100%, which is the dynamic range of output image signals with values corresponding to luminance levels of 0 to 100%.

The image processing unit 410 includes a dynamic-range increasing unit 411 and a dynamic-range compression unit 412. The dynamic-range increasing unit 411 increases the dynamic range of RGB image signals output from the A/D converter 405. The dynamic-range compression unit 412 compresses the dynamic range of the increased-dynamic-range image, which is an image whose dynamic range has been increased by the dynamic-range increasing unit 411, to a predetermined dynamic range. The image processing unit 410 further includes a signal processing unit 413, which processes signals to have a signal format suitable for the display unit 414 and the storage unit 415 (for example, NTSC, JPEG, or MPEG).

The display unit 414 is arranged, for example, on the back surface of the main body of the imaging apparatus 400. The display unit 414 includes a display, such as a color LCD. The display unit 414 displays an image that is formed using the image signals processed by the image processing unit 410 on the display, such as the color LCD.

The storage unit 415 stores the image (image signals) processed by the signal processing unit 413. The storage unit 415 may be formed by, for example, a recording medium known in the art, such as a hard disk drive (HDD) or a semiconductor memory.

4.2 Operation of the Imaging Apparatus

The main operation of the imaging apparatus 400 of the present embodiment will now be described in the chronological order.

As shown in FIG. 32A, the drive unit 406 outputs control signals (B) for controlling the image sensor 404 and the image processing unit 410 based on synchronization signals (A) having cycles T. As described later, the exposure condition for the predetermined exposure time $t_0$, which is indicated by control signals (C), is set in a manner that a main portion of the subject P2 will have an appropriate luminance level. When, for example, the main portion is a person's face portion, the exposure condition of the imaging apparatus 400 is set in a manner that the main portion (person's face portion) will have a luminance level of 70% with respect to an output dynamic range of 100%. The aperture 403 adjusts the amount of light incident on the image sensor 404 based on the set exposure condition. The range of outputs of the A/D converter 405 that are not saturated is set with a margin. More specifically, the A/D converter 405 can have outputs corresponding to luminance levels up to 150% without saturating the outputs. In other words, among image signals output from the A/D converter 405, image signals with values corresponding to luminance levels up to 150% are not saturated.

When capturing a still image, the imaging apparatus 400 performs the exposure processing of one cycle, which is the processing performed in the cycle T (frame cycle), only once. When capturing a moving image, the imaging apparatus 400 repeatedly performs the exposure processing of one cycle a plurality of times as required according to the time for which the imaging apparatus is being operated to capture the image.

In the present embodiment, the exposure of one cycle is assumed to be divided into a plurality of sequential divisional exposures. The imaging apparatus 400 is assumed to obtain a plurality of images through the plurality of sequential divisional exposures. The images obtained through the divisional exposures are assumed to be images corresponding to sub-frames. Before converted by A/D conversion, the sub-frame images are referred to "sub-frames analogue images", or simply "analogue images". After converted by A/D conversion, the sub-frame images are referred to as "sub-frame digital images", or simply "digital images". Image signals that are used to form the sub-frame analogue images are referred to as "analogue image signals", whereas image signals that are used to form the sub-frame digital images are referred to as "digital image signals". The same notation applies both to the processing for capturing a moving image and the processing for capturing a still image.

As shown in FIG. 32B, to increase the output margin of the A/D converter 405 further, the drive unit 406 drives the image sensor 404 in a manner that the image sensor 404 is subjected to the sequential divisional exposures, each of which is performed for the time $t_1$, which is ¼ of the predetermined exposure time $t_0$. The predetermined exposure time $t_0$ is $t_0 = 4 * t_1$. The drive unit 406 drives the image sensor 404 and controls the time for which the image sensor 404 is exposed using, for example, the electronic shutter function of the image sensor 404.

As indicated by control signals (B), an analogue image (analogue image signals), is obtained through each divisional exposure performed for the exposure time $t_1$. The analogue image is then converted to a digital image (digital image signals) by the A/D converter 405 during the time t2, which is indicated by control signals (D). The digital image signal is transferred to the image processing unit 410.

The image processing unit 410 stores digital images transferred from the A/D converter 405 into memory units (image storage units). The image processing unit 401 reads image data of the same pixels of the different digital images from the same addresses of the different memory units. The image processing unit 401 increases the dynamic range of each pixel, and adds up the image data of the same pixels of the different digital images. As a result, the image processing unit 401 obtains a dynamic-range-increased image 102, which is an image with an increased dynamic range, as indicated by signals (E).

The analogue image obtained through each divisional exposure that is performed for the exposure time $t_1$, which is shorter than the predetermined exposure time $t_0$, has a smaller output value (smaller values of analogue image signals) than an analogue image that would be obtained through an exposure performed for the predetermined exposure time $t_0$. Thus, an image resulting from A/D conversion of the an analogue image obtained through the divisional exposure will have a larger margin with respect to a saturation limit of an output of the A/D converter. The four analogue images obtained by the image sensor 404 through the four divisional exposures are converted by the A/D converter 405 to generate four digital images. The digital images are then subjected to the dynamic range increase, and are added up to form an image. This image has the same output value as an image that would be formed based on an image obtained through the exposure performed for the predetermined exposure time $t_0$. As a result, the image formed by adding up the images obtained through the divisional exposures has the S/N ratio equivalent to the S/N ratio of the image that would be formed based on the image obtained through the exposure performed for the predetermined exposure time $t_0$.

The imaging apparatus 400 is further advantageous in that the imaging apparatus 400 forms an increased-dynamic-range image, which is an image with an increased dynamic range, by converting the four analogue images obtained through the divisional exposures, each of which is performed for the exposure time $t_1$, to four digital images and increasing the dynamic range of each pixels of the four digital images and then adding up the same pixels of the four digital images.

In other words, the exposure light amount used in the divisional exposure performed for the exposure time $t_1$ is smaller than the exposure light amount that would be used in the exposure performed for the predetermined exposure time $t_0$. Therefore, the output value of each analogue image obtained through the divisional exposure, which is output from the image sensor 404, is smaller accordingly. As a result, the output margin of the A/D converter 405 with respect to its saturation limit is $t_0/t_1$ times greater. Therefore, the output resulting from the A/D conversion is less likely to be saturated.

Alternatively, the analogue images obtained by the image sensor 404 may be converted to digital images before the analogue images are subjected to the dynamic range increase, and the digital images may be subjected to the dynamic range increase. More specifically, the imaging apparatus 400 may first obtain a plurality of analogue images by subjecting the image sensor 404 to a plurality of sequential divisional exposures, which are performed to prevent an output of the A/D converter 405 from being saturated. The imaging apparatus 400 may then convert the analogue images to digital images using the A/D converter 405, and increase the dynamic range of each pixel of the different digital images and add up the same pixels of the different digital images. The imaging apparatus 400 with this structure also obtains a dynamic-range-increased image, which is an image with an increased dynamic range, for the same reasons as described above.

4.2.1 Details of the Dynamic-Range Increasing Unit 411

The dynamic-range increasing unit 411 included in the imaging apparatus 400 of the present invention will now be described in detail with reference to FIGS. 33 to 35.

FIG. 33 is a block diagram showing the structure of the dynamic-range increasing unit 411. FIG. 34 is a diagram describing the characteristic of the dynamic-range increasing unit 411 included in the imaging apparatus 400 of the present embodiment. FIG. 35 is a diagram describing the imaging state of the subject P2, whose image is captured by the imaging apparatus 400 of the present embodiment.

As shown in FIG. 33, the dynamic-range increasing unit 411 includes image storage units 431a to 431d and an addition unit 430. The image storage units 431a to 431d store images (including R, G, and B images), which are output from the A/D converter 415. The addition unit 430 adds up the same pixels of different images stored in the image storage units 431a to 431d after increasing the dynamic range of each pixel.

To enable the dynamic range increase, the addition unit 430 may be formed by, for example, an adder with increased bits. When, for example, the output of the A/D converter 405 is 10-bit data and the exposure time is divided by four (four divisional exposures are performed), the addition unit 430 may be formed by an adder with 12 bits, which has a 2-bit increase to the output bit number of the A/D converter 405. The number of bit increase should not be limited to 2 bits. The number of bit increase is determined in advance according to the number by which the exposure time is divided (in other words, the number of divisional exposures). When, for example, the exposure time is divided by eight, the required bit increase would be 3 bits or more. In the same manner, when the exposure time is divided by sixteen, the required bit increase would be 4 bits or more, and when the exposure time is divided by two, the bit increase would be 1 bit or more.

Figure 34:
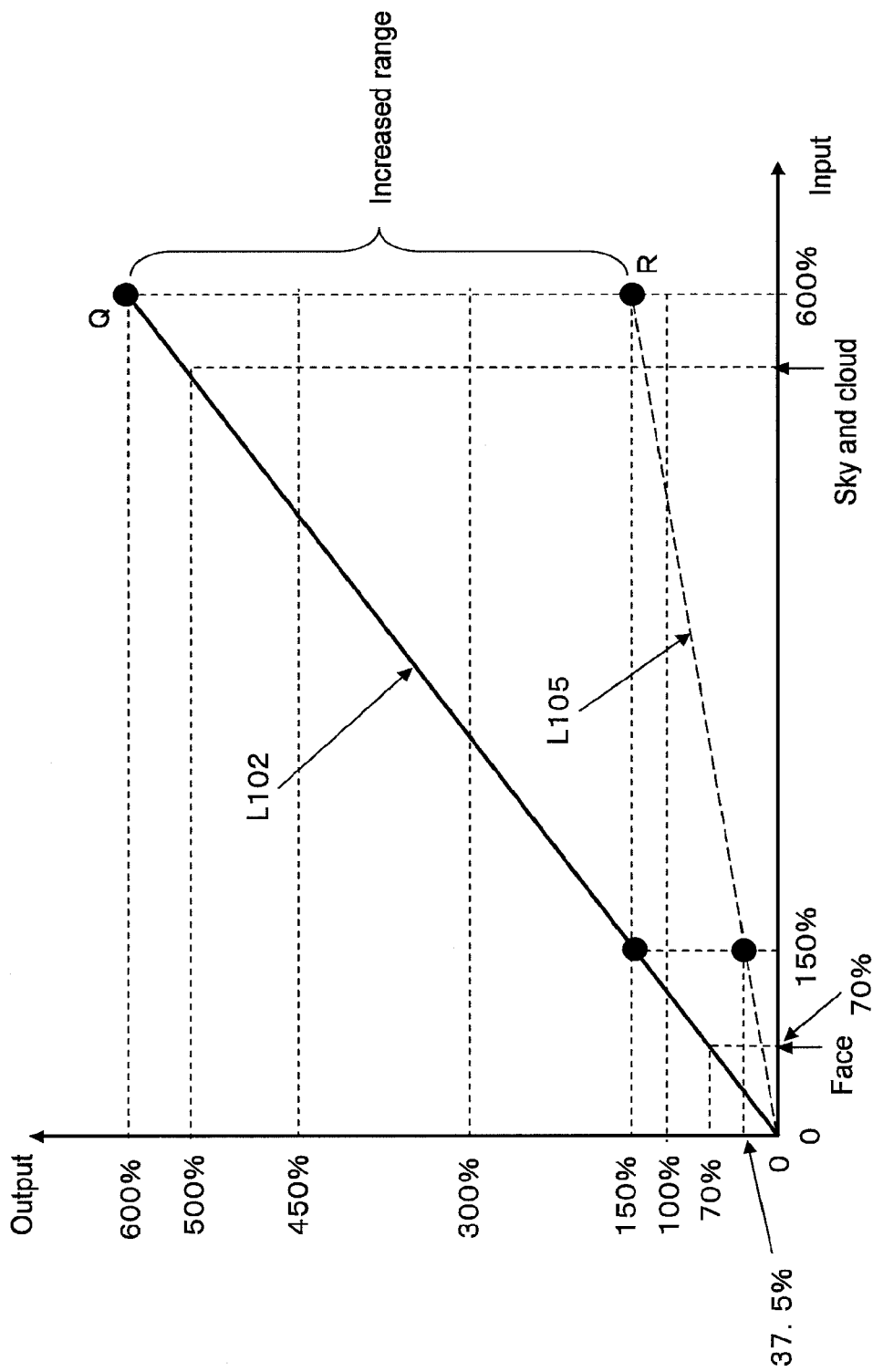
FIG. 34 is a diagram describing the dynamic-range increasing unit included in the imaging apparatus.

FIG. 34 is a graph showing the dynamic-range conversion characteristic of the dynamic-range increasing unit 411.

As shown in FIG. 34, when, for example, the amount of incident light used in the exposure performed for the predetermined exposure time $t_0$ corresponds to a luminance level of 150%, the aperture 403 adjusts the light amount in a manner that an output of the A/D converter 405 will have a luminance level corresponding to the saturation limit (a luminance level of 150%). In this case, the exposure time $t_1$ is $t_1 = t_0/4$.

Thus, when the exposure performed for the predetermined exposure time to and the divisional exposure performed for the exposure time $t_1$ are compared under the same incident light amount condition, an analogue image (analogue image signals) obtained by the image sensor 404 through the divisional exposure has a smaller output value, which corresponds to a luminance level of 37.5%. As a result, the output resulting from the A/D conversion (see a straight line L105 indicating the input and output characteristic in FIG. 34) has a smaller signal value, which corresponds to a luminance level of 37.5%. In this manner, when the divisional exposure is performed for the exposure time $t_1$, the output margin of the A/D converter 405 with respect to the saturation limit is 4 times greater. With the divisional exposure performed for the exposure time $t_1$, the imaging apparatus 400 prevents the output of the A/D converter 405 from being saturated until the incident light amount reaches an amount corresponding to a luminance level of 600% (4*150%). When, for example, the luminance level of a person's face portion of the scene is adjusted to 70%, a sky and cloud portion of the scene will have a luminance level of 500%. In this case, the output with the increased dynamic range is not saturated.

Moreover, the image storage units 431a to 431c store the digital images resulting from A/D conversion performed by the A/D converter 405. The addition unit 430 increases the dynamic range of each pixel of the different images stored in the image storage units 431a to 431c and adds up the same pixels of the images. As a result, the addition unit 430 forms a dynamic-range-increased image. In this manner, the imaging apparatus 400 obtains a dynamic-range-increased image whose dynamic range has been increased by the addition unit 430 to values ranging from 0 to 600% (see a straight line L102 indicating the input and output characteristic in FIG. 34).

4.2.2 Advantageous Effects of the Dynamic Range Increase

The advantageous effects of the dynamic range increase will now be described with reference to FIG. 35.

For an outdoor subject scene, the incident light amount varies greatly depending on portions of the subject. For example, an analogue image 106 of a backlit subject P2 has a low luminance level in a face vicinity portion 108 of the subject P2. The luminance level of the face vicinity portion 108 of the subject P2 may be corrected to 70% through the dynamic range increase. In this case, a bright portion of the scene, which is for example a sky and cloud portion 107, will normally have a luminance level of 500% or more. When the A/D converter 405 has an output saturation limit of 150%, the imaging apparatus would form an image in which the tone levels of the sky and cloud portion 107 are saturated, and would fail to appropriately reproduce the sky and cloud portion 107.

In contrast, the imaging apparatus 400 of the present embodiment uses the dynamic-range increasing unit 411 to increase the dynamic range of each digital image signal, which is obtained by A/D conversion, to 0 to 600% without causing saturation, and obtains digital image signals whose values are not saturated. In this case, the tone levels of a sky and cloud portion (portion that normally has a luminance level of 500% or more) of an image formed by the imaging apparatus 400 are not saturated. As a result, the imaging apparatus 400 appropriately reproduces the sky and cloud portion with natural tone levels.

4.2.3 Details of the Dynamic-Range Compression Unit 412

The dynamic-range compression unit 412 included in the imaging apparatus 400 will now be described in detail with reference to FIGS. 35 and 36.

Figure 36:
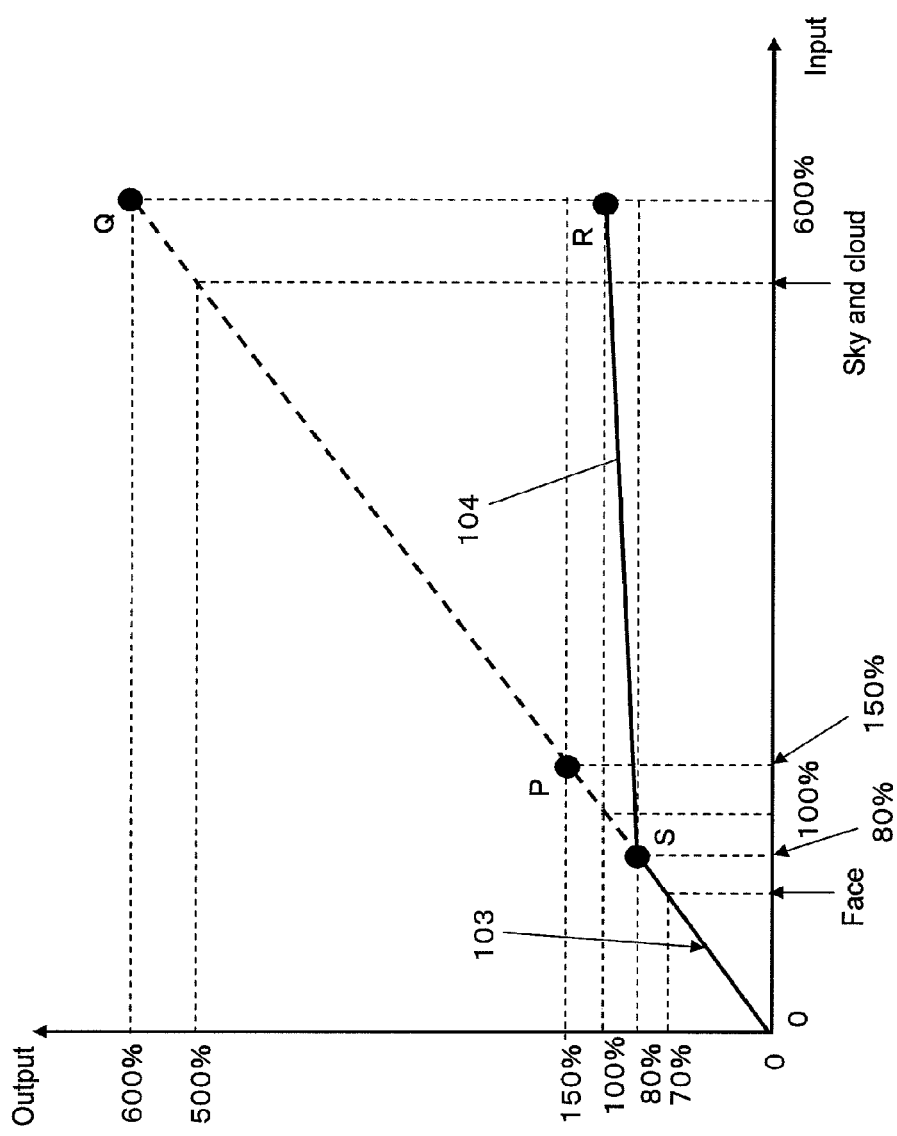
FIG. 36 is a diagram describing a dynamic-range compression unit included in the imaging apparatus.

FIG. 36 is a diagram describing the characteristics of the dynamic-range compression unit 412.

The dynamic-range compression unit 412 compresses the increased dynamic range of a signal (signal whose tone level has been converted based on the input and output characteristic line 102 in FIG. 34) to a dynamic range of 100% or less. In other words, the dynamic-range compression unit 412 compresses the dynamic range of a large input (large input signal value) to generate an output (output value) with a reduced dynamic range. In the dynamic range compression, the dynamic-range compression unit 412 compresses the dynamic range of a large input (large signal value) corresponding to a bright portion of the subject P2 with a larger compression ratio while maintaining an appropriate luminance level of a face vicinity portion 108 of the subject P2. For example, the dynamic-range compression unit 412 performs the dynamic range compression in a manner that an output corresponding to the face vicinity portion 108 of the subject P2 will have a value corresponding to an appropriate luminance level, or for example, a luminance level of 70%. In the present embodiment, the dynamic range of the output is compressed linearly up to a point S (output of 80%) according to a straight line 103 indicating a linear conversion characteristic in FIG. 36. With the linear conversion characteristic line 103, the dynamic range of the output corresponding to the face vicinity portion 108 and similar portions (with a luminance level of 70%) is changed linearly (the tone levels of pixels with luminance levels of about 70% are converted linearly). The dynamic range of the output is compressed with a gradient of a characteristic curve 104, which is kinked at the point S and extends to the point R (curve with a knee), from the point S to a point Q in FIG. 36. As indicated by the characteristic curve 104, the increased dynamic range of 600% of the image signal is compressed to 100%.

The dynamic-range compression unit 412 may not use the curve having the knee described above but may use other dynamic range compression methods. The other dynamic range compression methods will be described later.

As described above, the imaging apparatus 400 first increases the dynamic range of an image signal and then compresses the increased dynamic range of the image signal to a predetermined dynamic range. The imaging apparatus 400 obtains an analogue image signal that does not saturate an output of the A/D converter 405 even when capturing an image of a subject, such as an outdoor subject, whose input light amounts greatly vary depending on portions of the subject. As a result, the imaging apparatus 400 reduces the output range of signals (range of values of its obtained (output) digital image signals) both for a bright portion and a dark portion of the subject to an appropriate dynamic range.

4.2.4 Operation of the Imaging Apparatus

Figure 37:
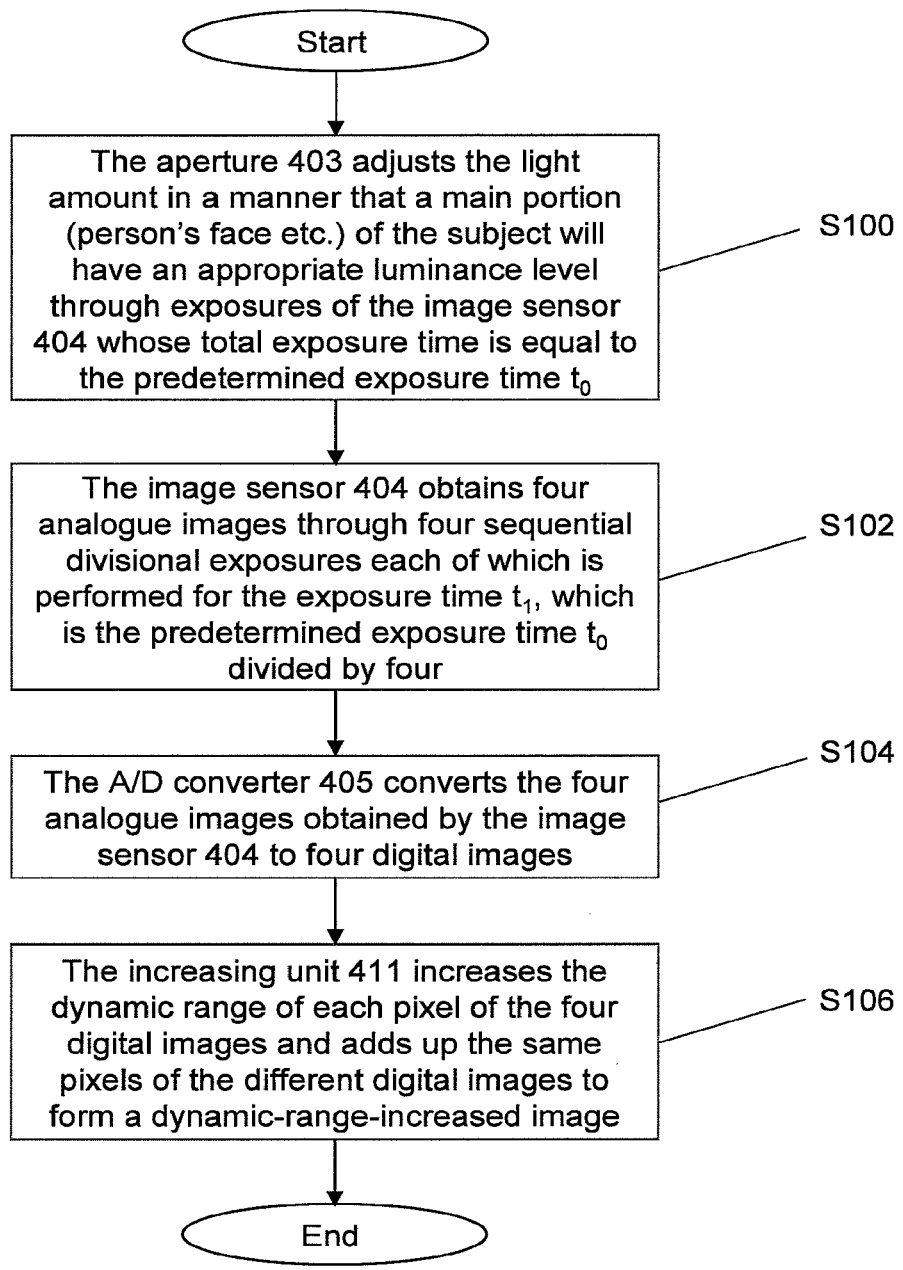
FIG. 37 is a flowchart showing the operation of the imaging apparatus.

The operation of the imaging apparatus 400 according to the present embodiment will now be described with reference to a flowchart shown in FIG. 37.

In step S100, the aperture 403 adjusts the light amount in a manner that a main portion of the subject will have an appropriate luminance level through exposures of the image sensor 404 whose total exposure time is equal to the predetermined exposure time $t_0$.

In step S102, the image sensor 404 is subjected to four sequential divisional exposures, each of which is performed for the same exposure time. The total exposure time of the four divisional exposures is equal to the predetermined exposure time $t_0$. The image sensor 404 obtains four analogue images through the four divisional exposures.

In step S104, the A/D converter 405 converts the four analogue images by A/D conversion to generate four digital images.

In step S106, the dynamic-range increasing unit 411 increases the dynamic range of each pixel of the four different digital images and adds up the same pixels of the different digital images. As a result, the dynamic-range increasing unit 411 forms a dynamic-range-increased image 102, which is an image with an increased dynamic range.

As described above, the imaging apparatus 400 performs the processing in step S100 before, for example, performing a plurality of divisional exposures. Through the processing in step S100, the imaging apparatus 400 adjusts the light amount according to the predetermined exposure time $t_0$ in a manner that a person's face portion of an image will have an appropriate luminance level. The imaging apparatus 400 then performs the processing in step S102 to S106 to obtain a dynamic-range-increased image.

Alternatively, the processing in steps S100 to S106 may be changed in the following manner.

The image sensor 404 is driven in a manner that the image sensor 404 forms four analogue images through four divisional short exposures (with a high shutter speed), which are performed to prevent an output of the A/D converter 405 from being saturated. The A/D converter 405 then converts the four analogue images to four digital images. The dynamic range of each pixel of the four different images is then increased, and the same pixels of the different images are added up to form a dynamic-range-increased image.

Through the processing described above, the imaging apparatus 400 obtains a dynamic-range-increased image while preventing the S/N ratio of the image from deteriorating.

Modifications

Modifications of the dynamic range compression will now be described with reference to FIGS. 38 to 40.

The dynamic-range compression unit 412 described above performs the dynamic range compression based on the non-linear tone curve with the characteristics shown in FIG. 36. The dynamic-range compression unit 412 with this dynamic range compression enables a main portion of an image, such as a face portion, to have an appropriate luminance level, and tone levels of highlight portions with a wide range of luminance levels to be retained without saturation while effectively using the large dynamic range of 600%, which has been increased by the dynamic-range increasing unit 411.

However, as shown in FIG. 36, the dynamic-range compression unit 412 with the dynamic range compression conversion characteristic (tone level conversion characteristic) does not compress the dynamic range of tone levels corresponding to luminance levels of 0 to 80%, and compresses the dynamic range of tone levels corresponding to luminance levels exceeding 80% and up to 600% to the dynamic range of 80 to 100%. The dynamic-range compression unit 412 with this dynamic range compression conversion characteristic can retain tone levels of highlight portions with a wide range of luminance levels. Although the dynamic-range compression unit 412 retains tone levels of a highlight portion, the gradient of the input and the output (the gradient of the dynamic range compression conversion characteristic curve) will be extremely small in the highlight portion. Consequently, the contrast will be extremely small in the highlight portion.

The gradient of the input and output characteristic curve of the dynamic range compression of the highlight portion decreases more as the dynamic-range increasing unit 411 increases the dynamic range of the highlight portion by a greater degree. As a result, although the highlight portion retains its changing tone levels through the tone level conversion, the tone values (signal values) of the highlight portion differ only too slightly from one another. In this case, the image captured by the imaging apparatus differs insignificantly from a saturated image captured with a conventional technique (the image captured by the imaging apparatus of the present embodiment can be seen as a saturated image). This can be the fundamental problem of the dynamic range compression of the imaging apparatus. Despite this problem, the imaging apparatus of the present invention is still obviously advantageous over the saturation occurring with the conventional technique (the phenomenon in which a highlight portion of a captured image is saturated), because the gradient of the input and output characteristic curve of the dynamic range compression of a highlight portion of a scene would not be extremely small when the dynamic range compression performed with the dynamic range compression conversion characteristic shown in FIG. 36 is applied to the scene portions with luminance levels of several hundred percent or less.

To solve this fundamental problem, the tone characteristic may be changed according to positions of the tone levels on an image. International Publication No. WO 2005/027041 describes one such technique. More specifically, the patent document describes a technique for using a vicinity portion of processing target pixels of an image. With this technique, for example, the histogram of a vicinity portion of processing target pixels of an image is measured, and the tone curve used for the target pixels is determined based on the distribution of values of the histogram. Alternatively, the average luminance level of the vicinity portion of the processing target pixels is calculated, and the tone curve used for the target pixels is determined according to the luminance level of the vicinity portion.

When the technique described above is applied to the dynamic-range compression unit 412, the imaging apparatus 400 will solve the problem of low contrast in the highlight portion by minimizing the contrast decrease caused by the dynamic range compression. More specifically, the imaging apparatus 400 converts large dynamic range image information, which is information about an image with the increased large dynamic range generated by the dynamic-range increasing unit 411, to small dynamic range information, which is information about an image with a dynamic range of 100% or less, without causing almost no loss of the image information. Consequently, the imaging apparatus 400 maximizes the effects of the dynamic range increase of the present invention.

Dynamic Range Compression Using Visualization Characteristics

The dynamic range compression performed by the dynamic-range compression unit 412 using the above technique will now be described with reference to FIG. 38. FIG. 38 is a block diagram showing the structure of the dynamic-range compression unit 412.

Figure 38:
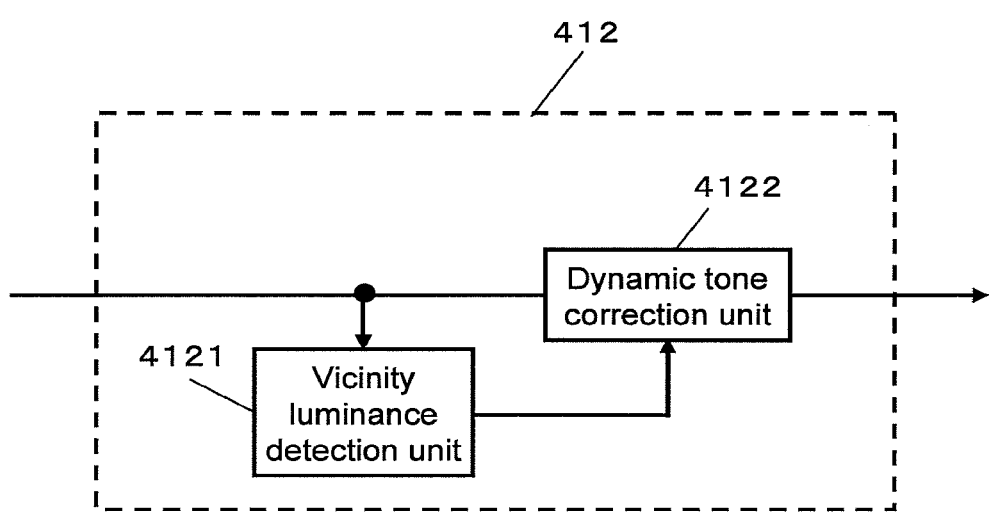
FIG. 38 shows another structure of the dynamic-range compression unit included in the imaging apparatus.

As shown in FIG. 38, the dynamic-range compression unit 412 includes a vicinity luminance detection unit 4121 and a dynamic tone correction unit 4122. The vicinity luminance detection unit 4121 detects a representative value (for example, an average value) of luminance levels of pixels that are in the vicinity of processing target pixels. The dynamic tone correction unit 4122 has a dynamic range compression curve that changes according to an output of the vicinity luminance detection unit 4121.

Figure 39:
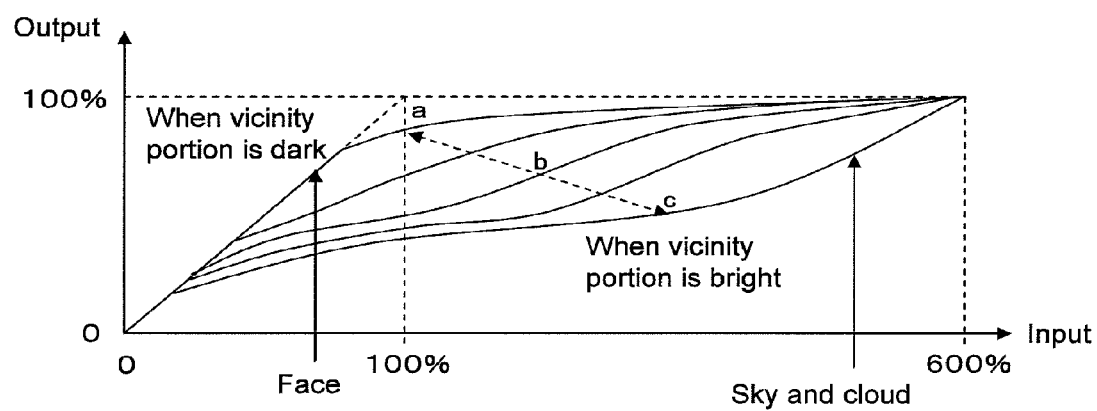
FIG. 39 is a diagram describing the operation of the dynamic-range compression unit included in the imaging apparatus.

FIG. 39 is a diagram describing the operation of the dynamic-range compression unit 412.

The dynamic-range compression unit 412 has five tone curves (tone level conversion characteristic curves shown in FIG. 39). The dynamic-range compression unit 412 selects one of the five tone curves according to the luminance level of a vicinity portion of processing target pixels. As shown in FIG. 39, the dynamic-range compression unit 412 selects the curve a when the vicinity portion of the target pixels is the darkest, the curve c when the vicinity portion of the target pixels is the brightest, and the curve b when the vicinity portion of the target pixels has an intermediate luminance level between the darkest and the brightest cases. Although the present embodiment describes the case in which the dynamic-range compression unit 412 has the five tone level conversion characteristic curves for ease of explanation, the number of the characteristic curves should not be limited to five. It is preferable that the dynamic-range compression unit 412 actually uses in the tone level conversion of image signals as many tone level conversion characteristic curves as curves that can be assumed substantially continuous to one another. For example, the dynamic-range compression unit 412 may have several tens of tone level conversion characteristic curves.

Figure 35:
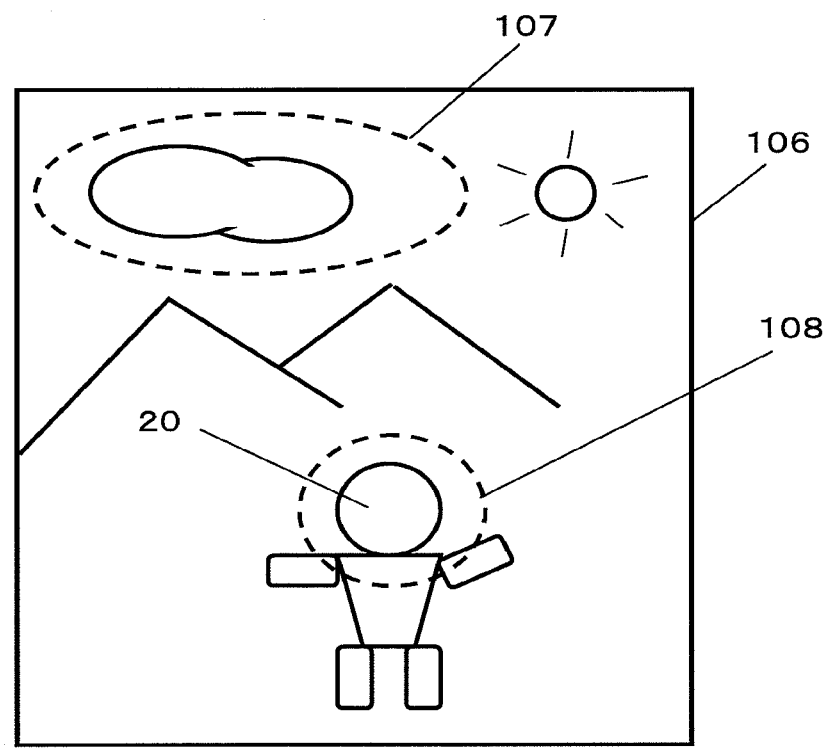
FIG. 35 is a diagram describing a subject whose image is captured by the imaging apparatus.

The dynamic-range compression unit 412 uses the tone level conversion characteristic curve a when processing image signals corresponding to a dark vicinity portion of target pixels included in an image (for example, the face vicinity portion 108 in FIG. 35). Thus, the tone levels of image signals corresponding to the person's face portion are converted to tone levels (signal values) corresponding to an appropriate luminance value of about 70%. The dynamic-range compression unit 412 uses the tone level conversion characteristic curve c when processing image signals corresponding to an extremely bright vicinity portion of target pixels included in the image (for example, the sky and cloud portion 107 in FIG. 35). Thus, image signals corresponding to the sky and cloud portion 107 are converted to image signals with a sufficiently large number of tone levels and a sufficiently high contrast. Through the dynamic range compression performed by the dynamic-range compression unit 412, the imaging apparatus of the present embodiment forms an image with a high definition (image signals) that is seen natural.

The dynamic range compression technique described above is based on the visual characteristics of humans. Such a technique is called a visualization-characteristic-based technique (visual processing). The technique is based on the visual characteristics of the eyes of humans. The human eyes increase sensitivity when viewing a bright portion and decrease sensitivity when viewing a dark portion. The imaging apparatus of the present embodiment uses the visualization-characteristic-based technique to effectively compress the large dynamic range of an image and prevent an image from being seen unnatural. As a result, the imaging apparatus of the present embodiment obtains a natural image.

The imaging apparatus of the fourth embodiment compresses an increased dynamic range of 1000% or more of an increased-dynamic-range image, or for example, an increased dynamic range of 3200% of an increased-dynamic-range image, which is obtained by the dynamic-range increasing unit 412, to a dynamic range or 100% or less without visually degrading the increased large dynamic range of the image.

4.3 Advantageous Effects of the Imaging Apparatus

The advantageous effects of the imaging apparatus of the present embodiment will now be described using images that are actually captured by the imaging apparatus (camera) of the present embodiment and a conventional imaging apparatus (camera) with reference to FIGS. 40A and 40B.

Figure 40B:
FIGS. 40A and 40B show photographic images from which the advantageous effects of the dynamic-range compression unit included in the imaging apparatus are obvious.
Figure 40A:

FIG. 40A shows an image captured through conventional camera processing whose exposure is controlled in a manner that a person's face, which is a main subject, has an appropriate level of luminance. FIG. 40B shows an image captured by the imaging apparatus 400 that includes the dynamic-range compression unit 412.

The images shown in FIGS. 40A and 40B have almost the same luminance level in dark portions, such as the shaded portion of the waterwheel, and also have almost the same luminance level in the face portion. However, the images have different luminance levels in bright portions, such as the sky and cloud portion and the person's clothing portion in which sunlight is reflected. In detail, the bright portions of the image shown in FIG. 40A are saturated, and overexposed and fail to appropriately reproduce color. In contrast, the bright portions of the image shown in FIG. 40B are seen natural as the bright portions of the image retain their continuously changing tone levels as well as the contours and the contrast of the sky and the cloud.

The images in FIGS. 40A and 40B also differ from each other in the color of the sky. The sky portion of the image in FIG. 40A is overexposed and fails to appropriately reproduce color, whereas the sky portion of the image in FIG. 40B appropriately reproduces color of the blue sky. The comparison between the two images reveals that the dynamic-range compression unit 412 of the present embodiment effectively compresses the increased dynamic range of image signals to the small dynamic range of 100% and obtains a natural image while effectively using the large dynamic range increased by the dynamic-range increasing unit 411.

As described above, the imaging apparatus 400 of the present embodiment first adjusts the light amount in a manner that a main portion of the subject will have an appropriate luminance level through exposures whose total exposure time is equal to the predetermined exposure time $t_0$, and then obtains four analogue signals by subjecting the image sensor 404 to four divisional exposures, each of which is performed for the exposure time $t_1$, which is ¼ of the predetermined exposure time $t_0$. Thus, the imaging apparatus 400 reduces the output value of each analogue image to ¼, and increases the output margin of the A/D converter 405 four times. To increase the luminance level of the dark images, the imaging apparatus 400 increases the dynamic range of each pixel of the four different images and adds up the same pixels of the different images. As a result, the imaging apparatus 400 forms a dynamic-range-increased image. The luminance level of the dynamic-range-increased image is as high as the luminance level of an image that would be formed based on an image obtained through the exposure performed for the predetermined exposure time $t_0$. As a result, the imaging apparatus 400 obtains the dynamic-range-increased image while preventing the S/N ratio of the image from deteriorating.

The imaging apparatus 400 further uses the dynamic-range-compression unit 412 to compress the increased dynamic range of image signals obtained by the dynamic-range increasing unit 411 to a dynamic range of 100% or less with the tone characteristic of the image signals changing according to positions on the image. The dynamic range compression unit 412 compresses an increased dynamic range of 1000% or more of an increased-dynamic-range image, such as an increased dynamic range of 1200%, to a dynamic range of 100% or less without visually degrading the large dynamic range of the image.

Although the above embodiment describes the case in which the predetermined exposure time $t_1$, is divided by four, and four divisional exposures are performed each for the exposure times $t_1$, the number by which the predetermined exposure time $t_0$ is divided should not be limited to four. For example, the predetermined exposure time $t_0$ may be divided by two, or sixteen, according to the required ratio of the dynamic range increase. The number by which the predetermined exposure time $t_0$ is divided may be increased or decreased as required. When the predetermined exposure time $t_0$ is divided by two, the dynamic range increase ratio would be two times (300%). When the predetermined exposure time $t_0$ is divided by sixteen, the dynamic range increase ratio would be 16 times (2400%). In this manner, the number by which the predetermined exposure time $t_0$ is divided may be increased or decreased according to a required dynamic range. When the predetermined exposure time to is divided by N (where N is a natural number), the dynamic range increase ratio would be N times. In this case, the output can be increased to 0 to N times (the output can be increased up to the saturation limit (%) of the output of the A/D converter 405). It is only required that the imaging apparatus 400 divide the predetermined exposure time $t_0$ by at least two and perform the processing described above. In this case, the imaging apparatus 400 has the advantageous effects described above.

Fifth Embodiment

An imaging apparatus according to a fifth embodiment of the present invention will now be described with reference to FIGS. 41 to 43.

The imaging apparatus according to the fifth embodiment improves image quality by correcting an image shift between images caused by movement of the imaging apparatus due to hand shake of the user. A method used by the imaging apparatus of the fifth embodiment will now be described.

Figure 41:
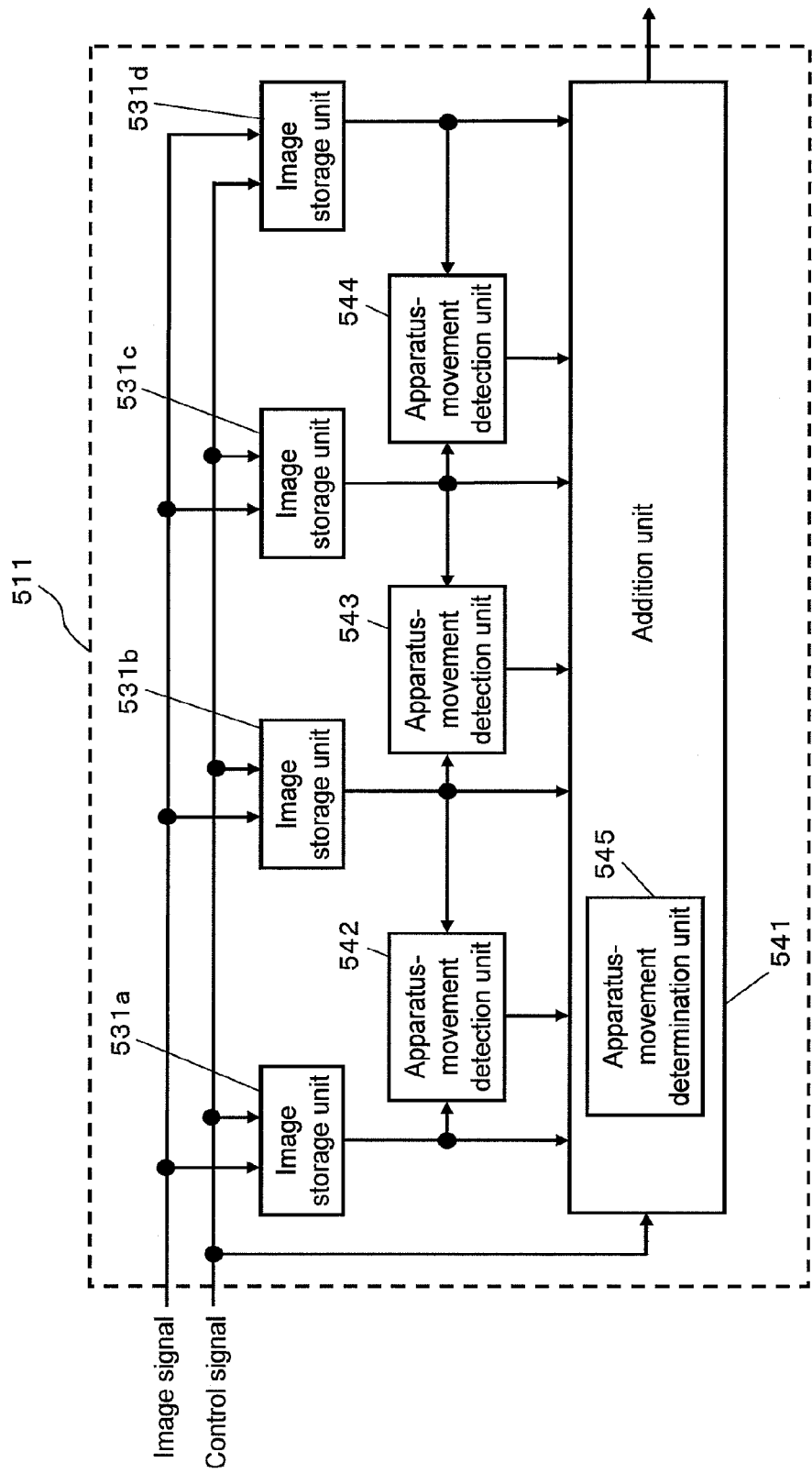
FIG. 41 shows main components of a dynamic-range increasing unit included in an imaging apparatus according to a fifth embodiment of the present invention.

The imaging apparatus according to the fifth embodiment differs from the imaging apparatus 400 of the fourth embodiment only in its dynamic-range increasing unit 511 shown in FIG. 41, which replaces the dynamic-range increasing unit 411. The components of the imaging apparatus of the fifth embodiment that are the same as the components of the imaging apparatus 400 of the fourth embodiment are given the same reference numerals as those components, and will not be described.

The dynamic-range increasing unit 511 included in the imaging apparatus of the fifth embodiment will be described with reference to FIGS. 41 to 43.

Figure 42A:
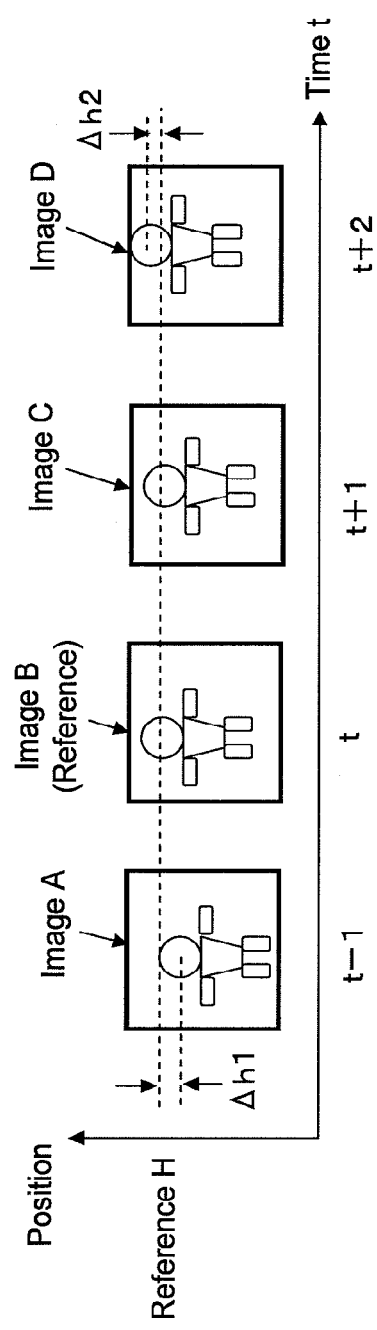
FIGS. 42A and 42B are diagrams describing apparatus movement correction.
Figure 42B:
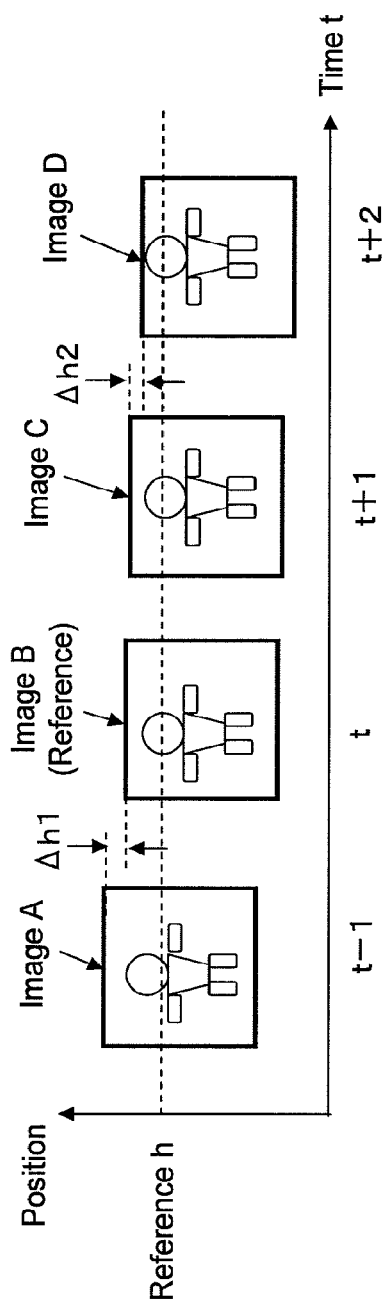

FIG. 41 is a block diagram showing the structure of the dynamic-range increasing unit 511 included in the imaging apparatus of the present embodiment. FIGS. 42A and 42B are diagrams describing apparatus movement correction. FIG. 43 is a diagram describing apparatus-movement detection units 542 to 544.

The dynamic-range increasing unit 411 included in the imaging apparatus 400 of the fourth embodiment receives four images of the subject P2, which have been obtained through a plurality of divisional exposures, and increases the dynamic range of each pixel of the four different mages and adds up the sane pixels of the different images to form a dynamic-range-increased image. The dynamic-range increasing unit 511 of the present embodiment detects and corrects an image shift between images that is caused by movement of the imaging apparatus due to hand shake of the user who operates the imaging apparatus (hereafter referred to as "apparatus movement") before increasing the dynamic range of each pixel of the four different images and adding up the pixels of the different images. Consequently, the imaging apparatus 400 obtains an image with reduced image shifts caused by apparatus movement.

The dynamic-range increasing unit 511 includes image storage units 531a to 531d, apparatus-movement detection units 542 to 544, an apparatus-movement determination unit 545, and an addition unit 541. The image storage units 531a to 531d store images (including R, G, and B images), which are output from the A/D converter 405. The apparatus-movement detection units 542 to 544 detect the degree and direction of an image shift that can be caused by movement of the imaging apparatus due to hand shake of the user based on the images stored in the image storage units 531a to 531d. The apparatus-movement determination unit 545 determines whether apparatus movement has occurred based on the degree of an image shift. When the apparatus-movement determination unit 545 determines that apparatus movement has occurred, the addition unit 541 calculates a correction value that is used to eliminate an image shift caused by the apparatus movement. The addition unit 541 shifts images according to the timings of a control signal based on the calculated correction value and adds up the images.

The apparatus-movement detection unit 542 compares two images stored in the image storage units 531a and 531b, and detects the degree and direction of an image shift between the two images. In the same manner, the apparatus-movement detection unit 543 compares two images stored in the image storage units 531b and 531c, and detects the degree and direction of an image shift between the two images. The apparatus-movement detection unit 543 compares two images stored in the image storage units 531c and 531d, and detects the degree and direction of an image shift between the two images.

When the apparatus-movement determination unit 545 determines that the two images stored in the image storage units 531a and 531b has an image shift, the addition unit 541 calculates a correction value based on the degree and direction of the image shift detected by the apparatus-movement detection unit 542. In the same manner, when the two images stored in the image storage units 531b and 531c has an image shift, the addition unit 541 calculates a correction value based on the degree and direction of the image shift detected by the apparatus-movement detection unit 543. When the two images stored in the image storage units 531c and 531d has an image shift, the addition unit 541 calculates a correction value based not only on the degree and direction of the image shift detected by the apparatus-movement detection unit 543 but also on the degree and direction of the image shift detected by the apparatus-movement detection unit 544.

The apparatus movement correction will now be described with reference to FIGS. 42A and 42B.

Vertical image shifts caused by apparatus movement and horizontal image shifts caused by apparatus movement are corrected through the same processing. For ease of explanation, only vertical image shift correction will be described below.

FIG. 42A shows images obtained through divisional exposures performed at timings t−1 to t+2. Timing t is the reference timing. At timing t−1, a frame image immediately preceding a frame image (image B) obtained at timing t is obtained. At timing t+1, a frame image immediately following the frame image obtained at timing t is obtained. The same applies to timings t+N and t-N (where N is any natural number).

It is preferable to use, as the reference image (image B in FIGS. 42A and 42B), an image obtained at the timing close to the timing at which the imaging apparatus is operated to capture an image (the timing when the shutter is released). It is preferable that the image storage units 531a to 531d of the dynamic-range increasing unit 511 store sequentially obtained images in a manner that the images are in the chronological order in the image storage units. It is preferable to use an intermediate image among the sequentially obtained images as the reference image. As shown in FIGS. 42A and 42B, the image B at timing t is used as the reference image. An image shift of each of the images A, C, and D with respect to a reference H of the image B will be described.

As shown in FIG. 42A, the image A obtained at timing t−1 is shifted downward by an amount Δh1 with respect to the image B. In the same manner, the image D obtained at timing t+2 is shifted upward by an amount Δh2 with respect to the image B. The image C obtained at timing t+1 is not shifted with respect to the image B.

As shown in FIG. 42B, when the images have an image shift caused by apparatus movement, the apparatus-movement detection unit 542 detects an downward image shift amount Δh1 based on comparison between the image B and the image A. The apparatus-movement determination unit 545 then determines whether apparatus movement has occurred based on whether the image shift amount is greater than a predetermined value C. When the apparatus-movement determination unit 545 determines that apparatus movement has occurred (Δh1>C), the addition unit 541 calculates the coordinates of the image A to which a correction value (Δh1) for correcting the shift of the coordinates of the image A has been added, and uses the values of pixels at the calculated coordinates when adding up the pixels of the different images.

In the same manner, the apparatus-movement detection unit 543 compares the image B and the image C. When the apparatus-movement determination unit 545 determines that apparatus movement has not occurred (the image shift amount=0<C), the addition unit 541 uses the values of pixels of the image C that are at the same coordinates as the coordinates of the image B when adding up the pixels of the different images.

The apparatus-movement detection unit 544 compares the image C and the image D, and detects an upward image shift amount of Δh2. The apparatus-movement determination unit 545 determines whether apparatus movement has occurred based on whether the image shift amount is greater than the predetermined value C.

When the apparatus-movement determination unit 545 determines that apparatus movement has occurred (Δh2>C), the addition unit 541 calculates the coordinates of the image D from which a correction value (Δh2+0) for correcting the shift of the coordinates of the image D has been subtracted, and uses the values of pixels at the calculated coordinates when adding up the pixels of the different images. When correcting the image shift of the image D, the addition unit 541 calculates the coordinates of the image D to which the image shift of the image C with respect to the image B has also been added. The addition unit 541 then uses the values of pixels at the calculated coordinates when adding up the pixels of the different images. The addition unit 541 does not use the values of target pixels that are out of range when adding the pixels of the different images.

Through such apparatus movement correction, the addition unit 541 eliminates the image shifts of the images A, C, and D with respect to the image B before increasing the dynamic range of each pixel of the different images A, C, and D and adding up the pixels of the different images. This correction eliminates image shifts caused by movement of the imaging apparatus of the present embodiment due to hand shake of the user.

Figure 43:
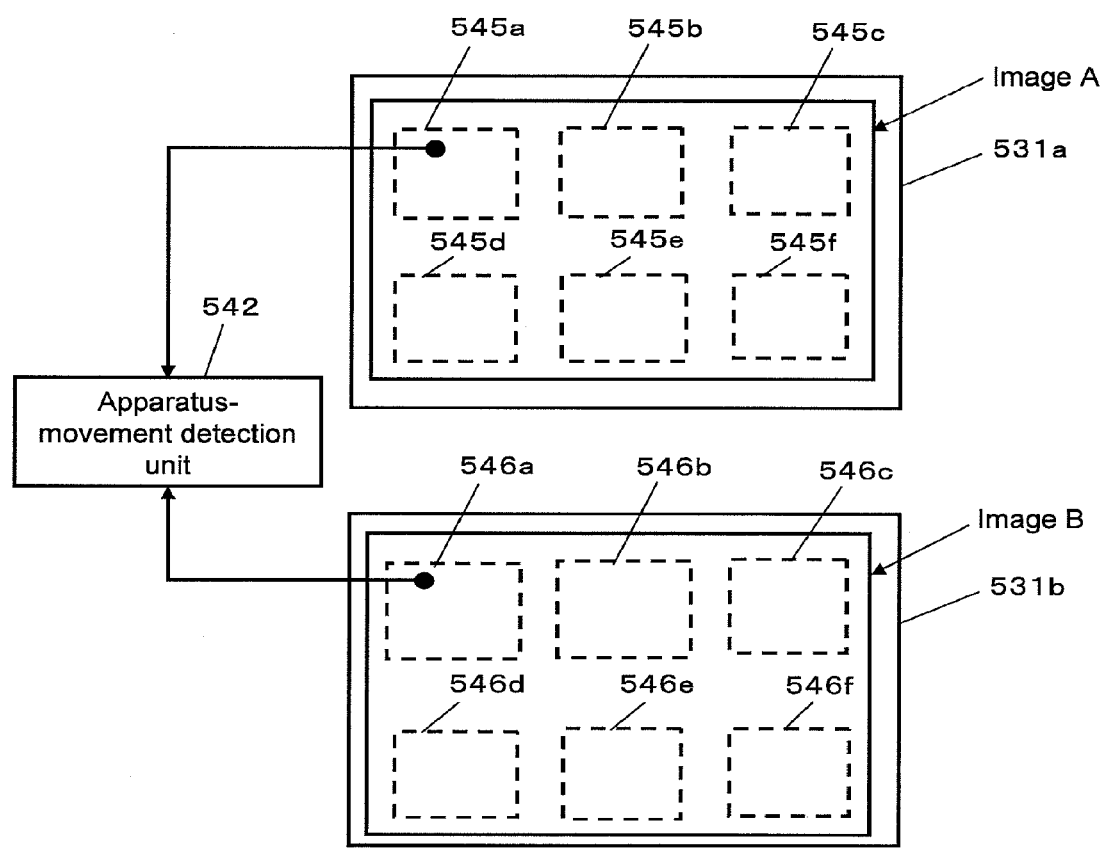
FIG. 43 is a diagram describing an apparatus movement detection unit included in the imaging apparatus.

As shown in FIG. 43, when comparing the images A and B stored in the image storage units 531a and 531b, the apparatus-movement detection unit 542 may set predetermined areas 545a to 545f in the image A, and compare the predetermined areas 545a to 545f of the image A with the corresponding predetermined areas 546a to 546f of the image B. The apparatus-movement detection unit 542 may then calculate the average of values $\Delta h_{ave}1$ to $\Delta h_{ave}6$ indicating the degree and direction of image shifts obtained through comparisons between the areas, and use the calculated average as a correction value used by the addition unit 541. When the calculated average is a value with decimals, interpolation may be performed between values of the target pixels and values of pixels adjacent to the target pixels in the vertical, horizontal, and diagonal directions according to the decimal part of the value. Alternatively, the value with decimals may be rounded to the nearest whole number, and the rounded value may be used as the correction value. The use of these predetermined areas reduces the computation load for the comparison between the images, and shortens the processing time required for the comparison and also reduces the scale of required hardware.

The apparatus-movement detection units 543 and 544 perform the same processing as the apparatus-movement detection unit 532.

As described above, the imaging apparatus of the present embodiment uses the dynamic-range increasing unit 511 to eliminate image shifts of images caused by movement of the imaging apparatus due to hand shake of the user before increasing the dynamic range of each pixel of the different images A to D and adding up the pixels of the different images A to D. In addition to the advantages effects of the imaging apparatus 400 of the fourth embodiment, the imaging apparatus of the present embodiment has the advantageous effect of obtaining a dynamic-range-increased image with reduced image shifts.

Moreover, the imaging apparatus of the present embodiment obtains analogue images by subjecting the image sensor 404 to four divisional exposures. Thus, the exposure time for each exposure through which one analogue image is obtained is reduced to ¼, and therefore an image shift caused by apparatus movement due to hand shake of the user is also reduced to ¼. In the same manner, an image shift caused by movement of the subject is also reduced to ¼. The imaging apparatus of the present embodiment then converts the four analogue images to digital images by A/D conversion performed by the A/D converter 405, and shifts images in a direction to eliminate image shifts caused by apparatus movement according to the degree and direction of the image shifts detected by the apparatus-movement detection units 542 to 544 and adds up the images in which the image shifts have been eliminated. Therefore, the imaging apparatus of the present embodiment obtains an image with smaller image shifts caused by apparatus movement as compared with an image formed with a conventional technique that does not divide the exposure into a plurality of divisional exposures.

Although the above embodiment describes the case in which an image shift is detected by comparing corresponding pixels of a plurality of images, the present invention should not be limited to this structure. The imaging apparatus of the present embodiment may detect the degree and direction of apparatus movement using, for example, a gyroscope, and may shift images in a direction to eliminate an image shift caused by the apparatus movement according to the degree and direction of the apparatus movement, and then increase the dynamic range of the each pixel of the different images A to D and add up the pixels of the different images A to D.

Alternatively, the apparatus-movement detection units 542 to 544 may detect the degree and direction of an image shift based on G elements of the images A to D.

The addition unit 541 may assume that an image shift has a value of 0 when no degree of image shift is detected by the apparatus-movement detection units 542 to 544. In this case, the apparatus-movement determination unit 545 may be eliminated. In this case, the addition unit 541 is simply required to shift images in a direction to eliminate image shifts according to the degree and direction of image shifts detected by the apparatus-movement detection units 542 to 544 and add up the images.

Sixth Embodiment

An imaging apparatus according to a sixth embodiment of the present invention will now be described with reference to FIGS. 44 to 45.

Figure 44:
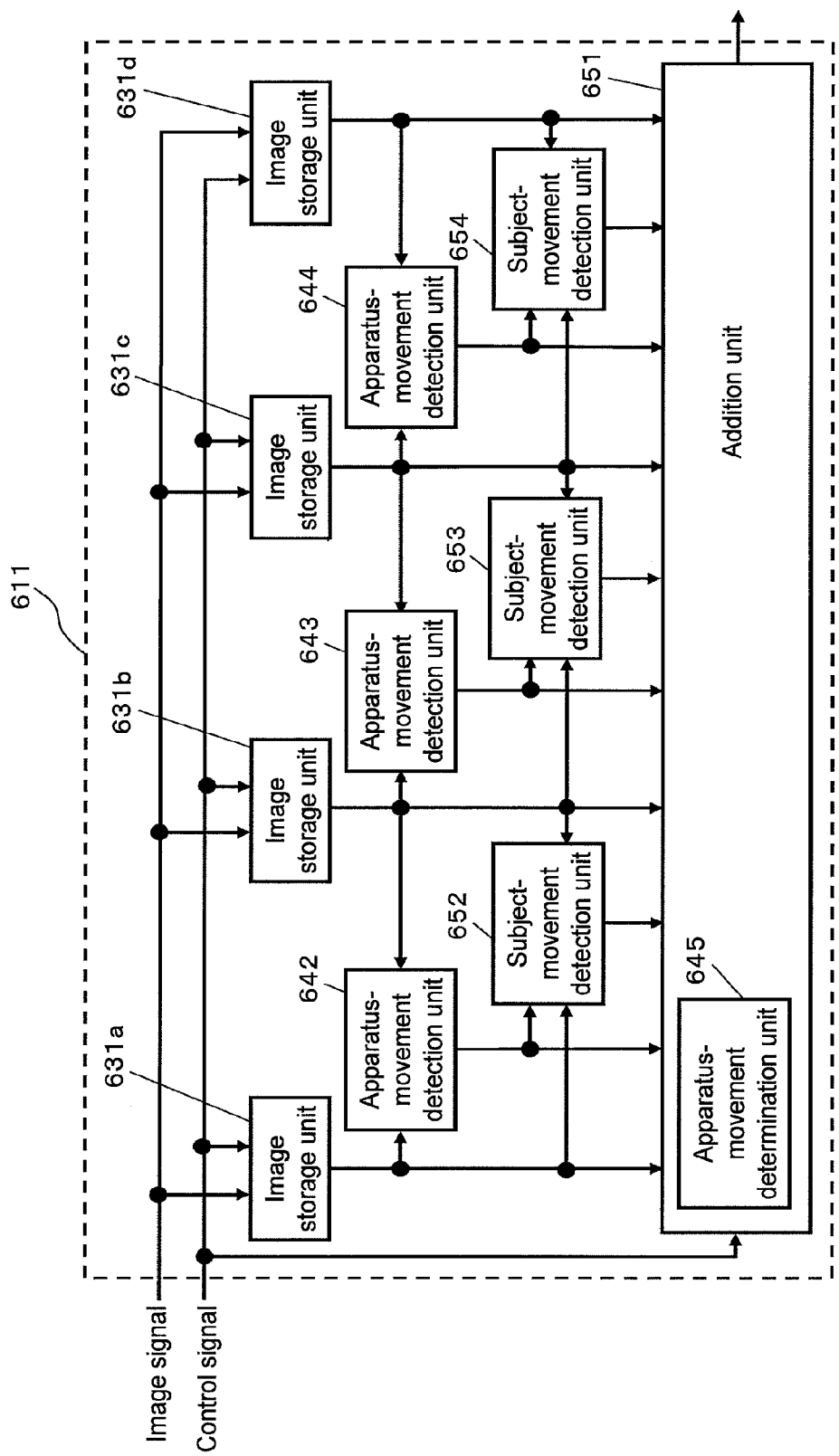
FIG. 44 shows main components of a dynamic-range increasing unit included in an imaging apparatus according to a sixth embodiment of the present invention.

The imaging apparatus according to the sixth embodiment differs from the imaging apparatus 400 of the fourth embodiment only in its dynamic-range increasing unit 611 shown in FIG. 44, which replaces the dynamic-range increasing unit 411. The components of the imaging apparatus of the sixth embodiment that are the same as the components of the imaging apparatus 400 of the fourth embodiment are given the same reference numerals as those components, and will not be described.

FIG. 44 is a block diagram showing the structure of the dynamic-range increasing unit 611 included in the imaging apparatus of the present embodiment. FIGS. 45A and 45B are diagrams describing apparatus movement correction and subject movement correction.

The dynamic-range increasing unit 511 included in the imaging apparatus of the fifth embodiment shifts images in a direction to eliminate image shifts caused by apparatus movement due to hand shake of the user and obtains an image with reduced image shifts caused by apparatus movement. The dynamic-range increasing unit 611 of the present embodiment also prevents an image shift caused by movement of the subject P2 (hereafter referred to as "subject movement") in addition to an image shift caused by apparatus movement.

As shown in FIG. 44, the dynamic-range increasing unit 611 includes image storage units 631a to 631d, apparatus-movement detection units 642 to 644, and an apparatus-movement determination unit 645. The image storage units 631a to 631d store RGB images, which are output from the A/D converter 405. The apparatus-movement detection units 642 to 644 detect an image shift caused by apparatus movement based on the images stored in the image storage units 631a to 631d. The apparatus-movement determination unit 645 determines whether apparatus movement has occurred based on the degree of an image shift. The dynamic-range increasing unit 611 further includes subject-movement detection units 652 to 654 and an addition unit 651. The subject-movement detection units 652 to 654 detect whether subject movement has occurred in a local area by comparing the same pixels of two different images stored in the image storage units 631a to 631d. The addition unit 651 calculates a correction value that is used to eliminate an image shift when the apparatus-movement detection units 642 to 644 detect apparatus movement. The addition unit 651 shifts the image signals using the correction value and then adds up the image signals. When the subject-movement detection units 652 to 654 detect subject movement, the addition unit 651 excludes pixels having the detected subject movement from the pixels of the image signals that are added up.

The subject-movement detection unit 652 compares the same pixels of two different images stored in the image storage units 631a and 631b after shifting the images according to the degree and direction of an image shift detected by the apparatus-movement detection unit 642, and detects pixels having subject movement. In the same manner, the subject-movement detection unit 653 compares the same pixels of two different images stored in the image storage units 631b and 631c after shifting the images according to the degree and direction of an image shift detected by the apparatus-movement detection unit 643, and detects pixels having subject movement. The subject-movement detection unit 654 compares the same pixels of two different images stored in the image storage units 631c and 631d after shifting the images according to the degree and direction of an image shift detected by the apparatus-movement detection unit 644, and detects pixels having subject movement.

The apparatus movement correction and the subject movement correction will now be described with reference to FIGS. 45A and 45B.

Vertical image shifts caused by apparatus movement and subject movement and horizontal image shifts caused by apparatus movement and subject movement are corrected through the same processing. For ease of explanation, only vertical image shift correction will be described below.

FIG. 45A shows images obtained through divisional exposures performed at timings t−1 to t+2. An image shift of each of the images A, C, and D with respect to a reference H of the image B will be described.

As shown in FIG. 45A, the image A obtained at timing t−1 is shifted downward by an amount $\Delta h1$ with respect to the image B. In the same manner, the image D obtained at timing t+2 is shifted upward by an amount $\Delta h2$ with respect to the image B. The image C obtained at timing t+1 is not shifted with respect to the image B.

As shown in FIG. 45B, when images have an image shift caused by apparatus movement, the dynamic-range increasing unit 611 corrects the apparatus movement by eliminating the image shift of the four images, which have been obtained through the divisional exposures, based on the correction value calculated according to the degree and direction of the image shift detected by the apparatus-movement detection units 642 to 644, in the same manner as the dynamic-range increasing unit 611 of the fifth embodiment. The subject-movement detection units 652 to 654 then compare the same pixels of selected adjacent two of the images A to D, and detect whether pixels in a certain area have subject movement. The addition unit 651 then adds up the pixels of the different images A to D in a manner determined based on whether apparatus movement and subject movement have been detected. In FIG. 45B, subject movement is detected in areas X and Y.

A local movement of the subject P2 may not be detected by directly comparing the same pixels of two sub-frame images and detecting a difference between the two sub-frame images, but may be detected by comparing larger areas of the two images including target pixels after the images are processed through a low-pass filter. Alternatively, a local motion of the subject P2 may be detected by comparing pixels of the two images through pattern matching.

The addition unit 651 obtains the coordinates (coordinates of positions on the image) of a local area having subject movement (for example, areas X and Y) from the subject-movement detection units 652 to 654. The addition unit 651 excludes pixels included in the areas X and Y having subject movement, from which image shifts caused by apparatus movement have been eliminated, from the pixels of the different images that are added up. The addition unit 651 uses the pixels included in areas having no subject movement, from which image shifts caused by apparatus movement have been eliminated, as the pixels of the images that are added up.

When the addition unit 651 have excluded some pixels from the pixels of the images that are added up, the addition unit 651 adjusts the luminance level of an image formed by adding up the images according to the number of images added. For example, pixels of the images A and D corresponding to the local area are assumed to have subject movement as shown in FIG. 45B. For the local area, the addition unit 651 uses the pixels of only the images B and C. In this case, the luminance level of the local area of the image formed by adding up the images B and C would be $2/4$ of the luminance level of an image that would be formed by adding up the four images. In this case, the addition unit 651 increases the luminance level of the local area of the image $4/2$ times. In the same manner, the luminance level of an image that is formed by adding up three images would be $3/4$ of the luminance level of an image that would be formed by adding up the four images. In this case, the addition unit 651 increases the luminance level of the local area of the image $4/3$ times. This luminance level adjustment may not be performed by the addition unit 651, and may be performed by, for example, the signal processing unit 413.

In this manner, the imaging apparatus adds up the pixels of the four images corresponding to image areas other than the areas X and Y having subject movement after increasing the dynamic range of each pixel. In this manner, the imaging apparatus obtains image signals with no image shifts caused by apparatus movement and subject movement.

As described above, the imaging apparatus of the present embodiment uses the dynamic-range increasing unit 611 to perform the processing considering subject movement. In addition to the advantages effects of the imaging apparatus 500 of the fifth embodiment including the dynamic-range increasing unit 511, the imaging apparatus of the present embodiment has the advantageous effect of obtaining image signals in which image shifts caused by subject movement have been further eliminated.

Moreover, the imaging apparatus of the present embodiment divides the exposure time by four. In this case, each digital image resulting from A/D conversion will have the same degree of image shift caused by apparatus movement. Thus, image shifts caused by apparatus movement are eliminated effectively without the need to consider differences in image shift amounts due to different exposure times. In this manner, the imaging apparatus of the present embodiment subjects the image sensor 404 to short exposures (with a high shutter speed) and obtains an image with reduced image shifts caused by apparatus movement and subject movement.

The imaging apparatus of the present embodiment detects subject movement after detecting apparatus movement by comparing images and shifting the images in a direction to eliminate an image shift between the images caused by apparatus movement. However, the present invention should not be limited to such a structure. When, for example, the images are considered to have no image shifts caused by apparatus movement, such as when the imaging apparatus is fixed on a stage like a tripod, the imaging apparatus of the present embodiment may only detect subject movement by comparing images without apparatus movement correction.

The imaging apparatus of the present embodiment may optically correct apparatus movement, and may detect subject movement in the manner described above in a plurality of images in which image shifts caused by apparatus movement have been eliminated in advance. The imaging apparatus with this structure has the same advantageous effects as described above. In this case, the imaging apparatus of the present embodiment effectively uses a plurality of images in which image shifts caused by apparatus movement have been eliminated in advance. The optical correction of the apparatus movement eliminates the need to set areas for apparatus movement detection within the imaging area of the image sensor 404, and enables the imaging area of the image sensor 404 to be used effectively.

Seventh Embodiment

An imaging apparatus according to a seventh embodiment of the present invention will now be described with reference to FIGS. 46 to 47.

Figure 46:
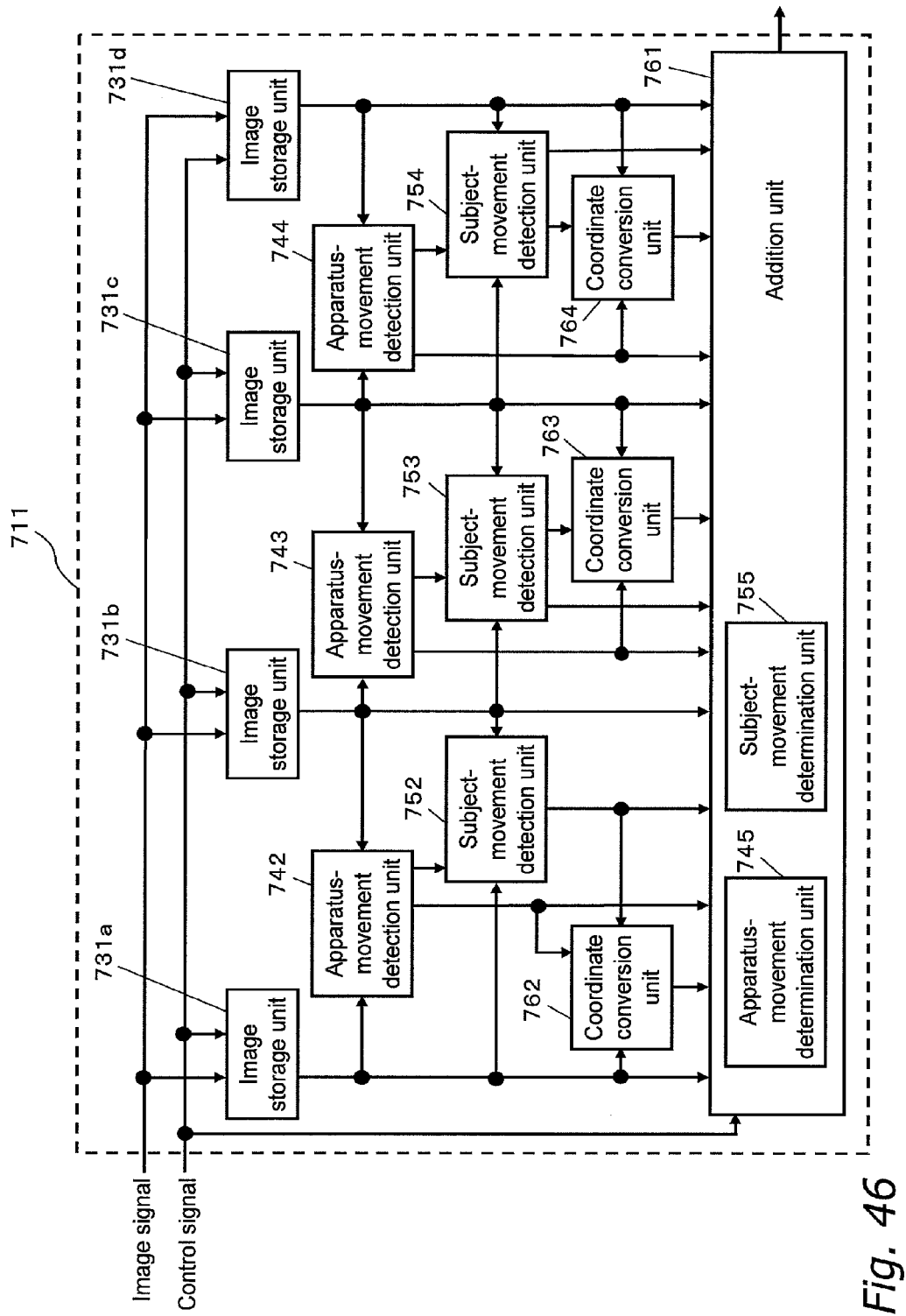
FIG. 46 shows main components of a dynamic-range increasing unit included in an imaging apparatus according to a seventh embodiment of the present invention.

The imaging apparatus according to the seventh embodiment differs from the imaging apparatus 400 of the fourth embodiment only in its dynamic-range increasing unit 711 shown in FIG. 46, which replaces the dynamic-range increasing unit 411. The components of the imaging apparatus of the seventh embodiment that are the same as the components of the imaging apparatus 400 of the fourth embodiment are given the same reference numerals as those components, and will not be described.

Figure 47A:
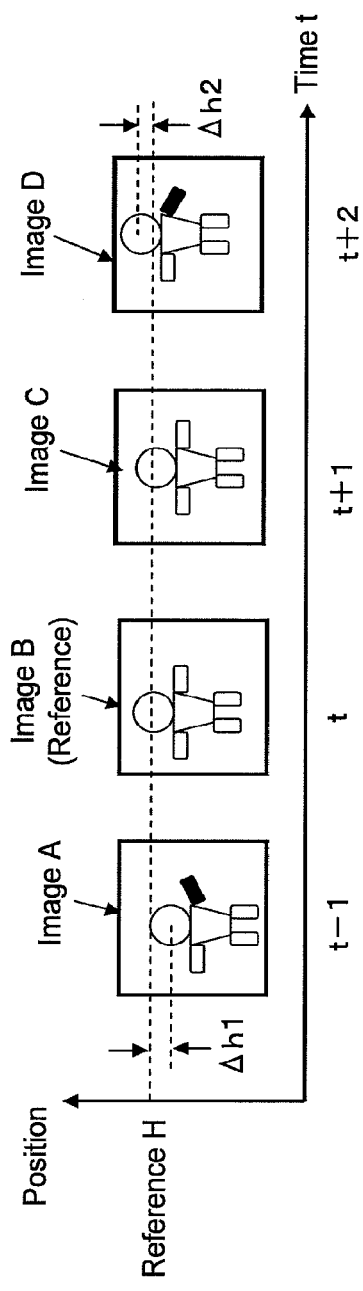
FIGS. 47A and 47B are diagrams describing apparatus movement correction and subject movement correction.
Figure 47B:
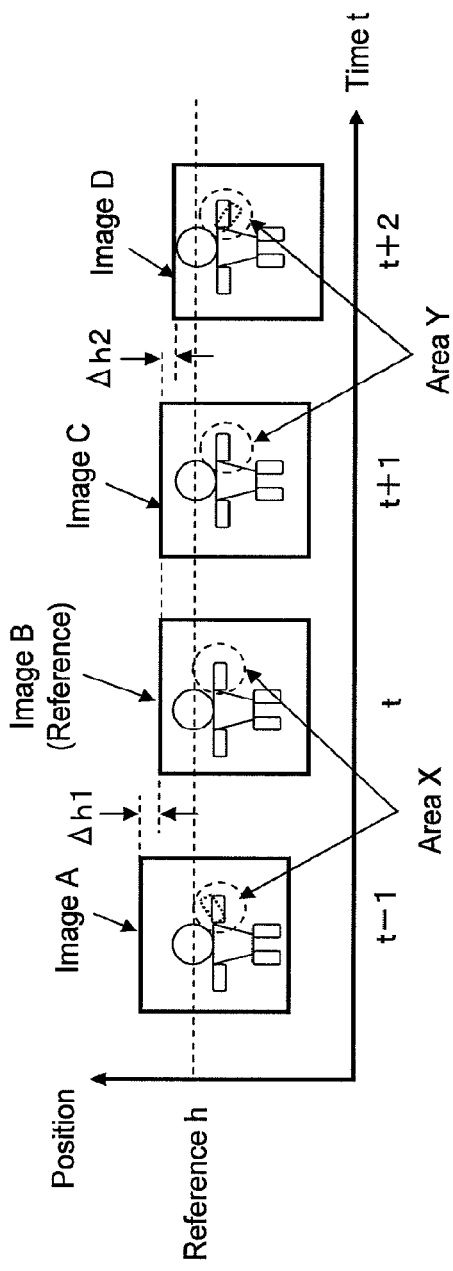

FIG. 46 is a block diagram showing the structure of the dynamic-range increasing unit 711 included in the imaging apparatus of the present embodiment. FIGS. 47A and 47B are diagrams describing apparatus movement correction and subject movement correction.

The dynamic-range increasing unit 611 included in the imaging apparatus of the sixth embodiment performs the apparatus movement correction of correcting an image shift caused by apparatus movement, and performs the subject movement correction of eliminating an image shift caused by subject movement. With such subject movement correction, image signals corresponding to a local area having subject movement are excluded from image signals that are added up after the dynamic range of the signals is increased. The dynamic-range increasing unit 711 of the present embodiment does not exclude image signals corresponding to a local area having subject movement, and obtains image signals not only with reduced image shifts caused by apparatus movement but also with reduced image shifts caused by subject movement.

As shown in FIG. 46, the dynamic-range increasing unit 711 includes image storage units 731a to 731d, apparatus-movement detection units 742 to 744, and an apparatus-movement determination unit 745. The image storage units 731a to 731d store RGB images, which are output from the A/D converter 405. The apparatus-movement detection units 742 to 744 detect an image shift caused by apparatus movement based on the images stored in the image storage units 731a to 731d. The apparatus-movement determination unit 745 determines whether apparatus movement has occurred based on the degree of an image shift. The dynamic-range increasing unit 711 further includes subject-movement detection units 752 to 754 and coordinate conversion units 762 to 764. The subject-movement detection units 752 to 754 detect whether subject movement has occurred in a local area by comparing the same pixels of two different images stored in the image storage units 731a to 731d. The coordinate conversion units 762 to 764 convert the coordinates of pixels included in a local area having subject movement in a manner to eliminate subject movement. The dynamic-range increasing unit 711 further includes an addition unit 761. The addition unit 761 calculates a correction value that is used to eliminate an image shift caused by apparatus movement when the apparatus-movement detection units 742 to 744 detect the apparatus movement, and adds up image signals after shifting the image signals based on the correction value. When subject movement is detected, the addition unit 761 may use the pixels in which the subject movement has been eliminated, which are output from the coordinate conversion units 762 to 764, as the pixels of the images that are added up.

The dynamic-range increasing unit 711 further includes a subject-movement determination unit 755. When an image shift between images caused by subject movement has been detected, the subject-movement determination unit 755 detects a difference between pixels of the images corresponding to a local area in which the subject movement has been detected, and determines whether the subject movement can be eliminated by the coordinate conversion units 762 to 764.

When the subject-movement determination unit 755 determines that the subject movement cannot be eliminated, the addition unit 761 excludes the pixels of the images corresponding to the local area from the pixels of the images that are added up. When the subject-movement determination unit 755 determines that the subject movement can be eliminated, the addition unit 761 uses the pixels of the images corresponding to the local area in which the subject movement has been eliminated, which are output from the coordinate conversion units 762 to 764, as the pixels of the images that are added up.

As described above, the imaging apparatus of the present embodiment uses the subject-movement determination unit 755 included in the dynamic-range increasing unit 711 to determine a difference between pixels of images corresponding to a local area in which subject movement has been detected. Thus, the imaging apparatus appropriately handles an area in which a part of the subject cannot be detected. When, for example, a hand of the subject is hidden behind the subject, the imaging apparatus excludes pixels of images corresponding to an area including the hand from the pixels of the images that area added up.

The coordinate conversion unit 762 shifts images according to the degree and direction of an image shift detected by the apparatus-movement detection unit 742, and then converts the coordinates of the pixels of images signals stored in the image storage unit 731a for which subject movement has been detected. In the same manner, the coordinate conversion unit 763 shifts images according to the degree and direction of an image shift detected by the apparatus-movement detection unit 743, and then converts the coordinates of the pixels of images signals stored in the image storage unit 731c for which subject movement has been detected. In the same manner, the coordinate conversion unit 764 shifts images according to the degree and direction of an image shift detected by the apparatus-movement detection unit 744, and then converts the coordinates of the pixels of images signals stored in the image storage unit 731*d* for which subject movement has been detected.

The apparatus movement correction and the subject movement correction will now be described with reference to FIGS. 47A and 47B.

Vertical image shifts caused by apparatus movement and subject movement and horizontal image shifts caused by apparatus movement and subject movement are corrected through the same processing. For ease of explanation, only vertical image shift correction will be described below.

As shown in FIG. 47A, the image A obtained at timing t−1 is shifted downward by an amount Δh1 with respect to the image B. In the same manner, the image D obtained at timing t+2 is shifted upward by an amount Δh2 with respect to the image B. The image C obtained at timing t+1 is not shifted with respect to the image B.

As shown in FIG. 47B, when images have an image shift caused by apparatus movement, the dynamic-range increasing unit 60 corrects the apparatus movement by eliminating the image shift of the four images of the subject P2, which have been obtained through the divisional exposures, based on the correction value according to the degree and direction of the image shift detected by the apparatus-movement detection units 742 to 744, in the same manner as the dynamic-range increasing unit 511 of the fifth embodiment. The subject-movement detection units 752 to 754 then compare the same pixels of selected adjacent two of the images A to D, and detect pixels in an area having subject movement. The addition unit adds up the pixels of the images A to D in a manner determined according to whether apparatus movement and subject movement have been detected. In FIG. 47B, subject movement is detected in areas X and Y.

The coordinate conversion units 762 to 764 move and rotate each pixel of the images corresponding to a local area in which subject movement has been detected by the subject-movement detection units 752 to 754 (areas X and Y) by affine transformation, and outputs signals, whose subject movement has been corrected, to the addition unit 761.

When the subject-movement determination unit 755 determines that subject movement cannot be corrected by the coordinate conversion units 762 to 764, the addition unit 761 excludes the pixels at the calculated coordinates from the pixels of the images that are added up. The subject-movement determination unit 755 may determine that subject movement cannot be corrected when, for example, a hand of the subject P2 is hidden behind the subject P2 and the hand cannot be detected, or when, for example, an arm or a face of the subject P2 is partially hidden behind an obstacle. In this manner, when certain pixels of images are expected not to match one another even if the coordinate conversion units 762 to 764 shift images by converting the coordinates of the pixels, the addition unit 761 excludes the pixels of the images at the calculated coordinates from the pixels of the images that are added up.

As described above, the imaging apparatus of the present embodiment has the advantageous effect of eliminating subject movement of pixels of the images corresponding to the local area before increasing the dynamic range of each pixel and adding up the pixels of the images A to D, in addition to the advantages effects of the imaging apparatus of the sixth embodiment including the dynamic-range increasing unit 611. The imaging apparatus of the present embodiment obtains a dynamic-range-increased image with reduced image shifts caused by apparatus movement and subject movement. The imaging apparatus of the present embodiment adjusts the luminance level of an image formed by adding up the pixels of the images according to the number of images added, in the same manner as in the sixth embodiment.

Other Embodiments

For simplicity and easy understanding of the present invention, the fourth to seventh embodiments of the present invention do not describe video gamma processing, which is included in normal camera processing. Video gamma processing is not essential to the present invention. The present invention should not be limited to the structure without video gamma processing, whereas the structure with video gamma processing also has the same advantageous effects as the present invention.

The functional blocks described in the above embodiments may be incorporated with other camera signal processing functions and may be implemented by hardware using for example an integrated circuit, or may be implemented as incorporated software using a CPU of an integrated circuit. Alternatively, the functional blocks may be implemented by independent computer application software. The various functions described above may be implemented by both software and hardware.

When the functions described above are implemented by hardware, the functions described in each of the above embodiments may be implemented by separate integrated circuits, or some or all of the functions may be implemented by a single-chip integrated circuit. For example, an integrated circuit may function as an imaging apparatus including the optical system 416, the image sensor 404, the A/D converter 405, and a light amount adjustment unit that adjusts the amount of light according to the predetermined exposure time $t_0$ in a manner that a main portion of the subject will have an appropriate luminance level. In this case, the integrated circuit includes the drive unit 406 and the dynamic-range increasing unit 411 (or 511, 611, or 711). As described above, the drive unit 406 drives the image sensor 404 in a manner that the image sensor 404 obtains four analogue images through four sequential divisional exposures, each of which is performed for the same exposure time. The total exposure time of the four divisional exposures is equal to the predetermined exposure time $t_0$.

The dynamic-range increasing unit 411 increases the dynamic range of each pixel of four different digital images, which have been obtained by converting the four analogue images by A/D conversion performed by the A/D converter 405, and adds up the same pixels of the different images. As a result, the integrated circuit forms a dynamic-range-increased image, which is an image with an increased dynamic range, and outputs the dynamic-range increased image.

Alternatively, the drive unit 406 may drive the image sensor 404 in a manner that the image sensor 404 obtains four analogue images through four sequential divisional exposures, which are performed to prevent an output of the A/D converter 405 from being saturated, and the dynamic-range increasing unit 411 (or 511, 611, or 711) may increase the dynamic range of each pixel of four different digital images, which are signals resulting from conversion of the four analogue images performed by the A/D converter 405, and add up the same pixels of the different images. As a result, the integrated circuit may form a dynamic-range-increased image, which is an image with an increased dynamic range, and output the dynamic-range-increased image.

In this case, the integrated circuit obtains large dynamic range image signals while preventing the S/N ratio of the signals from deteriorating. The number of divisional exposures into which the exposure is divided should not be limited to four. The exposure may be divided into N divisional exposures (N>1, where N is a natural number) according to a required dynamic range. In this case, the integrated circuit obtains N images through the N divisional exposures, and increases the dynamic range of each pixel of the images and adds up the pixels of the images.

The integrated circuit should not be limited to an LSI (large scale integrated) circuit. The integrated circuit may be referred to as an IC (integrated circuit), a system LSI, a super LSI circuit, or an ultra LSI depending on the degree of integration of the circuit.

The integrated circuit may be formed by a dedicated circuit or a general-purpose processor. For example, the integrated circuit may be an FPGA (field programmable gate array), which is an integrated circuit programmable after the semiconductor chip is manufactured, or a reconfigurable processor, which is an integrated circuit in which internal circuit cells are reconfigurable or more specifically internal circuit cells can be reconnected or reset.

If any circuit integration technology emerges as an advancement of the semiconductor technology or as a derivative of the semiconductor technology, the technology may be used to integrate the functional blocks of the imaging apparatus. For example, biocomputers may become applicable with the advancement of biotechnology.

The application software may not be stored in a recording medium, such as a disk, when distributed. Alternatively, the software may be downloaded via a network.

Although the above embodiments describe the apparatus movement correction and the subject movement correction only for vertical image shifts, the present invention should not be limited to vertical image shift correction. Image shifts in other direction, such as horizontal image shifts and rotational image shifts may be corrected through the same processing as described above.

Although the above embodiments describe the case in which the processing is performed in units of frames, the present invention should not be limited to such processing. For example, the processing may be performed in units of fields.

Although the above embodiments describe the case in which the image storage units (431a to 431d, 531a to 531d, 631a to 631d, 731a to 731d) are separate functional blocks, the present invention should not be limited to such a structure. Alternatively, a single memory may be divided based on addresses and may function as the plurality of image storage units.

Although the above embodiments describe the case in which the imaging apparatus of the present invention is applied to a digital camera for capturing still images, the present invention should not be limited to such application.

The present invention is also applicable to a video camera for capturing moving images. The present invention is applicable to a video camera without requiring any changes to the embodiments described above except that the mechanical shutter of the digital camera is replaced by an electronic shutter of the video camera.

The imaging apparatus according to each of the above embodiments of the present invention is applicable to a still camera for capturing an image of a still subject, a digital camera, such as a video camera, for capturing an image of a moving subject, a monitoring camera for monitoring a subject, a mobile telephone having the imaging function, an information device having the imaging function, and an integrated circuit that functions as an imaging apparatus.

The structures described in detail in the above embodiments are mere examples of the present invention, and may be changed and modified variously without departing from the scope and spirit of the invention.

APPENDIXES

The present invention may also be expressed as follows.

First Appendixes

Appendix 1

An imaging apparatus for electronically capturing an image of a subject, the apparatus comprising: an optical system having a light amount adjusting function; an image sensor operable to read an optical image that is formed by the optical system; an A/D converter operable to convert an output of the image sensor by analogue-to-digital conversion; and a dynamic-range increasing unit operable to linearly increase a dynamic range of an output of the A/D converter.

Appendix 2

An imaging apparatus for electronically capturing an image of a subject, the apparatus comprising: an optical system having a light amount adjusting function; an image sensor operable to read an optical image that is formed by the optical system; an A/D converter operable to convert an output of the image sensor by analogue-to-digital conversion; a dynamic-range increasing unit operable to linearly increase a dynamic range of an output of the A/D converter; and a dynamic-range compression unit operable to nonlinearly compress a dynamic range of an output of the dynamic-range increasing unit to a predetermined dynamic range.

Appendix 3

The imaging apparatus according to one of appendixes 1 and 2, wherein the dynamic-range increasing unit includes an amplifier unit operable to digitally increase sensitivity of an input, and the dynamic-range increasing unit linearly increases the dynamic range by allowing an output of the amplifier unit to pass without saturating the output of the amplifier unit.

Appendix 4

The imaging apparatus according to one of appendixes 2 and 3, wherein the dynamic-range compression unit nonlinearly compresses the dynamic range using a conversion characteristic that changes according to a luminance level of a brightest portion of an image.

Appendix 5

The imaging apparatus according to one of appendixes 2, 3, and 4, wherein the dynamic-range compression unit compresses the dynamic range using a conversion characteristic that changes according to a spatial position on the image.

Appendix 6

The imaging apparatus according to one of appendixes 2, 3, and 4, wherein the dynamic-range compression unit compresses the dynamic range using a conversion characteristic that changes according to a luminance level of a vicinity portion of a processing target pixel.

Appendix 7

An imaging method for electronically capturing an image of a subject, the method comprising: setting an exposure condition of an image sensor in a manner that a highlight of a scene is not saturated; converting an output of the image sensor to digital image data; linearly increasing a dynamic range of the digital image data in a manner that a main subject of the image data has a predetermined luminance level; and nonlinearly compressing the increased dynamic range to a predetermined dynamic range.

Appendix 8

The imaging method according to appendix 7, wherein the dynamic range is compressed using a conversion characteristic that changes according to a level of a brightest portion in the image data in the nonlinear dynamic compression step.

Appendix 9

The imaging method according to appendix 7, wherein the dynamic range is compressed using a conversion characteristic that changes according to a spatial position in the image data in the nonlinear dynamic range compression step.

Appendix 10

An integrated circuit used in an imaging apparatus including an optical system having a light amount adjusting function, an image sensor, and an A/D converter, the integrated circuit comprising: a dynamic-range increasing unit operable to linearly increase a dynamic range of an output of the A/D converter; and a dynamic-range compression unit operable to nonlinearly compress a dynamic range of an output of the dynamic-range increasing unit to a predetermined dynamic range.

Appendix 11

The integrated circuit according to appendix 10, wherein the dynamic-range increasing unit includes an amplifier unit operable to digitally increase sensitivity of an input, and the dynamic-range increasing unit linearly increases the dynamic range by allowing an output of the amplifier unit to pass without saturating the output of the amplifier unit.

Appendix 12

The integrated circuit according to one of appendixes 10 and 11, wherein the dynamic-range compression unit nonlinearly compresses the dynamic range using a conversion characteristic that changes according to a luminance level of a brightest portion of an image.

Appendix 13

The integrated circuit according to one of appendixes 10, 11, and 12, wherein the dynamic-range compression unit compresses the dynamic range using a conversion characteristic that changes according to a spatial position on the image.

Appendix 14

A program used in an imaging apparatus including an optical system having a light amount adjusting function, an image sensor, and an A/D converter, the program comprising: converting an output of the image sensor to digital image data; linearly increasing a dynamic range of the digital image data in a manner that a main subject of the image data has a predetermined luminance level; and nonlinearly compressing the increased dynamic range to a predetermined dynamic range.

Second Appendixes

Appendix 1

An imaging apparatus comprising: an optical unit having a light amount adjusting function; an image sensor operable to read an optical image that is formed by the optical unit; an A/D converter operable to convert an analogue image output from the image sensor to a digital image; a drive unit operable to drive the image sensor in a manner that the image sensor obtains a plurality of analogue images through a plurality of sequential divisional exposures each of which is performed for an identical exposure time, a total exposure time of the divisional exposures being equal to a predetermined exposure time; and a dynamic-range increasing unit operable to increase a dynamic range of corresponding pixels of a plurality of digital images resulting from conversion of the plurality of analogue images performed by the A/D converter and add up the corresponding pixels of the digital images to form an image with an increased dynamic range, and output the image with the increased dynamic range.

Appendix 2

The imaging apparatus according to appendix 1, further comprising: a dynamic-range compression unit operable to nonlinearly compress the increased dynamic range of the image to a predetermined dynamic range.

Appendix 3

The imaging apparatus according to one of appendixes 1 and 2, wherein the dynamic-range increasing unit has an output dynamic range that is at least greater than an input dynamic range.

Appendix 4

The imaging apparatus according to appendix 2, wherein the dynamic-range compression unit compresses the increased dynamic range of the image using a conversion characteristic that changes according to a spatial position on the image.

Appendix 5

The imaging apparatus according to one of appendixes 1 to 4, wherein, before the image sensor is subjected to the plurality of divisional exposures, an amount of light is adjusted in a manner that a main portion of the subject will have a predetermined luminance level through an exposure performed for the predetermined exposure time.

Appendix 6

The imaging apparatus according to one of appendixes 1 to 5, further comprising: an apparatus-movement detection unit operable to detect a degree and a direction of an image shift caused by movement of the imaging apparatus between two different digital images among the plurality of digital images, wherein the dynamic-range increasing unit shifts the digital images in a direction to eliminate the image shift according to the degree and the direction of the image shift detected by the apparatus-movement detection unit, and add up the corresponding pixels of the digital images.

Appendix 7

The imaging apparatus according to appendix 6, further comprising: a subject-movement detection unit operable to detect movement of the subject in a local area on the digital images by comparing corresponding pixels of the two different digital images in which the image shift caused by the movement of the imaging apparatus has been eliminated, wherein when the movement of the subject is detected by the subject-movement detection unit, the dynamic-range increasing unit excludes the corresponding pixels of the different digital images having the movement of the subject from the pixels of the digital images that are added up.

Appendix 8

The imaging apparatus according to one of appendixes 1 to 5, further comprising: a subject-movement detection unit operable to detect movement of the subject in a local area on two different digital images among the plurality of digital images by comparing corresponding pixels of the two different digital images, wherein when the movement of the subject is detected by the subject-movement detection unit, the dynamic-range increasing unit excludes the corresponding pixels of the different digital images having the movement of the subject from the pixels of the digital images that are added up.

Appendix 9

The imaging apparatus according to one of appendixes 1 to 5, further comprising: a subject-movement detection unit operable to obtain a plurality of digital images in which movement of the imaging apparatus has been corrected, and detect movement of the subject in a local area on the digital images by comparing corresponding pixels of two different digital images among the plurality of digital images, wherein when the movement of the subject is detected by the subject-movement detection unit, the dynamic-range increasing unit excludes the corresponding pixels of the different digital images having the movement of the subject from the pixels of the digital images that are added up.

Appendix 10

The imaging apparatus according to appendix 9, wherein movement of the imaging apparatus is corrected by means of optical correction.

Appendix 11

The imaging apparatus according to appendix 6, further comprising: a subject-movement detection unit operable to detect movement of the subject in a local area on the digital images by comparing corresponding pixels of the two different digital images in which the image shift caused by the movement of the imaging apparatus has been eliminated; and a coordinate conversion unit operable to convert coordinates of corresponding pixels of different digital images having the movement of the subject detected by the subject-movement detection unit to eliminate the movement of the subject, wherein the dynamic-range increasing unit uses, as the pixels of the digital images that are added up, pixels that are at coordinates obtained by the coordinate conversion unit through conversion of the coordinates of the pixels.

Appendix 12

The imaging apparatus according to appendix 11, further comprising: a subject-movement determination unit operable to determine whether the movement of the subject will be eliminated by converting the coordinates of the pixels, wherein when the subject-movement determination unit determines that the movement of the subject will not be eliminated by converting the coordinates of the pixels, the dynamic-range increasing unit excludes the pixels having the movement of the subject from the pixels of the digital images that are added up.

Appendix 13

An imaging apparatus comprising: an optical unit having a light amount adjusting function; an image sensor operable to read an optical image of a subject that is formed by the optical unit; an A/D converter operable to convert an analogue image that is output from the image sensor to a digital image; a drive unit operable to drive the image sensor in a manner that the image sensor obtains a plurality of analogue images through a plurality of sequential divisional exposures that are performed to prevent an output of the A/D converter from being saturated; and a dynamic-range increasing unit operable to increase a dynamic range of corresponding pixels of a plurality of digital images resulting from conversion of the plurality of analogue images performed by the A/D converter and add up the corresponding pixels of the digital images to form an image with an increased dynamic range, and output the image with the increased dynamic range.

Appendix 14

An imaging apparatus comprising: an optical unit having a light amount adjusting function; an image sensor operable to read an optical image of a subject that is formed by the optical unit; an A/D converter operable to convert an analogue image that is output from the image sensor to a digital image; a drive unit operable to drive the image sensor in a manner that the image sensor obtains a plurality of analogue images through a plurality of sequential divisional exposures; a subject-movement detection unit operable to detect movement of the subject in a local area on a plurality of digital images resulting from conversion of the plurality of analogue images performed by the A/D converter by comparing corresponding pixels of two different digital images among the plurality of digital images; and an addition unit operable to add up corresponding pixels of the plurality of digital images obtained by the A/D converter, wherein when the movement of the subject is detected by the subject-movement detection unit, the addition unit excludes the corresponding pixels of the different digital images having the movement of the subject from the pixels of the digital images that are added up.

Appendix 15

A digital camera comprising: the imaging apparatus according to one of appendixes 1 to 14.

Appendix 16

An integrated circuit used in an imaging apparatus including an optical unit having a light amount adjusting function, an image sensor operable to read an optical image of a subject that is formed by the optical unit, an A/D converter operable to convert an analogue image that is output from the image sensor to a digital image, and a light amount adjustment unit operable to adjust an amount of light according to a predetermined exposure time in a manner that a main portion of the subject has a predetermined luminance level, the integrated circuit comprising: a drive unit operable to drive the image sensor in a manner that the image sensor obtains a plurality of analogue images through a plurality of sequential divisional exposures each of which is performed for an identical exposure time, a total exposure time of the divisional exposures being equal to the predetermined exposure time; and a dynamic-range increasing unit operable to increase a dynamic range of corresponding pixels of a plurality of digital images resulting from conversion of the plurality of analogue images performed by the A/D converter and add up the corresponding pixels of the images to form an image with an increased dynamic range, and output the image with the increased dynamic range.

Appendix 17

An imaging method used in an imaging apparatus including an optical unit having a light amount adjusting function, an image sensor operable to read an optical image of a subject that is formed by the optical unit, an A/D converter operable to convert an analogue image that is output from the image sensor to a digital image, and a drive unit operable to drive the image sensor, the method comprising: adjusting an amount of light according to a predetermined exposure time in a manner that a main portion of the subject has a predetermined luminance level; driving the image sensor in a manner that the image sensor obtains a plurality of analogue images through a plurality of sequential divisional exposures each of which is performed for an identical exposure time, a total exposure time of the divisional exposures being equal to the predetermined exposure time; and increasing a dynamic range of corresponding pixels of a plurality of digital images resulting from conversion of the plurality of analogue images performed by the A/D converter and adding up the corresponding pixels of the images to form an image with an increased dynamic range, and outputting the image with the increased dynamic range.

Appendix 18

The imaging method according to appendix 17, further comprising: nonlinearly compressing the increased dynamic range of the image to a predetermined dynamic range.

Appendix 19

The imaging method according to one of appendixes 17 and 18, wherein in the dynamic-range increasing step, an output dynamic range is at least greater than an input dynamic range.

Appendix 20

The imaging method according to appendix 18, wherein in the dynamic-range compression step, the increased dynamic range of the image is compressed using a conversion characteristic that changes according to a spatial position on the image.

Appendix 21

The imaging method according to one of appendixes 17 to 20, further comprising: detecting a degree and a direction of an image shift caused by movement of the imaging apparatus between two different digital images among the plurality of digital images, wherein in the dynamic-range increasing step, the digital images are shifted in a direction to eliminate the image shift according to the degree and the direction of the image shift detected in the apparatus-movement detection step, and the corresponding pixels of the digital images are added up.

Appendix 22

The imaging method according to appendix 21, further comprising: detecting movement of the subject in a local area on the digital images by comparing corresponding pixels of the two different digital images in which the image shift caused by the movement of the imaging apparatus has been eliminated, wherein when the movement of the subject is detected, the corresponding pixels of the different digital images having the movement of the subject are excluded from the pixels of the digital images that are added up in the dynamic-range increasing step.

Appendix 23

The imaging method according to one of appendixes 17 to 20, further comprising: detecting movement of the subject in a local area on two different digital images among the plurality of digital images by comparing corresponding pixels of the two different digital images, wherein when the movement of the subject is detected, the corresponding pixels of the different digital images having the movement of the subject are excluded from the pixels of the digital images that are added up in the dynamic-range increasing step.

Appendix 24

The imaging method according to one of appendixes 17 to 20, further comprising: obtaining a plurality of digital images in which movement of the imaging apparatus has been corrected, and detecting movement of the subject in a local area on the digital images by comparing corresponding pixels of two different digital images among the plurality of digital images, wherein when the movement of the subject is detected in the subject-movement detection step, the corresponding pixels of the different digital images having the movement of the subject are excluded from the pixels of the digital images that are added up in the dynamic-range increasing step.

Appendix 25

The imaging method according to appendix 24, wherein movement of the imaging apparatus is corrected by means of optical correction.

Appendix 26

The imaging method according to appendix 21, further comprising: detecting movement of the subject in a local area on the digital images by comparing corresponding pixels of the two different digital images in which the image shift caused by the movement of the imaging apparatus has been eliminated; and converting coordinates of corresponding pixels of different digital images having the movement of the subject detected in the subject-movement detection step to eliminate the movement of the subject, wherein pixels that are at coordinates obtained in the coordinate conversion step through conversion of the coordinates of the pixels are used as the pixels of the digital images that are added up in the dynamic-range increasing step.

Appendix 27

The imaging method according to appendix 26, further comprising: determining whether the movement of the subject will be eliminated by converting the coordinates of the pixels, wherein when the subject-movement determination step determines that the movement of the subject will not be eliminated by converting the coordinates of the pixels, the pixels having the movement of the subject are excluded from the pixels of the digital images that are added up in the dynamic-range increasing step.

Appendix 28

An imaging method used in an imaging apparatus including an optical unit having a light amount adjusting function, an image sensor operable to read an optical image of a subject that is formed by the optical unit, an A/D converter operable to convert an analogue image that is output from the image sensor to a digital image, and a drive unit operable to drive the image sensor, the method comprising: driving the image sensor in a manner that the image sensor obtains a plurality of analogue images through a plurality of sequential divisional exposures that are performed to prevent an output of the A/D converter from being saturated; and increasing a dynamic range of corresponding pixels of a plurality of digital images resulting from conversion of the plurality of analogue images performed by the A/D converter and adding up the corresponding pixels of the digital images to form an image with an increased dynamic range, and outputting the image with the increased dynamic range.

Appendix 29

An imaging method used in an imaging apparatus including an optical unit having a light amount adjusting function, an image sensor operable to read an optical image of a subject that is formed by the optical unit, and an A/D converter operable to convert an analogue image that is output from the image sensor to a digital image, the method comprising: driving the image sensor in a manner that the image sensor obtains a plurality of analogue images through a plurality of sequential divisional exposures; detecting movement of the subject in a local area on a plurality of digital images resulting from conversion of the plurality of analogue images performed by the A/D converter by comparing corresponding pixels of two different digital images among the plurality of digital images; and adding up corresponding pixels of the plurality of digital images obtained by the A/D converter, wherein when the movement of the subject is detected in the subject-movement detection step, the corresponding pixels of the different digital images having the movement of the subject are excluded from the pixels of the digital images that are added up in the addition step.

The imaging apparatus, the imaging method, the integrated circuit that functions as the imaging apparatus, and the program used in the imaging apparatus of the present invention appropriately capture a large dynamic range image that exists in the natural world as an image that is seen natural without saturation on a conventional display having a small dynamic range, and prevent the S/N ratio of the image from deteriorating. Thus, the imaging apparatus, the imaging method, the integrated circuit, and the program of the present invention are applicable not only to digital still cameras, but also to other imaging apparatuses that capture images, such as video cameras, built-in cameras of mobile telephones, monitoring cameras, security cameras, and cameras incorporated in the eyes of robots, and are also applicable to application software, such as RAW converter software and photo retouching software for digital still cameras.

What is claimed is:

1. An imaging apparatus comprising:
an optical system operable to adjust an exposure light amount;
an A/D converter operable to convert an analogue signal that is obtained by the optical system to a first digital signal;
a dynamic-range increasing unit operable to magnify the first digital signal with a dynamic range magnification ratio to generate a second digital signal;
a control unit operable to generate control signals, one for decreasing the exposure light amount and the other for increasing the dynamic range magnification ratio; and
a dynamic-range compression unit including:
a vicinity luminance detection unit operable to extract a vicinity luminance value of the second digital signal corresponding to a predetermined position; and
a dynamic tone correction unit operable to convert an input value of the second digital signal for the predetermined position to an output value of the second digital signal for the predetermined position by using a conversion characteristic,
wherein the conversion characteristic changes the output value according to the vicinity luminance value, and
wherein a gradient of the conversion characteristic at a point corresponding to the vicinity luminance value is the same as or greater than a gradient of a straight line from a coordinate origin passing through the point on the conversion characteristic corresponding to the vicinity luminance value.

2. The imaging apparatus according to claim 1, wherein the conversion characteristic changes the value of the second digital signal for the position more in the case a value of the second digital signal is close to a value of the vicinity luminance value than in the case the value of the second digital signal is not close to the value of the vicinity luminance value.

3. The imaging apparatus according to claim 1, wherein when m=x, where x is the value of the second digital signal corresponding to the predetermined position and m is the vicinity luminance value, the conversion characteristic expressed using a quadratic function f(x, m) satisfies $$\partial f(x,m)/\partial x \geq (f(x,m)/x).$$

4. The imaging apparatus according to claim 1, wherein the conversion characteristic is such a characteristic that, within a predetermined input range of the second digital signal, with respect to a specific value of the second digital signal, as the vicinity luminance value increases, a corresponding converted value decreases.

5. The imaging apparatus according to claim 1, wherein the dynamic tone correction unit is a two-dimensional lookup table storing, as data, an output value that is determined by the value of the second digital signal and the vicinity luminance value.

6. The imaging apparatus according to claim 5, wherein the control unit generates signals,
one for decreasing the exposure light amount,
one for increasing the dynamic range increase ratio, and one for storing conversion characteristic data that is determined by the dynamic range increase ratio into the lookup table.

7. The imaging apparatus according to claim 1, further comprising:
a range adjustment unit operable to receive the second digital signal whose dynamic range has been magnified by the dynamic-range increasing unit, and convert the value of the received second digital signal to a value that is within an input range of the dynamic range compression unit when the value of the received second digital signal is greater than a predetermined value.

8. The imaging apparatus according to claim 1, further comprising:
a peak adjustment unit operable to adjust the value of the second digital signal in a manner that a peak value of image data, which is formed using the second, digital signal whose dynamic range has been increased by the dynamic-range increasing unit, is adjusted to a maximum value of an input range of the dynamic-range compression unit.

9. An imaging method, comprising:
adjusting an exposure light amount;
converting an analogue signal that is obtained by the optical system to a first digital signal;
magnifying the first digital signal with a dynamic range magnification ratio to generate a second digital signal; and
generating control signals, one for decreasing the exposure light amount and the other for increasing the dynamic range magnification ratio, the step of generating the control signals including:
extracting a vicinity luminance value of flail the second digital signal corresponding to a predetermined position; and
converting an input value of flail the second digital signal for flail the predetermined position to an output value of the second digital signal for the predetermined position by using a conversion characteristic,
wherein the conversion characteristic changes the output value according to the vicinity luminance value, and
wherein a gradient of the conversion characteristic at a point corresponding to the vicinity luminance value is the same as or greater than a gradient of a straight line from a coordinate origin passing through the point on the conversion characteristic corresponding to the vicinity luminance value.

10. A non-transitory computer-readable medium storing thereon a program, wherein the program causes a computer to execute the steps of claim 9.

11. An integrated circuit operable to execute the steps of claim 9.

* * * * *